US012732680B2

(12) United States Patent
Yao et al.

(10) Patent No.: US 12,732,680 B2
(45) Date of Patent: Sep. 8, 2026

(54) OPTICAL LENS, CAMERA MODULE, AND TERMINAL

(71) Applicant: HUAWEI TECHNOLOGIES CO., LTD., Shenzhen (CN)

(72) Inventors: Xiuwen Yao, Wuhan (CN); Qi Wang, Dongguan (CN); Shaopan Zhou, Dongguan (CN); Tao Shao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 452 days.

(21) Appl. No.: 18/158,729

(22) Filed: Jan. 24, 2023

(65) Prior Publication Data

US 2023/0164417 A1 May 25, 2023

Related U.S. Application Data

(63) Continuation of application No. PCT/CN2021/095254, filed on May 21, 2021.

(30) Foreign Application Priority Data

Jul. 28, 2020 (CN) ........................ 202010739758.2

(51) Int. Cl.
*H04N 23/55* (2023.01)
*G02B 13/00* (2006.01)

(52) U.S. Cl.
CPC ......... *H04N 23/55* (2023.01); *G02B 13/0025* (2013.01)

(58) Field of Classification Search
CPC .......................... G02B 15/144; G02B 13/0065
(Continued)

(56) References Cited

U.S. PATENT DOCUMENTS 7,382,548 B2 * 6/2008 Kohno .................. G02B 15/16 359/686
7,463,426 B2 * 12/2008 Nishio .................. H04N 23/60 359/716
(Continued)

FOREIGN PATENT DOCUMENTS

CN 100504494 C 6/2009
CN 104880810 A 9/2015
(Continued)

OTHER PUBLICATIONS

Lohmann, Adolf. W. Scaling laws for lens systems Applied Optics, vol. 28, No. 23 (Dec. 1, 1989), pp. 4996-4998. (Year: 1989).*
(Continued)

*Primary Examiner* — Bumsuk Won
*Assistant Examiner* — Seth D Moser

(57) ABSTRACT

An optical lens includes a first component, a second component, a third component, and a fourth component that each include at least one lens. The second component includes a refraction member configured to change a transmission route of light transmitted from the first component, the third component and the fourth component are coaxially disposed. An included angle is formed between optical axes of the third component and the fourth component and an optical axis of the first component. A position of the second component relative to an imaging plane of the optical lens is fixed. The first component, the third component, and the fourth component can move relative to the second component.

20 Claims, 29 Drawing Sheets

(58) Field of Classification Search
USPC ........ 359/686, 687.688, 694, 695, 696, 705, 359/726, 734
See application file for complete search history.

(56) References Cited

U.S. PATENT DOCUMENTS

| | | | | |
|---|---|---|---|---|
| 7,692,869 | B2 * | 4/2010 | Yamaguchi | G02B 15/144113 359/678 |
| 8,427,757 | B2 * | 4/2013 | Katayose | G02B 15/143105 359/686 |
| 8,520,123 | B2 * | 8/2013 | Terada | G03B 17/17 348/335 |
| 2006/0262422 | A1 | 11/2006 | Ohashi | |
| 2007/0109664 | A1 * | 5/2007 | Yagyu | G02B 15/144113 359/686 |
| 2007/0183058 | A1 * | 8/2007 | Bito | G02B 15/142 359/676 |
| 2010/0238562 | A1 | 9/2010 | Take | |
| 2014/0002715 | A1 * | 1/2014 | Wang | G02B 13/009 359/686 |

FOREIGN PATENT DOCUMENTS

| | | | |
|---|---|---|---|
| CN | 104698576 | B | 4/2017 |
| CN | 107884917 | A | 4/2018 |
| JP | 2004102089 | A | 4/2004 |
| JP | 2007025123 | A | 2/2007 |
| JP | 2007114447 | A | 5/2007 |
| JP | 2007219040 | A | 8/2007 |
| JP | 2008089690 | A | 4/2008 |
| JP | 2011137903 | A | 7/2011 |

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007) (Year: 2007).*

Extended European Search Report issued in EP21850382.9, dated Dec. 18, 2023, 8 pages.

Office Action issued in JP2023-504663 with English translation, dated Dec. 26, 2023, 14 pages.

International Search Report and Written Opinion issued in PCT/CN2021/095254, dated Aug. 25, 2021, 11 pages.

* cited by examiner

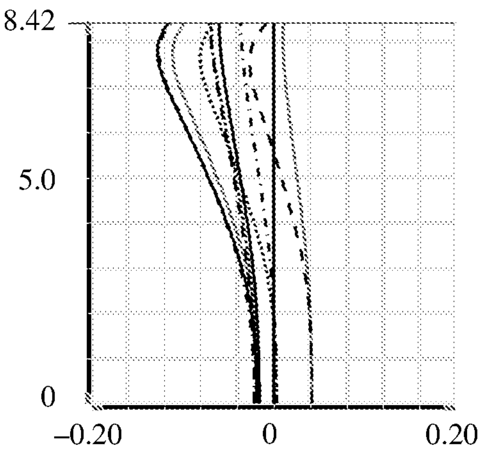
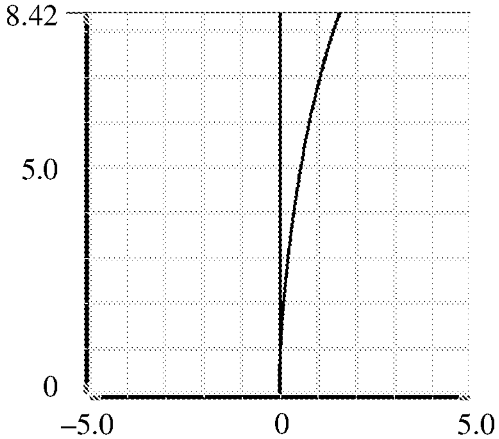
FIG. 38
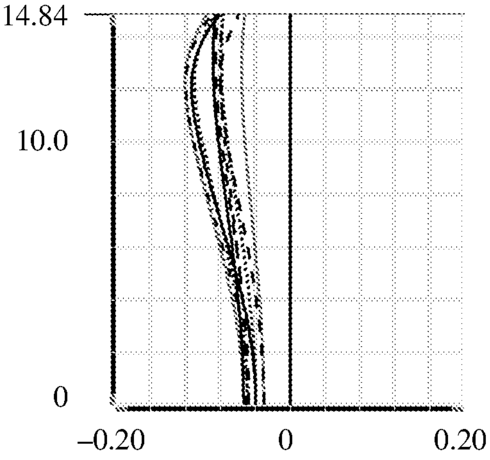
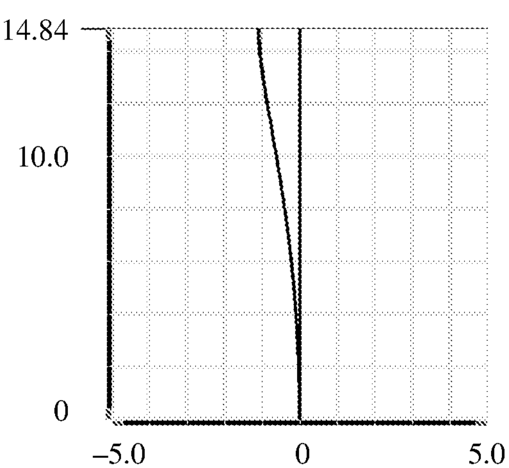
FIG. 39

3.0
2.0
1.0
0
555nm
610nm
650nm
470nm
510nm
–5.0 –4.0 –3.0 –2.0 –1.0 0 1.0 2.0 3.0 4.0 5.0

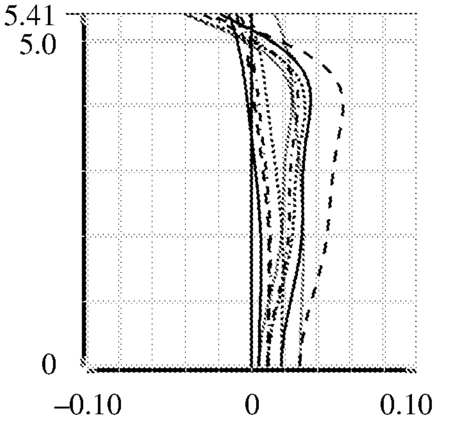
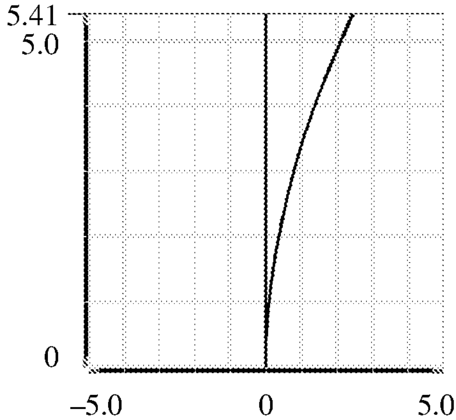
FIG. 52
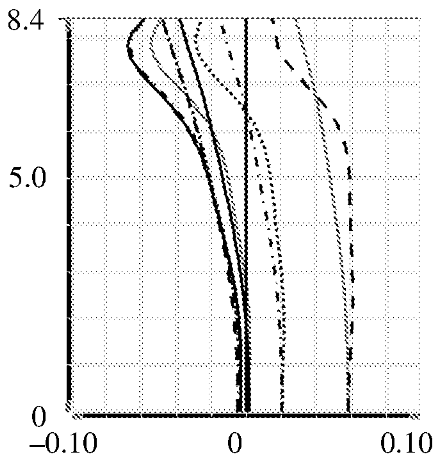
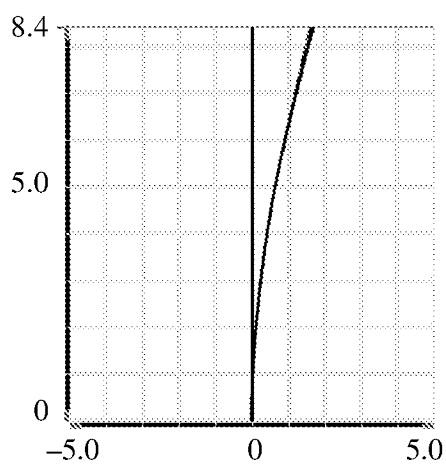
FIG. 53

OPTICAL LENS, CAMERA MODULE, AND TERMINAL

CROSS-REFERENCE TO RELATED APPLICATIONS

This application is a continuation of International Application No. PCT/CN2021/095254, filed on May 21, 2021, which claims priority to Chinese Patent Application No. 202010739758.2, filed on Jul. 28, 2020. The disclosures of the aforementioned applications are hereby incorporated by reference in their entireties.

TECHNICAL FIELD

The present disclosure relates to the lens field, and in particular, to an optical lens, a camera module, and a terminal.

BACKGROUND

In recent years, as electronic technologies advance and mobile communication rapidly develops, portable intelligent devices such as mobile phones have become an indispensable part of people's life, and a camera lens is an essential standard configuration of the mobile phone. In addition, consumers also have an increasingly high photographing requirement on the camera lens of the mobile phone, for example, a wider zooming range, higher resolution, and higher imaging quality. In addition, the mobile phone is increasingly ultra-thin, and internal mounting space also needs to be saved while high imaging performance of an optical lens is implemented.

SUMMARY

Implementations of the present disclosure provide an optical lens, a camera module including the optical lens, and a terminal including the camera module, to obtain an optical lens with a small thickness, a camera module with a small thickness, and a terminal with a small thickness while implementing a good imaging effect.

According to a first aspect, an optical lens is provided, including a first component, a second component, a third component, and a fourth component that are successively arranged from an object side to an image side, where each component in the first component to the fourth component includes at least one lens, the second component includes a refraction member, the refraction member is configured to change a transmission route of light transmitted from the first component, the third component and the fourth component are coaxially disposed, there is an included angle between optical axes of the third component and the fourth component and an optical axis of the first component, a position of the second component relative to an imaging plane of the optical lens is fixed, and the first component, the third component, and the fourth component can move relative to the second component, so that the optical lens changes between a long-focus state, a medium-focus state, a wide-angle state, and a micro-focus state.

It should be noted that, in this implementation of the present disclosure, when a lens is used as a boundary, a side on which a photographed object is located is an object side, and a surface of the lens that faces the object side may be referred to as an object side surface; and when a lens is used as a boundary, a side on which an image obtained after a photographed object is imaged by the lens is located is an image side, and a surface of the lens that faces the image side may be referred to as an image side surface.

In this implementation of the present disclosure, the third component and the fourth component are coaxially disposed, and there is an included angle between the optical axes of the third component and the fourth component and the optical axis of the first component, the position of the second component relative to the imaging plane of the optical lens is fixed, and the first component, the third component, and the fourth component can move relative to the second component, so that the optical lens changes between the long-focus state, the medium-focus state, the wide-angle state, and the micro-focus state. In other words, the third component and the fourth component move in cooperation with the first component in a zooming process, so that a requirement of continuous zooming of an object distance of the optical lens from the long-focus state to the micro-focus state is implemented while high imaging performance is obtained.

In addition, because the position of the second component relative to the imaging plane of the optical lens is fixed, a total track length of the optical lens varies with a distance between the first component and the second component. Specifically, when the distance between the first component and the second component is larger, the total track length of the optical lens is larger, that is, a change amount of the total track length of the optical lens is implemented by changing the distance between the first component and the second component. In the optical lens, a distance of the first component relative to the second component can be moved, to increase the total track length of the optical lens, so as to improve a zooming range of the optical lens, and improve imaging quality of the optical lens. In addition, the second component includes the refraction member, and the refraction member is configured to change the transmission route of the light transmitted from the first component, so that there is an included angle between the optical axes of the third component and the fourth component and the optical axis of the first component. Therefore, a distance by which the first component moves relative to the second component does not increase a distance between the second component and the imaging plane of the optical lens, and increases only the distance between the first component and the second component. When the optical lens is applied to a terminal, the first component may extend outside the terminal without increasing a thickness of the terminal, to save internal space of the terminal, and implement thinning of the terminal including the optical lens.

In some implementations, when the optical lens is in the long-focus state, the optical lens meets the following relation:

$$1.0 \leq TTL/EFL\text{max} \leq 1.7$$

where TTL is a total track length of the optical lens, namely, a total length from, to the imaging plane, an object side surface of a lens that is of the optical lens and that is closest to the object side, and EFLmax is an effective focal length of the optical lens in the long-focus state.

Generally, the effective focal length of the optical lens in the long-focus state is directly proportional to the total track length. To meet a miniaturization requirement, the total track length needs to be as small as possible, and therefore a ratio should be as small as possible. In this implementation, a range of the ratio of the total track length of the optical lens to the effective focal length of the optical lens in the long-focus state is specified, to ensure that a thickness of the optical lens is sufficiently small to facilitate miniaturization of the optical lens. When the optical lens is applied to a terminal, smaller space of the terminal is occupied, to implement thinning of the terminal.

In some implementations, the optical lens meets the following relation:

$$0.01 \leq IH/EFLmax \leq 0.1$$

where IH is an imaging height of the optical lens.

The specified ratio of the imaging height of the optical lens to the effective focal length of the optical lens in the long-focus state represents a telephoto capability of the optical lens, that is, a capability that the optical lens photographs an object image far away from the optical lens. Based on the specified ratio of the imaging height of the optical lens to the effective focal length of the optical lens in the long-focus state, the telephoto capability of the optical lens can be ensured, to meet different photographing scenarios, and improve user experience.

In some implementations, the first component has positive focal power, and the first component meets the following relation:

$$1.0 \leq |fs_1/ft| \leq 1.7$$

where $fs_1$ is a focal length of the first component, and ft is a focal length of the optical lens in the long-focus state.

In the foregoing relation, a range of the ratio of the focal length of the first component to the focal length of the optical lens in the long-focus state is specified. In this implementation, when the range of the ratio of the focal length of the first component to the focal length of the optical lens in the long-focus state meets the foregoing relation, the first component can cooperate with another lens to obtain a required optical lens, so that the optical lens has a wider zooming range, and can obtain better imaging.

In some implementations, the second component has negative focal power, and the second component meets the following relation:

$$0.1 \leq |fs_2/ft| \leq 0.7$$

where $fs_2$ is a focal length of the second component, and ft is the focal length of the optical lens in the long-focus state.

In the foregoing relation, a range of the ratio of the focal length of the second component to the focal length of the optical lens in the long-focus state is specified. In this implementation, when the range of the ratio of the second component to the focal length of the optical lens in the long-focus state meets the foregoing relation, the second component can cooperate with another lens to obtain a required optical lens, so that the optical lens has a wider zooming range, and can obtain better imaging.

In some implementations, the third component has positive focal power, and the third component meets the following relation:

$$0.1 \leq |fs_3/ft| \leq 0.7$$

where $fs_3$ is a focal length of the third component, and ft is the focal length of the optical lens in the long-focus state.

In the foregoing relation, a range of the ratio of the focal length of the third component to the focal length of the optical lens in the long-focus state is specified. In this implementation, when the range of the ratio of the third component to the focal length of the optical lens in the long-focus state meets the foregoing relation, the third component can cooperate with another lens to correct or reduce aberration, so that the optical lens has a wider zooming range, and can obtain better imaging.

In some implementations, the fourth component has positive focal power, and the fourth component meets the following relation:

$$0.3 \leq |fs_4/ft| \leq 0.9$$

where $fs_4$ is a focal length of the fourth component, and ft is the focal length of the optical lens in the long-focus state.

In the foregoing relation, a range of the ratio of the focal length of the fourth component to the focal length of the optical lens in the long-focus state is specified. The fourth component is mainly configured to correct aberration of an optical system, to improve imaging quality. In addition, in this implementation, when the range of the ratio of the fourth component to the focal length of the optical lens in the long-focus state meets the foregoing relation, the fourth component can cooperate with another lens to obtain a required optical lens, so that the optical lens has a wider zooming range, and can obtain better imaging.

In some implementations, the optical lens meets the following relation:

$$4\text{ mm} \leq \varphi max \leq 15\text{ mm}$$

where $\varphi$max is a diameter of a largest lens in the first component, the second component, the third component, and the fourth component.

The specified range of the diameter of the largest lens in the first component, the second component, the third component, and the fourth component represents a size of the largest lens in the optical lens. When the range of the diameter of the largest lens in the first component, the second component, the third component, and the fourth component meets the foregoing relation, miniaturization of the optical lens can be facilitated. When the optical lens is applied to a terminal, smaller space of the terminal is occupied, to implement thinning of the terminal.

In some implementations, the first component, the second component, the third component, and the fourth component have N lenses with focal power in total, a value of N is an integer greater than or equal to 7 and less than or equal to 15, and the N lenses with focal power include at least seven aspherical lenses. A quantity of lenses with focal power in the optical lens is limited to 7 to 15 (including 7 and 15). Therefore, a wide zooming range and a better imaging effect of the optical lens are implemented while it is ensured that a size of the optical lens is sufficiently small. In addition, a quantity of aspherical lenses in the N lenses with focal power is limited to at least 7, to effectively correct aberration, ensure a photographing effect of the optical lens, and improve user experience.

In some implementations, a difference between a chief ray angle existing when the optical lens is in the wide-angle state and a chief ray angle existing when the optical lens is in the long-focus state is less than or equal to 3 degrees, to ensure that no color shading occurs in an image, and improve imaging quality of the optical lens.

In some implementations, a difference between the chief ray angle existing when the optical lens is in the long-focus state and a chief ray angle existing when the optical lens is in the micro-focus state is less than or equal to 5 degrees, to ensure that no color shading occurs in an image, and improve imaging quality of the optical lens.

In some implementations, the fourth component includes a glued lens. The glued lens is disposed in the fourth component, to help correct chromatic aberration of the optical lens, so that the optical lens can obtain better imaging quality.

In some implementations, the optical lens includes a stop, and the stop is located on an object side surface of the third component. In other words, the stop is located between the second component and the third component, to limit a size of a light beam transmitted from the second component to the third component, so as to ensure that the optical lens implements a better imaging effect.

According to a second aspect, the present disclosure provides a camera module, where the camera module includes a photosensitive element, a drive member, and the optical lens in any one of the foregoing embodiments, the photosensitive element is located on an image side of the optical lens and is located on an imaging plane of the optical lens, and the drive member is configured to drive the first component, the third component, and the fourth component to move relative to the second component.

The camera module in the present disclosure includes the optical lens, the drive member, and the photosensitive element, and the drive member drives the first component, the third component, and the fourth component to move relative to the second component, so as to implement zooming. When the camera module works, the drive member can move the first component away from the second component, to increase a total track length of the optical lens, and enable the optical lens to be in a long-focus state, so that the optical lens can photograph a remote object image. When the camera module does not work, the drive member can move the first component, so that the first component is close to the second component. In a working process of the camera module, the first component may extend outside the camera module. When the camera module is applied to a terminal, the first component may extend outside the terminal without increasing a thickness of the terminal, to save internal space of the terminal, and implement thinning of the terminal including the optical lens. Therefore, compared with a thickness of a common camera module (a total track length of an optical lens of the common module is fixed, and a thickness of the optical lens needs to be increased if the total track length of the optical lens is increased), a thickness of the camera module is greatly reduced, and the camera module has a wider zooming range, to improve telephoto quality.

According to a third aspect, the present disclosure provides a terminal. The terminal includes an image processor and the foregoing camera module. The image processor is communicatively connected to the camera module. The camera module is configured to: obtain image data, and input the image data into the image processor. The image processor is configured to process the image data that is input to the image processor. The camera module in this implementation of the present disclosure can implement a wide zooming range and a good imaging effect, so that the terminal in the present disclosure can be used in a wide-range zooming photographing scenario.

In some implementations, the terminal further includes a housing. Both the camera module and the image processor are accommodated in the housing. A light passing hole is disposed on the housing. The first component of the camera module faces the light passing hole. When the drive member drives the first component to move away from the second component, the first component can extend out of the housing by using the light passing hole.

When the camera module is applied to the terminal, the first component can be moved when the camera module works, so that the first component is away from the second component, and extends out of the housing by using the light passing hole, to increase a total track length of the camera module, and enable the optical lens to be in a long-focus state, so that the optical lens can photograph a remote object image. In other words, when the total track length of the camera module is increased, the first component can extend out of the housing of the terminal, that is, in a process in which the total track length of the camera module changes, space occupied by the camera module in the terminal is not affected, and the terminal does not need to provide reserved space for zooming of the camera module, to save internal space of the terminal, and implement thinning of the terminal.

BRIEF DESCRIPTION OF DRAWINGS

To describe technical solutions in embodiments of the present disclosure or in the background more clearly, the following describes the accompanying drawings used in embodiments of the present disclosure or in the background.

FIG. 27 is a schematic diagram of a zooming process of the optical lens shown in FIG. 26;

FIG. 38 is a schematic diagram of field curvature and optical distortion of an optical lens in a medium-focus state according to Implementation 2 of the present disclosure;

FIG. 39 is a schematic diagram of field curvature and optical distortion of an optical lens in a wide-angle state according to Implementation 2 of the present disclosure;

FIG. 52 is a schematic diagram of field curvature and optical distortion of an optical lens in a long-focus state according to Implementation 3 of the present disclosure;

FIG. 53 is a schematic diagram of field curvature and optical distortion of an optical lens in a medium-focus state according to Implementation 3 of the present disclosure;

DESCRIPTION OF EMBODIMENTS

Figure 1:
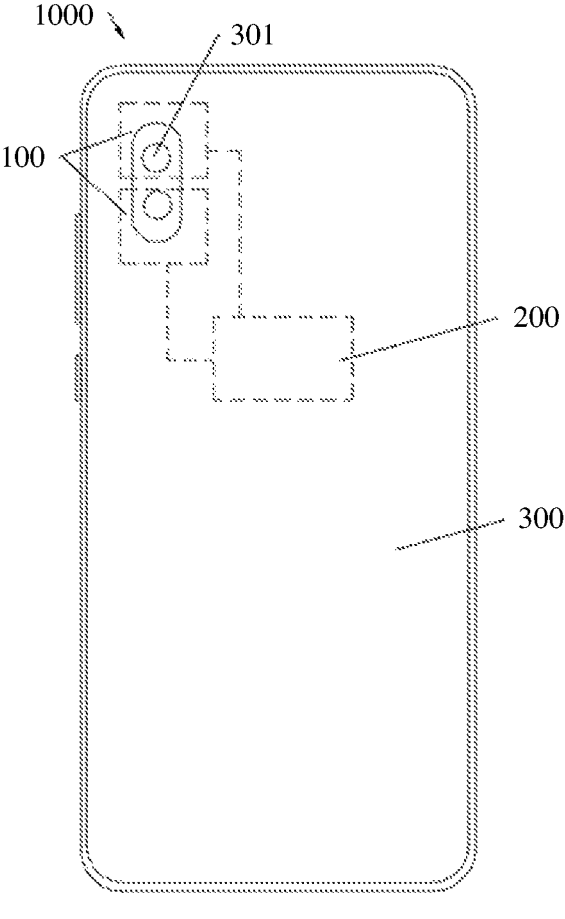
FIG. 1 is a schematic diagram of a structure of a terminal.

The following describes embodiments of the present disclosure with reference to the accompanying drawings in embodiments of the present disclosure.

For ease of understanding, the following first explains and describes technical terms used in the present disclosure.

A focal length, is a measurement manner of measuring convergence or divergence of light in an optical system, and is a vertical distance from an optical center of a lens or a lens group to an imaging plane when a clear image of an infinite scene is formed on the imaging plane by using the lens or the lens group. A position of an optical center of a fixed-focus lens is fixed. For a zoom lens, a focal length of the lens varies with an optical center of the lens.

An optical axis is light that vertically passes through the center of an ideal lens. When light parallel to the optical axis is incident to a convex lens, for an ideal convex lens, all light should be converged at one point behind the lens, and the point at which all the light is converged is a focus.

An aperture is an apparatus configured to control an amount of light passing through a lens and enters a photosensitive surface in a camera, and is usually in the lens. A size of the aperture is represented by an F-number.

An F-number is a ratio (a reciprocal of a relative aperture) of a focal length of a lens to a diameter of a clear aperture of the lens. A smaller F-number indicates a larger amount of admitted light in a same unit of time. A smaller F-number indicates a smaller depth of field, so that photographed background content is blurred. This is similar to an effect achieved by a long-focus lens.

A back focal length (BFL) is a distance between a vertex on an image side surface of a lens closest to an image side in an optical lens and an imaging plane of the optical lens.

Positive focal power may also be referred to as positive refractive power, and indicates that a lens has a positive focal length and has an effect of converging light.

Negative focal power may also be referred to as negative refractive power, and indicates that a lens has a negative focal length and has an effect of diverging light.

A total track length (TTL) is a total length from an object side surface of a lens closest to an object side in an optical lens to an imaging plane, and is a main factor that forms a height of a camera.

A chief ray angle (Maximum Chief Ray Angle, CRA) indicates an included angle between a chief ray of a lens and an optical axis. A smaller chief ray angle indicates clearer imaging.

An Abbe number, namely, a dispersion coefficient, is used to represent an index of a dispersion capability of a transparent medium. Generally, a larger refractive index of the medium indicates severer dispersion and a smaller Abbe number. On the contrary, a smaller refractive index of the medium indicates slighter dispersion and a larger Abbe number. For a field of view (FOV), in an optical instrument, a lens of the optical instrument is used as a vertex, and an included angle formed by two edges of a maximum range in which an object image of a measured object can pass through the lens is referred to as the field of view. A view scope of the optical instrument depends on a size of the field of view. A larger field of view indicates a larger view scope and smaller optical power.

For an object side, when a lens is used as a boundary, a side on which a to-be-imaged scene is located is the object side.

For an image side, when a lens is used as a boundary, a side on which an image of a to-be-imaged scene is located is the image side.

For an object side surface, a surface of a lens close to an object side is referred to as the object side surface.

For an image side surface, a surface of a lens close to an image side is referred to as the image side surface.

When a lens is used as a boundary, a side on which a photographed object is located is an object side, and a surface of the lens close to the object side may be referred to as an object side surface; and when a lens is used as a boundary, a side on which an image of a to-be-photographed object is located is an image side, and a surface of the lens close to the image side may be referred to as an image side surface.

Axial chromatic aberration is also referred to as longitudinal chromatic aberration or chromatism of position. After passing through a lens, light parallel to an optical axis is converged at different positions before and after the lens. The aberration is referred to as chromatism of position or axial chromatic aberration. A reason is that the lens converges light with different wavelengths at different positions, so that imaging planes of images of light with different colors cannot overlap during final imaging, and polychromatic light disperses to form dispersion.

Lateral chromatic aberration is also referred to as magnification chromatic aberration, and a difference between magnifications of an optical system for light with different colors is referred to as magnification chromatic aberration. A wavelength causes a change in the magnification of the optical system, and a size of an image changes accordingly.

Distortion, is a degree at which an image formed by an optical system for an object is distorted relative to the object. A height of a point at which chief rays with different fields of view intersect a Gaussian imaging plane after the chief rays pass through the optical system is not equal to an ideal imaging height, and a difference between the two heights is distortion. Therefore, distortion only changes an imaging position of an off-axis object point on an ideal plane, so that a shape of an image is distorted, but definition of the image is not affected.

Optical distortion is a distortion degree obtained through optical theoretical calculation.

A diffraction limit means that when an ideal object point is imaged by using an optical system, due to the diffraction limit, it is impossible to obtain an ideal image point, but a Fraunhofer diffraction image is obtained. Because an aperture of the optical system is generally circular, the Fraunhofer diffraction image is the so-called Airy disk. In this case, an image of each object point is a diffuse spot. After two diffuse spots are close to each other, the two diffuse spots are not easily distinguished. In this case, resolution of the system is limited. A larger spot indicates lower resolution.

The present disclosure provides a terminal, and the terminal may be a mobile phone, a tablet computer, a laptop computer, a video camera, a video recorder, a camera, or another form of device that has a photographing or video recording function. The terminal includes at least one optical lens, and the optical lens includes a zoom lens, so that the terminal can implement a zooming photographing effect. FIG. 1 is a schematic diagram of a back side of a terminal according to an implementation of the present disclosure. In this implementation, a terminal 1000 is a mobile phone. This implementation of the present disclosure is described by using an example in which the terminal 1000 is a mobile phone.

The terminal 1000 includes a camera module 100, an image processor 200, and a housing 300. Both the camera module 100 and the image processor 200 are accommodated in the housing 300. A light passing hole 301 is disposed on the housing 300. A light entrance side of the camera module 100 is opposite to the light passing hole 301 of the housing 300. When the camera module 100 performs video recording, the camera module 100 can extend out of the housing 300 by using the light passing hole 301. The image processor 200 is communicatively connected to the camera module 100. The camera module 100 is configured to: obtain image data, and input the image data into the image processor 200. The image processor 200 is configured to process the image data that is input to the image processor. The communicative connection between the camera module 100 and the image processor 200 may include transmitting data by using an electrical connection such as cabling, or transmitting data through coupling or the like. It may be understood that the camera module 100 and the image processor 200 may be communicatively connected in another manner in which data can be transmitted.

When the camera module 100 is applied to the terminal 1000, the camera module 100 performs zooming based on a scenario requirement during working. In a zooming process, the camera module 100 can partially extend out of the housing 300 by using the light passing hole 301, to increase a total track length of the camera module 100, and enable the camera module 100 to be in a long-focus state, so that the camera module 100 can photograph a remote object image. In other words, when the total track length of the camera module 100 is increased, the camera module 100 can extend out of the housing 300 of the terminal 1000, that is, in a process in which the total track length of the camera module 100 changes, space occupied by the camera module 100 in the terminal 1000 is not affected, and the terminal 1000 does not need to provide reserved space for zooming of the camera module 100, to save internal space of the terminal 1000, and implement thinning of the terminal 1000. In addition, the camera module 100 in this implementation of the present disclosure can implement a wide zooming range and a good imaging effect, so that the terminal 1000 in the present disclosure can be used in a wide-range zooming photographing scenario.

A function of the image processor 200 is to perform optimization processing on a digital image signal by using a series of complex mathematical algorithm operations, and finally transmit the processed signal to a display. The image processor 200 may be a separate image processing chip or digital signal processing (DSP) chip. A function thereof is to quickly transfer data obtained by a photosensitive chip to a central processing unit in a timely manner, and refresh the photosensitive chip. Therefore, quality of the DSP chip directly affects picture quality (such as color saturation or definition). Alternatively, the image processor 200 may be integrated into another chip (such as a central processing chip).

In the implementation shown in FIG. 1, the camera module 100 is disposed on the back side of the terminal 1000, and is a rear-facing lens of the terminal 1000. It may be understood that, in some implementations, the camera module 100 may be disposed on the front side of the terminal 1000 as a front-facing lens of the terminal 1000. Both the front-facing lens and the rear-facing lens may be used for obtaining a selfie, or may be used by a photographer to photograph another object.

In some implementations, there are a plurality of camera modules 100, and "a plurality of" means two or more. Different camera modules 100 may have different functions, so that different photographing scenarios can be met. For example, in some implementations, the plurality of camera modules 100 include a zoom camera module or a fixed-focus camera module, to separately implement zooming photographing and fixed-focus photographing. In the implementation shown in FIG. 1, the terminal 1000 has two rear-facing lenses, and the two camera modules 100 are respectively an ordinary camera module and a zoom camera module. The ordinary camera module can be used in daily ordinary photographing, and the zoom camera module can be used in a scenario in which zooming photographing needs to be performed. In some implementations, a plurality of different camera modules 100 may be communicatively connected to the image processor 200, to process, by using the image processor 200, image data photographed by the camera modules 100.

It should be understood that a mounting position of the camera module 100 of the terminal 1000 in the implementation shown in FIG. 1 is merely an example. In some other implementations, the camera module 100 may be mounted at another position on the mobile phone. For example, the camera module 100 may be mounted in an upper middle position or an upper right corner of the back side of the mobile phone. Alternatively, the camera module 100 may not be disposed on a main body of the mobile phone, but is disposed on a component that can move or rotate relative to the mobile phone. For example, the component may extend, retract, or rotate on the main body of the mobile phone. The mounting position of the camera module 100 is not limited in the present disclosure.

Figure 2:
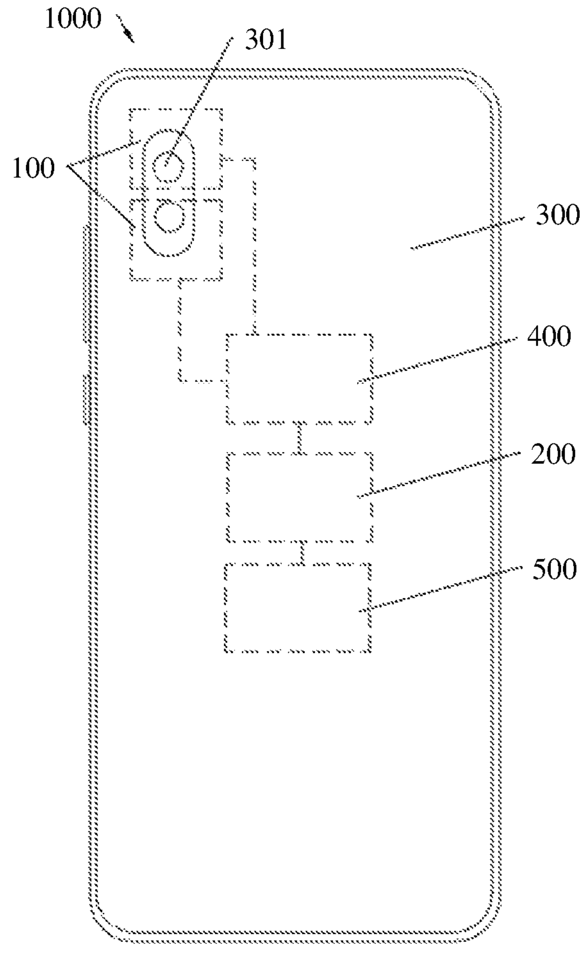
FIG. 2 is a schematic diagram of a structure of another terminal.

Referring to FIG. 2, in some implementations, the terminal 1000 further includes an analog-to-digital converter 400 (which may also be referred to as an A/D converter). The analog-to-digital converter 400 is connected between the camera module 100 and the image processor 200. The analog-to-digital converter 400 is configured to: convert a signal generated by the camera module 100 into a digital image signal, transmit the digital image signal to the image processor 200, then process the digital image signal by using the image processor 200, and finally display an image by using a display screen or the display.

In some implementations, the terminal 1000 further includes a memory 500. The memory 500 is communicatively connected to the image processor 200. The image processor 200 processes the image digital signal, and then transmits the image to the memory 500. Therefore, when an image needs to be viewed subsequently, the image can be found in the memory at any time, and is displayed on the display screen. In some implementations, the image processor 200 further compresses the processed image digital signal, and then stores the signal in the memory 500, to save space in the memory 500. It should be noted that FIG. 2 is only a schematic diagram of a structure of this implementation of the present disclosure, and position structures of the camera module 100, the image processor 200, the analog-to-digital converter 400, and the memory 500 shown in FIG. 2 are merely examples.

Figure 3:
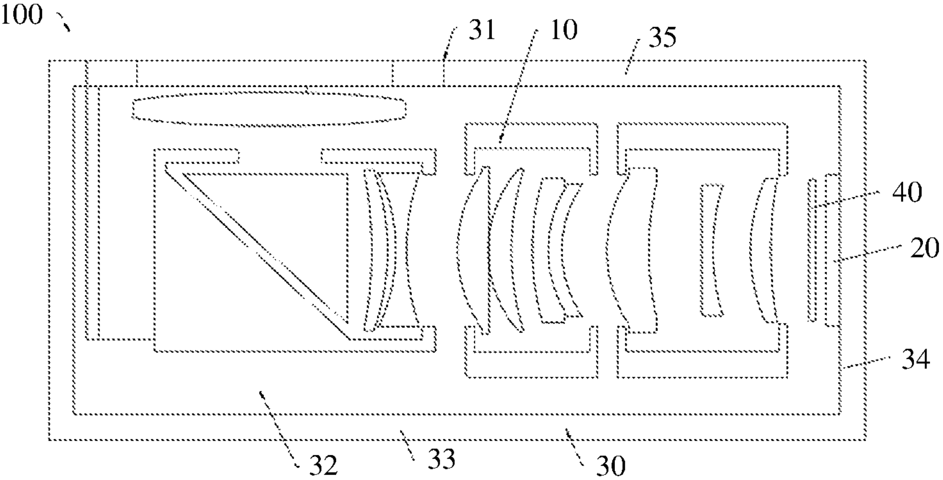
FIG. 3 is a schematic exploded view of a camera module according to an implementation of the present disclosure.
Figure 4:
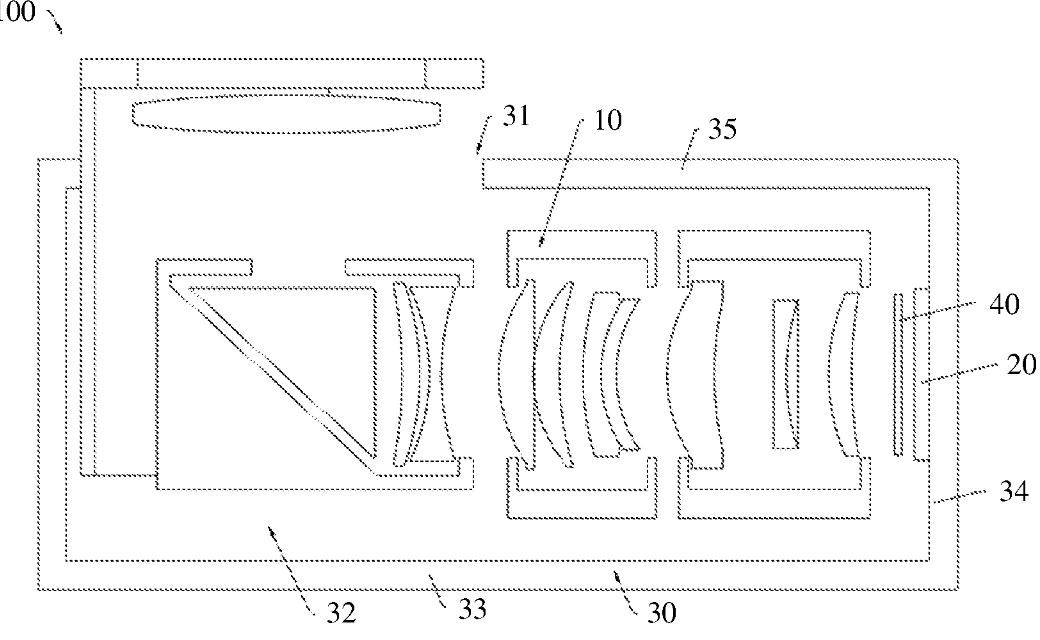
FIG. 4 is a schematic diagram of a structure of the camera module shown in FIG. 3 in another state.
Figure 5:
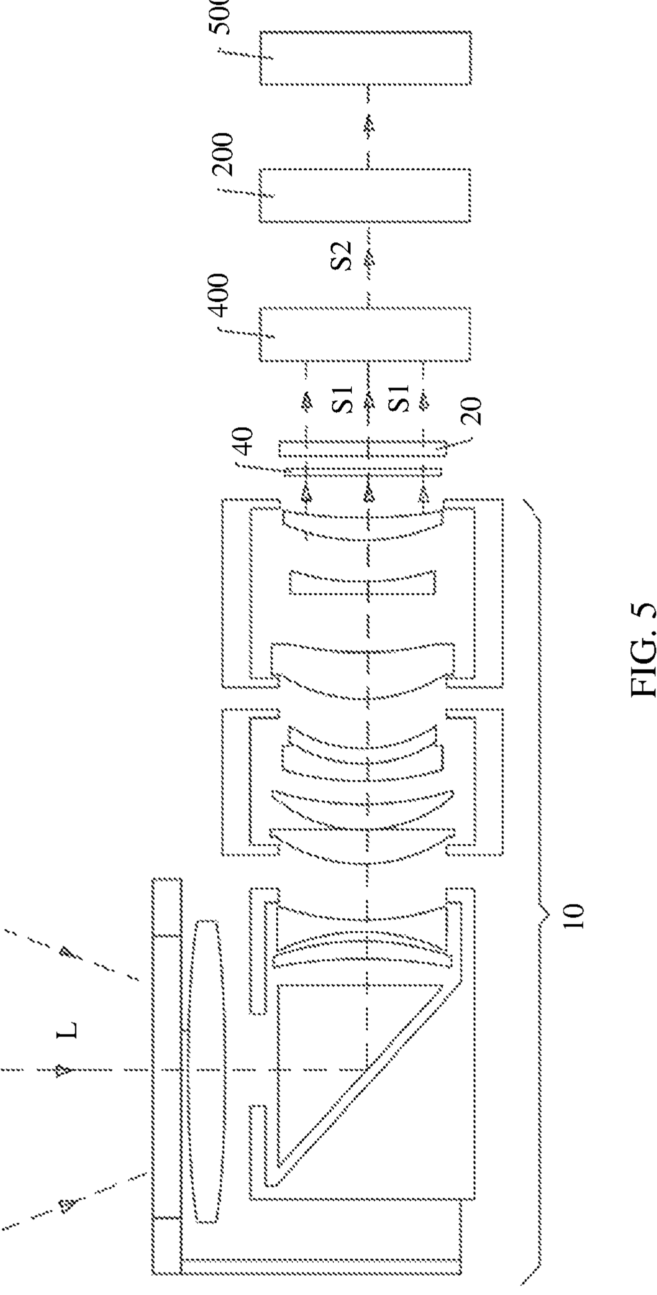
FIG. 5 is a schematic diagram of a partial structure of a camera module according to the present disclosure.

Referring to FIG. 1 and FIG. 3, the camera module 100 includes an optical lens 10, a photosensitive element 20, a drive member, and an enclosure 30. The enclosure 30 includes a through hole 31 and accommodation space 32. The through hole 31 communicates with the accommodation space 32. The through hole 31 is opposite to the light passing hole 301 of the housing 300. The drive member, the photosensitive element 20, and the optical lens 10 are all accommodated in the accommodation space 32. The photosensitive element 20 is connected to the enclosure 30. The photosensitive element 20 is located on an image side of the optical lens 10, and is located on an imaging plane of the optical lens 10. The drive member is configured to drive a component in the optical lens 10 to implement zooming. A light entrance side of the optical lens 10 faces the through hole 31. When performing zooming, the optical lens 10 can partially extend out of the accommodation space 32 (as shown in FIG. 4) by using the through hole 31, and extend out of the housing 300 by using the light passing hole 301. When the camera module 100 works, a to-be-imaged scene is imaged on the photosensitive element 20 after passing through the optical lens 10. Specifically, as shown in FIG. 5, a working principle of the camera module 100 is as follows: After light L reflected by a photographed scene passes through the optical lens 10, an optical image is generated, and is projected on a surface of the photosensitive element 20. The photosensitive element 20 converts the optical image into an electrical signal, namely, an analog image signal S1, and transmits, to the analog-to-digital converter 400, the analog image signal S1 obtained through conversion, to convert the analog image signal S1 into a digital image signal S2 by using the analog-to-digital converter 400, and send the digital image signal S2 to the image processor 200. Certainly, in another embodiment, the camera module 100 may have no enclosure, and the photosensitive element 20 is fastened to a support or another structure.

When the camera module 100 works, in a zooming process, the optical lens 10 can partially extend out of the accommodation space 32, and extend out of the housing 300 by using the light passing hole 301, to increase a total track length of the optical lens 10, and enable the optical lens 10 to be in the long-focus state, so that the optical lens 10 can photograph a remote object image. When the camera module 100 does not work, the optical lens 10 is totally accommodated in the accommodation space 32. In a working process of the camera module 100, when the optical lens 10 partially extends out of the enclosure 30, a height of the enclosure 30 is not affected. Therefore, compared with a thickness of a common camera module 100 (a total track length of an optical lens 10 of the common module is fixed, and a thickness of the optical lens 10 needs to be increased if the total track length of the optical lens 10 is increased), a thickness of the camera module 100 is greatly reduced, and the camera module 100 has a wider zooming range, to improve telephoto quality. When the camera module 100 is applied to the terminal 1000, a thickness of the terminal 1000 is not increased, to save internal space of the terminal 1000, and implement thinning of the terminal 1000 including the camera module 100.

The enclosure 30 includes a bottom wall 33, a peripheral wall 34, and a top wall 35. The peripheral wall 34 is around the bottom wall 33, and is connected to the top wall 35, to form the accommodation space 32. The through hole 31 is disposed on the top wall 35, and the photosensitive element 20 is disposed on the peripheral wall 34 away from the light passing hole 301. Specifically, a circuit board is further disposed between the photosensitive element 20 and the peripheral wall 34. The photosensitive element 20 is fastened to the circuit board in a manner such as bonding or surface-mounting, and the analog-to-digital converter 400, the image processor 200, the memory 500, and the like are also fastened to the circuit board in a manner such as bonding or surface-mounting, to implement a communicative connection between the photosensitive element 20, the analog-to-digital converter 400, the image processor 200, the memory 500, and the like by using the circuit board. The circuit board may be a flexible printed circuit board (FPC) or a printed circuit board (PCB), and is configured to transmit an electrical signal. The FPC may be a single-sided flexible printed circuit board, a double-sided flexible printed circuit board, a multi-layer flexible printed circuit board, a rigid flexible printed circuit board, a flexible printed circuit board of a mixed structure, or the like.

The photosensitive element 20 is a semiconductor chip. A surface thereof contains hundreds of thousands to millions of photodiodes. When the photosensitive element 20 is irradiated by light, a charge is generated, and is converted into a digital signal by using a chip of the analog-to-digital converter 400. The photosensitive element 20 may be a charge coupled device (CCD), or may be a complementary metal-oxide-semiconductor (CMOS). The CCD is made of a highly photosensitive semiconductor material, and can convert light into a charge and convert the charge into a digital signal by using the chip of the analog-to-digital converter 400. The CCD includes many photosensitive units that are generally in a unit of megapixel. When a surface of the CCD is irradiated by light, each photosensitive unit reflects a charge on a component, and signals generated by all the photosensitive units are added together to form a complete picture. The CMOS is a semiconductor that is mainly made by using two elements such as silicon and germanium, so that N (negative charge) and P (positive charge) semiconductors coexist on the CMOS. A current generated by using a complementary effect between the two semiconductors can be recorded and interpreted as an image by a processing chip.

The drive member includes a first drive part, a second drive part, and a third drive part. The first drive part, the second drive part, and the third drive part are separately configured to drive related elements of the optical lens 10, to implement zooming and focusing of the camera module 100. Each of the first drive part, the second drive part, and the third drive part includes one or more drive parts, so that focusing and/or optical image stabilization can be performed by separately driving the related elements of the optical lens 10 by using the drive parts of the first drive part, the second drive part, and the third drive part. When the first drive part, the second drive part, and the third drive part separately drive the related elements of the optical lens 10 to perform focusing, the first drive part, the second drive part, and the third drive part separately drive the related elements of the optical lens 10 to move relative to each other, to implement focusing. When the first drive part, the second drive part, and the third drive part separately drive the related elements of the optical lens 10 to perform image stabilization, the related elements of the optical lens 10 are driven to move or rotate relative to the photosensitive element 20, and/or the related elements of the optical lens 10 are driven to move or rotate relative to each other, to implement optical image stabilization. The first drive part, the second drive part, and the third drive part each may be a drive structure such as a motor.

The camera module 100 further includes an infrared filter 40. The infrared filter 40 may be fastened to the circuit board, and is located between the optical lens 10 and the photosensitive element 20. Light that passes through the optical lens 10 is irradiated on the infrared filter 40, and is transmitted to the photosensitive element 20 by using the infrared filter 40. The infrared filter 40 may eliminate unnecessary light to be projected on the photosensitive element 20, and prevent the photosensitive element 20 from producing a false color or a ripple, to improve effective resolution and color reproduction thereof. In some implementations, the infrared filter 40 may be fastened to an end of the optical lens 10 that faces the image side. Other elements included in the camera module 100 are not described in detail herein.

Figure 6:
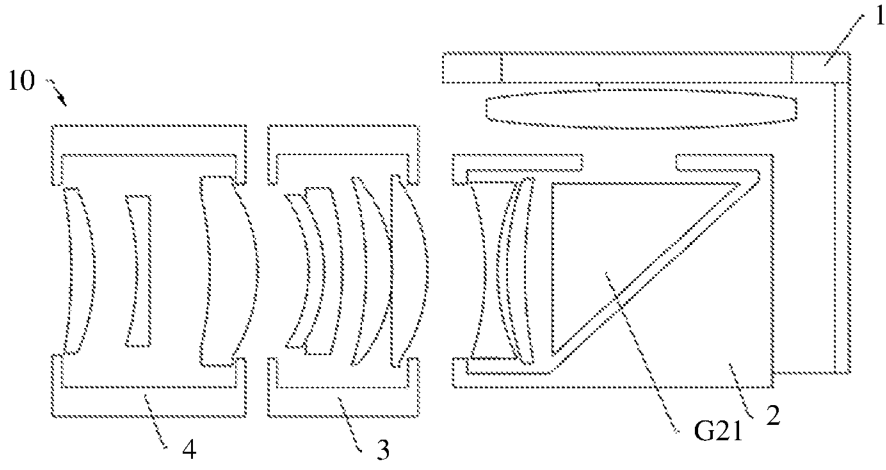
FIG. 6 is a schematic diagram of a structure of an optical lens of the camera module shown in FIG. 3.

Referring to FIG. 6, the optical lens 10 affects imaging quality and an imaging effect. The optical lens 10 mainly performs imaging by using a refraction principle of a lens, that is, after scene light passes through the optical lens 10, a clear image is formed on the imaging plane, and an image of the scene is recorded by using the photosensitive element 20 located on the imaging plane. The imaging plane is a plane on which an image obtained after a scene is imaged by the optical lens 10 is located. The optical lens 10 includes a plurality of components that are successively arranged from an object side to the image side, each component includes at least one lens, and an image with a good imaging effect is formed through cooperation between lenses in the components. The object side is a side on which a photographed object is located, and the image side is a side on which the imaging plane is located.

In the present disclosure, the optical lens 10 is a zoom lens. When a focal length of the optical lens 10 is changed, the optical lens 10 is correspondingly moved relative to the photosensitive element 20, so that it can be ensured that the optical lens 10 can well perform imaging within a designed focal length range.

Figure 7:
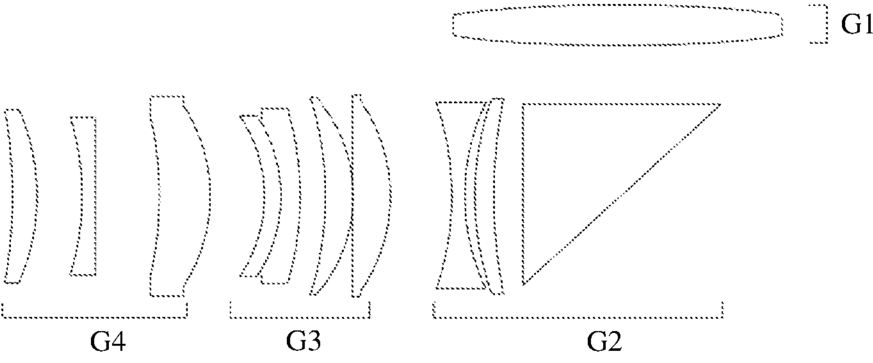
FIG. 7 is a schematic diagram of a partial structure of the optical lens shown in FIG. 6.

Referring to FIG. 4, FIG. 6, and FIG. 7, in some implementations of the present disclosure, the optical lens 10 in the present disclosure includes a first component G1, a second component G2, a third component G3, and a fourth component G4 that are successively arranged from the object side to the image side, and each component in the first component G1 to the fourth component G4 includes at least one lens. Each lens in each component is disposed along an optical axis, and each lens includes an object side surface facing the object side and an image side surface facing the image side. Specifically, an image side surface of the fourth component G4 faces the photosensitive element 20. The second component G2, the third component G3, and the fourth component G4 are coaxial. The second component G2 includes a refraction member G21. The refraction member G21 is located on a side of the second component G2 that faces away from the third component G3. The first component G1 is disposed on a side of the refraction member G21 that faces away from the bottom wall 33, and faces the through hole 31. There is an included angle between optical axes of the third component G3 and the fourth component G4 and an optical axis of the first component G1. It may be understood that an optical path of the optical lens 10 includes a first optical path and a second optical path. There is an included angle between the first optical path and the second optical path. Light is transmitted along the first optical path, and is transmitted along the second optical path after passing through the refraction member G21. The first component G1 is located on the first optical path, and the third component G3 and the fourth component G4 are located on the second optical path. In this embodiment, the included angle is 90 degrees, that is, the optical axes of the third component G3 and the fourth component G4 are perpendicular to the optical axis of the first component G1. Certainly, the included angle between the optical axes of the third component G3 and the fourth component G4 and the optical axis of the first component G1 may be another degree between 0 degrees and 180 degrees (excluding 0 degrees and 180 degrees).

Light outside the terminal 1000 passes through the first component G1 successively by using the light passing hole 301 and the through hole 31, successively passes through the lens in the second component G2, the third component G3, and the fourth component G4 through refraction by the refraction member G21, and is finally received by the photosensitive element 20. The refraction member G21 is configured to change a transmission route of light transmitted from the first component G1. A position of the second component G2 relative to the imaging plane of the optical lens 10 is fixed, and both the first component G1, the three component G3, and the fourth component G4 can move relative to the second component G2. When the first component G1 is away from the second component G2 by a specified distance, the first component G1 can extend out of the accommodation space 32 by using the through hole 31, and extend out of the housing 300 by using the light passing hole 301. In this embodiment, the refraction member G21 is a prism. It may be understood that the prism is also a lens, and each lens other than the prism in the present disclosure is a lens that has positive or negative focal power. Certainly, in another embodiment, the refraction member G21 may be an element that may change an optical path, for example, a reflector.

In the present disclosure, the third component G3 and the fourth component G4 can move relative to the second component G2 to cooperate with the first component G1, so that the optical lens 10 changes between the long-focus state, a medium-focus state, a wide-angle state, and a micro-focus state. In other words, the third component G3 and the fourth component G4 move in cooperation with the first component G1 in a zooming process, so that a requirement of continuous zooming of an object distance of the optical lens 10 from the long-focus state to the micro-focus state is implemented while high imaging performance is obtained. It may be understood that, that the optical lens 10 is in the long-focus state, the medium-focus state, the wide-angle state, or the micro-focus state is based on a camera. Specifically, when it is determined that the optical lens 10 is in the long-focus state, the medium-focus state, the wide-angle state, or the micro-focus state, an equivalent focal length of the optical lens 10 is used for determining. Equivalent focal length of the optical lens 10=(43.3*focal length of the optical lens 10)/length of a diagonal line of the photosensitive element 20. The focal length of the optical lens 10 mentioned in this specification is an actual focal length of the optical lens 10. When the optical lens 10 is in the long-focus state, the equivalent focal length of the optical lens 10 is greater than or equal to 50 cm. When the optical lens 10 is in the medium-focus state, the equivalent focal length of the optical lens 10 falls within a range of 25 cm to 27 cm (including 25 cm and 27 cm). When the optical lens 10 is in the wide-angle state, the equivalent focal length of the optical lens 10 is less than or equal to 24 cm. When the optical lens 10 is in the micro-focus state, the equivalent focal length of the optical lens 10 is less than or equal to 10 cm.

In this implementation of the present disclosure, when the optical lens 10 works, the first component G1, the third component G3, and the fourth component G4 can separately move relative to the second component G2 by using the first drive part, the second drive part, and the third drive part. Because the position of the second component G2 relative to the imaging plane of the optical lens 10 is fixed, the total track length of the optical lens 10 varies with a distance between the first component G1 and the second component G2. When the distance between the first component G1 and the second component G2 is larger, the total track length of the optical lens 10 is larger. In other words, a distance of the first component G1 relative to the second component G2 can be moved, so that the optical lens 10 extends out of the accommodation space 32 by using the through hole 31, and extends out of the housing 300 by using the light passing hole 301, to increase the total track length of the optical lens 10, so as to increase a zooming range of the optical lens 10, and improve imaging quality of the optical lens 10. In the zooming process of the optical lens 10, the second component G2 includes the refraction member G21, and the refraction member G21 is configured to change the transmission route of the light transmitted from the first component G1, so that the optical axis of the first component G1 is perpendicular to the optical axes of the third component G3 and the fourth component G4, and the first component G1 can extend out of the accommodation space 32 by using the through hole 31, and extend out of the housing 300 by using the light passing hole 301. Therefore, a distance by which the first component G1 moves relative to the second component G2 does not increase a distance between the second component G2 and the imaging plane of the optical lens 10, and increases only the distance between the first component G1 and the second component G2. The first component G1 may extend outside the terminal 1000, and the terminal 1000 does not need to provide additional space for displacement of the first component G1 relative to the second component G2, to save internal space of the terminal 1000, and implement thinning of the terminal 1000. When the optical lens 10 does not work, the first component G1 is accommodated in the enclosure 30, so that the terminal 1000 is more convenient to use.

In some implementations of the present disclosure, the optical lens 10 includes a first lens barrel 1, a second lens barrel 2, a third lens barrel 3, and a fourth lens barrel 4. The lens in the first component G1 is fixedly connected inside the first lens barrel 1, the lens in the second component G2 and the refraction member G21 are fixedly connected inside the second lens barrel 2, the lens in the third component G3 is fixedly connected inside the third lens barrel 3, and the lens in the fourth component G4 is fixedly connected inside the fourth lens barrel 4. The first lens barrel 1, the second lens barrel 2, the third lens barrel 3, and the fourth lens barrel 4 are respectively configured to fasten the first component G1, the second component G2, the third component G3, and the fourth component G4, to keep the first component G1, the second component G2, the third component G3, and the fourth component G4 being stably fastened inside the enclosure 30 of the camera module 100.

Figure 8:
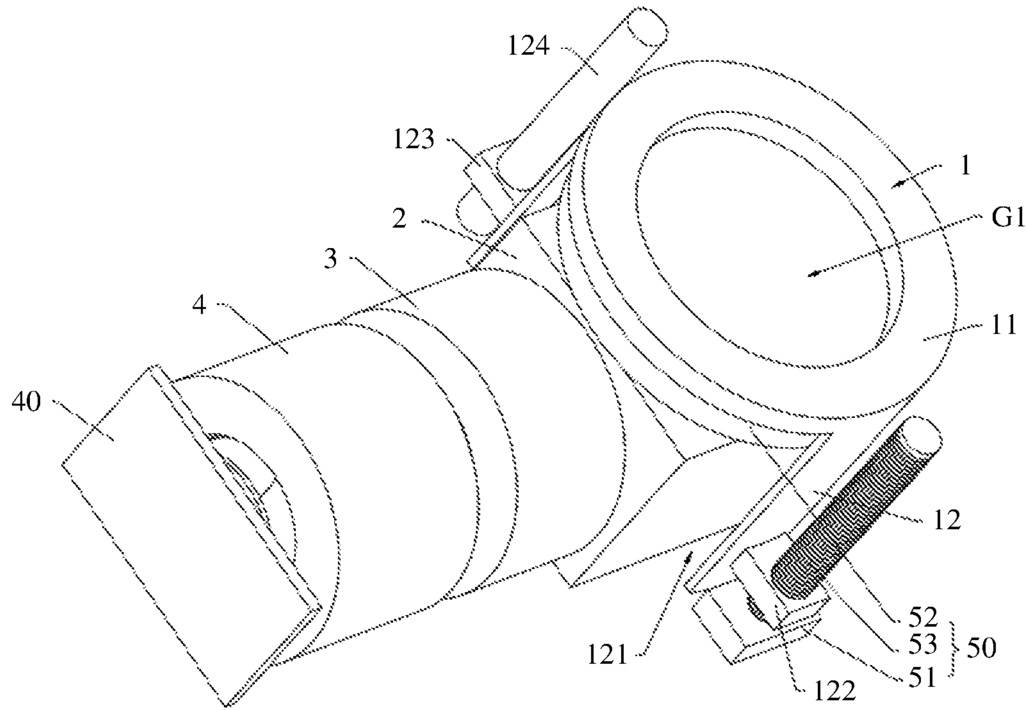
FIG. 8 is a schematic diagram of a partial structure of the camera module provided in FIG. 3 from another perspective.

In some embodiments, FIG. 8 is a schematic diagram of a partial structure of the camera module provided in FIG. 3 from another perspective. The first lens barrel 1 in the present disclosure includes a first part 11 and a second part 12 connected to the first part 11. The first component G1 is fastened to the first part 11. A gap 121 is disposed on a side wall of the second part 12. The second lens barrel 2 is partially accommodated in the second part 12 by using the gap 121, so that an object side surface of the second component G2 directly faces an image side surface of the first component G1. A side of the second part 12 that is away from the first part 11 is connected to the first drive part 50, to drive, by using the first drive part 50, the first lens barrel 1 to be close to or away from the second component G2. Certainly, in another embodiment, the second part 12 may be a support, and is connected between the first part 11 and the first drive part 50.

Specifically, the first drive part 50 includes a first motor 51, a second motor 52, and a transmission member 53. A first end of the transmission member 53 is connected to the first motor 51, and the other end thereof penetrates through a connection block 122 on the side wall of the second part 12, and is limited by the top wall 35. The first motor 51 drives the transmission member 53 to rotate, and the transmission member 53 rotates and drives the first lens barrel 1 to move in an axial direction of the transmission member 53, so that the first component G1 is close to or away from the second component G2. The second motor 52 is connected between the first part 11 and the first component G1, and is configured to perform focus adjustment on the first component G1. In other words, the first motor 51 and the second motor 52 cooperate to improve imaging quality of the optical lens 10. In this embodiment, the connection block 122 and the second part 12 may be formed integrally, or may be fixedly connected. The transmission member 53 is a transmission screw. An outer thread is disposed on an outer circumference of the transmission screw. Correspondingly, an internal thread is disposed on the connection block 122. The transmission screw is connected to the connection block 122 in a threaded manner. Certainly, in another implementation, the first drive part 50 does not merely have the structure described above, but may have another structure, provided that the first lens barrel 1 can be driven to be away from or close to the second component G2. The transmission member 53 may be a transmission member 53 with another structure, and the connection block 122 and the transmission member 53 may be connected in another connection manner.

In some embodiments, a connection part 123 is disposed on a side of the second part 12 that is opposite to the connection block 122, a slide rod 124 is disposed on a side of the second part 12 that is opposite to the transmission member 53, the slide rod 124 penetrates through the connection part 123 of the second part 12, and two ends of the slide rod 124 are fastened to the enclosure 30. Therefore, in a process in which the transmission member 53 drives the first lens barrel 1 to be away from or close to the second component G2, the first lens barrel 1 slides between the two ends of the slide rod 124, so that the first lens barrel 1 can be prevented from deviating in a movement process. In addition, two sides of the second part 12 are respectively connected to the slide rod 124 and the transmission member 53, to maintain force balance in the movement process of the first lens barrel 1, and ensure that the first lens barrel 1 is more stable in the movement process. Certainly, in another embodiment, a slide rod may be disposed on an outer side of a side wall of the second part 12 that is between the transmission member 53 and the slide rod 124, that is, a quantity of slide rods is not limited to 1. Alternatively, no slide rod may be disposed on the side of the second part 12 that is opposite to the transmission member 53.

Specifically, the first drive part is connected to the first lens barrel 1 to drive the first component G1 located in the first lens barrel 1 to be close to or away from the second component G2, the second drive part is connected to the third lens barrel 3 to drive the third component G3 located in the third lens barrel 3 to move relative to the second component G2, and the third drive part is connected to the fourth lens barrel 4 to drive the fourth component G4 located in the fourth lens barrel 4, so that the fourth component G4 moves between the third component G3 and the image side. The first drive part, the second drive part, and the third drive part respectively adjust positions of the first component G1, the third component G3, and the fourth component G4 based on a requirement, so that the first component G1, the second component G2, the third component G3, and the fourth component G4 cooperate, based on a requirement, to adjust the total track length of the optical lens 10, and the optical lens 10 is in the long-focus state, the medium-focus state, the wide-angle state, or the micro-focus state, to meet zooming range requirements in different application scenarios, and improve imaging quality of the optical lens 10.

When the first drive part, the second drive part, and the third drive part respectively drive the first component G1, the third component G3, and the fourth component G4 to perform focusing, the first drive part, the second drive part, and the third drive part respectively drive the first component G1, the third component G3, and the fourth component G4 to move relative to each other, to implement focusing. When the first drive part, the second drive part, and the third drive part respectively drive the first component G1, the third component G3, and the fourth component G4 to perform image stabilization, the first component G1, the third component G3, and the fourth component G4 are driven to move or rotate relative to the photosensitive element 20, and/or the first component G1, the third component G3, and the fourth component G4 are driven to move or rotate relative to each other, to implement optical image stabilization.

Figures 9, 10:
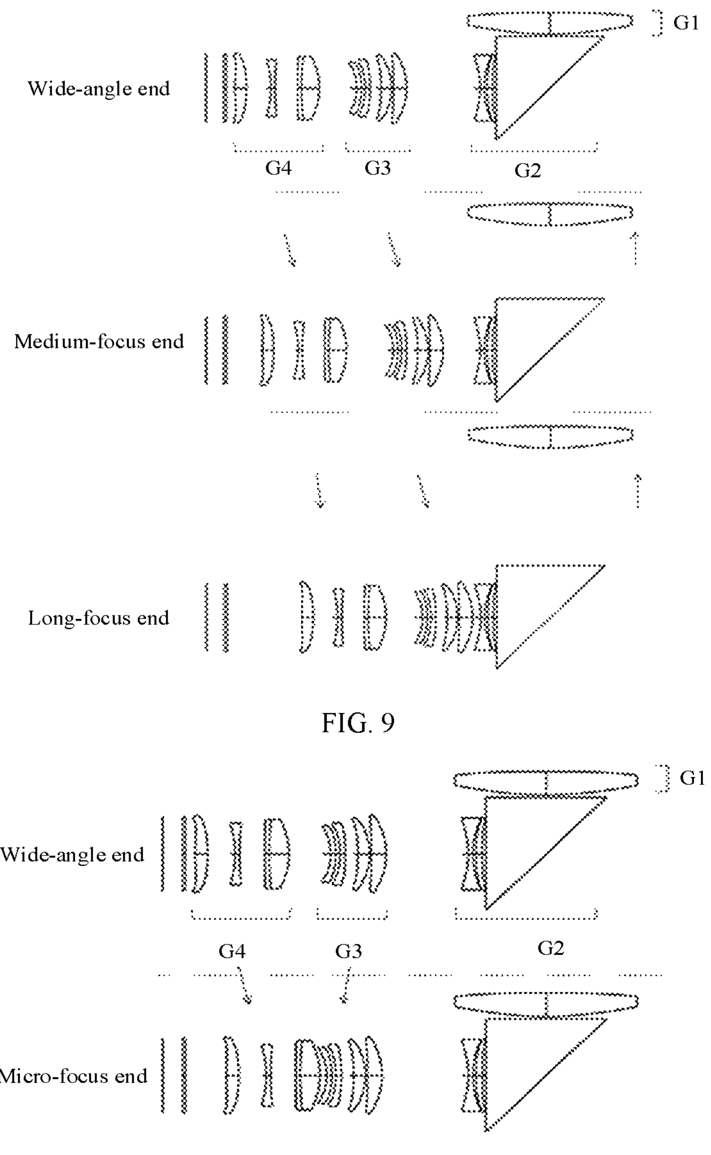
FIG. 9 is a schematic diagram of a zooming process of the optical lens shown in FIG. 6.
FIG. 10 is a schematic diagram of another zooming process of the optical lens shown in FIG. 6.

Referring to FIG. 9 and FIG. 10, when the optical lens 10 performs zooming, the first component G1, the third component G3, and the fourth component G4 separately move along the optical axis. Specifically, for example, when the optical lens 10 performs zooming from the wide-angle state to the long-focus state, the second component G2 does not move, the first component G1, the third component G3, and the fourth component G4 move towards the object side, the distance between the first component G1 and the second component G2 increases, a distance between the second component G2 and the third component G3 decreases, a distance between the third component G3 and the fourth component G4 first increases and then decreases, and the total track length of the optical lens 10 increases. When the optical lens 10 performs zooming from the wide-angle state to the micro-focus state, the second component G2 does not move, the first component G1 moves towards the image side, the third component G3 and the fourth component G4 move towards the object side, the distance between the first component G1 and the second component G2 decreases, a distance between the second component G2 and the third component G3 decreases, a distance between the third component G3 and the fourth component G4 decreases, and the total track length of the optical lens 10 decreases. In this embodiment, when the optical lens 10 is in the long-focus state and the medium-focus state, the first component G1 extends out of the housing 300 of the terminal 1000. When the optical lens 10 is in the wide-angle state and the micro-focus state, the first component G1 is accommodated inside the terminal 1000. This ensures that an internal volume that is of the terminal 1000 and that is occupied by the optical lens 10 is sufficiently small, to help implement thinning of the terminal 1000. Certainly, in another embodiment, when the optical lens 10 is in the wide-angle state, the first component G1 may extend out of the housing 300 of the terminal 1000.

In some implementations of the present disclosure, a difference between a chief ray angle existing when the optical lens 10 is in the wide-angle state and a chief ray angle existing when the optical lens 10 is in the long-focus state is less than or equal to 3 degrees, to ensure that no color shading occurs in an image, and improve imaging quality of the optical lens 10.

In some implementations of the present disclosure, a difference between the chief ray angle existing when the optical lens 10 is in the long-focus state and a chief ray angle existing when the optical lens 10 is in the micro-focus state is less than or equal to 5 degrees, to ensure that no color shading occurs in an image, and improve imaging quality of the optical lens 10.

In some implementations of the present disclosure, when the optical lens 10 is in the long-focus state, the optical lens 10 meets the following relation:

$$1.0 \leq TTL/EFL\text{max} \leq 1.7$$

where TTL is the total track length of the optical lens 10, namely, a total length from, to the imaging plane, an object side surface of a lens that is of the optical lens 10 and that is closest to the object side, and EFLmax is an effective focal length of the optical lens in the long-focus state.

Generally, the effective focal length of the optical lens 10 in the long-focus state is directly proportional to the total track length. To meet a miniaturization requirement, the total track length needs to be as small as possible, and therefore a ratio should be as small as possible. In this implementation, a range of the ratio of the total track length of the optical lens 10 to the effective focal length of the optical lens 10 in the long-focus state is specified, to ensure that the thickness of the optical lens 10 is sufficiently small to facilitate miniaturization of the optical lens 10. When the optical lens 10 is applied to the terminal 1000, smaller space of the terminal 1000 is occupied, to implement thinning of the terminal 1000.

In some implementations of the present disclosure, the optical lens 10 meets the following relation:

$$0.01 \leq IH/EFL\text{max} \leq 0.1$$

where IH is an imaging height of the optical lens 10.

The specified ratio of the imaging height of the optical lens 10 to the effective focal length of the optical lens 10 in the long-focus state represents a telephoto capability of the optical lens 10, that is, a capability that the optical lens 10 photographs an object image far away from the optical lens 10. Based on the specified ratio of the imaging height of the optical lens 10 to the effective focal length of the optical lens 10 in the long-focus state, the telephoto capability of the optical lens 10 can be ensured, to meet different photographing scenarios, and improve user experience.

In some implementations of the present disclosure, the first component G1, the second component G2, the third component G3, and the fourth component G4 have N lenses with focal power in total, a value of N is an integer greater than or equal to 7 and less than or equal to 15, and the N lenses with focal power include at least seven aspherical lenses. A quantity of lenses with focal power in the optical lens 10 is limited to 7 to 15 (including 7 and 15). Therefore, a wide zooming range and a better imaging effect of the optical lens 10 are implemented while it is ensured that a size of the optical lens 10 is sufficiently small. In addition, a quantity of aspherical lenses in the N lenses with focal power is limited to at least 7, to effectively correct aberration, ensure a photographing effect of the optical lens 10, and improve user experience.

In some implementations of the present disclosure, edge parts of some lenses in the first component G1, the second component G2, the third component G3, and the fourth component G4 may be cut to increase light flux. It may be understood that a three-dimensional coordinate system is established by using a plane of a screen of the mobile phone as an X-Y plane and a thickness of the mobile phone as a Z direction. Generally, a lens of an optical lens of the mobile phone is parallel to the X-Y plane. However, in the present disclosure, the refraction member G21 is disposed, and the lenses in the second component G2, the third component G3, and the fourth component G4 are parallel to an X-Z plane. If edge parts of some lenses are not cut, a diameter of the lens is limited to the thickness of the mobile phone, that is, a maximum size of a lens on the X-Z plane cannot be greater than the thickness of the mobile phone. If edge parts of some lenses are cut, a part of the lens on the Z-axis is cut, and a size of the lens in an X direction is not limited to a thickness on the Z-axis, so that the light flux is increased. In addition, a size of the optical lens 10 is effectively reduced, to facilitate miniaturization of the optical lens 10, and implement thinning of the terminal 1000.

In some implementations of the present disclosure, the optical lens 10 meets the following relation:

$$4\text{ mm} \leq \varphi\text{max} \leq 15\text{ mm}$$

where φmax is a diameter of a largest lens in the first component G1, the second component G2, the third component G3, and the fourth component G4.

The specified range of the diameter of the largest lens in the first component G1, the second component G2, the third component G3, and the fourth component G4 represents a size of the largest lens in the optical lens 10. When the range of the diameter of the largest lens in the first component G1, the second component G2, the third component G3, and the fourth component G4 meets the foregoing relation, miniaturization of the optical lens 10 can be facilitated. When the optical lens 10 is applied to the terminal 1000, smaller space of the terminal 1000 is occupied, to implement thinning of the terminal 1000.

In the present disclosure, different components (including the first component G1, the second component G2, the third component G3, and the fourth component G4) of the optical lens 10 have different optical performance. Components with different optical performance cooperate with each other, so that the zooming range of the optical lens 10 is sufficiently wide, the optical lens 10 has a good imaging effect, and thinning of the terminal 1000 is implemented. In some implementations of the present disclosure, the first component G1 has positive focal power, the second component G2 has negative focal power, the third component G3 has positive focal power, and the fourth component G4 has positive focal power, and the first component G1, the second component G2, the third component G3, and the fourth component G4 cooperate with each other to obtain a required optical lens 10, so that the optical lens 10 can obtain higher imaging quality.

In the present disclosure, to enable the optical lens 10 to obtain required optical performance and the zooming range of the optical lens 10 to be sufficiently wide, the components cooperate with each other, so that the optical lens 10 has a good imaging effect, and thinning of the terminal 1000 is implemented. The lenses in the components have different optical performance.

In some implementations of the present disclosure, the first component G1 meets the following relation:

$$1.0 \leq |fs_1/ft| \leq 1.7$$

where $fs_1$ is a focal length of the first component G1, and ft is a focal length of the optical lens 10 in the long-focus state.

In the foregoing relation, a range of the ratio of the focal length of the first component G1 to the focal length of the optical lens 10 in the long-focus state is specified. In this implementation, when the range of the ratio of the focal length of the first component G1 to the focal length of the optical lens 10 in the long-focus state meets the foregoing relation, the first component G1 can cooperate with another lens to obtain a required optical lens 10, so that the optical lens 10 has a wider zooming range, and can obtain better imaging.

In some implementations of the present disclosure, the second component G2 has negative focal power, and the second component G2 meets the following relation:

$$0.1 \leq |fs_2/ft| \leq 0.7$$

where $fs_2$ is a focal length of the second component G2, and ft is the focal length of the optical lens 10 in the long-focus state.

In the foregoing relation, a range of the ratio of the focal length of the second component G2 to the focal length of the optical lens 10 in the long-focus state is specified. In this implementation, when the range of the ratio of the second component G2 to the focal length of the optical lens 10 in the long-focus state meets the foregoing relation, the second component G2 can cooperate with another lens to obtain a required optical lens 10, so that the optical lens 10 has a wider zooming range, and can obtain better imaging.

In some implementations of the present disclosure, the third component G3 has positive focal power, and the third component G3 meets the following relation:

$$0.1 \leq |fs_3/ft| \leq 0.7$$

where $fs_3$ is a focal length of the third component G3, and ft is the focal length of the optical lens 10 in the long-focus state.

In the foregoing relation, a range of the ratio of the focal length of the third component G3 to the focal length of the optical lens 10 in the long-focus state is specified. In this implementation, when the range of the ratio of the third component G3 to the focal length of the optical lens 10 in the long-focus state meets the foregoing relation, the third component G3 can cooperate with another lens to obtain a required optical lens 10, so that the optical lens 10 has a wider zooming range, and can obtain better imaging.

In some implementations of the present disclosure, the fourth component G4 has positive focal power, and the fourth component G4 meets the following relation:

$$0.3 \leq |fs_4/ft| \leq 0.9$$

where $fs_4$ is a focal length of the fourth component G4, and ft is the focal length of the optical lens 10 in the long-focus state.

In the foregoing relation, a range of the ratio of the focal length of the fourth component G4 to the focal length of the optical lens 10 in the long-focus state is specified. The fourth component G4 is mainly configured to correct aberration of an optical system, to improve imaging quality. In addition, in this implementation, when the range of the ratio of the fourth component G4 to the focal length of the optical lens 10 in the long-focus state meets the foregoing relation, the fourth component G4 can cooperate with another lens to obtain a required optical lens 10, so that the optical lens 10 has a wider zooming range, and can obtain better imaging.

In some implementations of the present disclosure, the fourth component G4 includes a glued lens. The glued lens is a lens obtained by physically connecting two lenses through gluing. The glued lens is disposed in the fourth component G4, to help correct spherical aberration and chromatic aberration of the optical lens 10, so that the optical lens 10 can obtain better imaging quality.

In some implementations of the present disclosure, the optical lens 10 includes a stop, and the stop is located on an object side surface of the third component G3. In other words, the stop is located between the second component G2 and the third component G3, to limit a size of a light beam transmitted from the second component G2 to the third component G3, so as to ensure that the optical lens 10 implements a better imaging effect. Certainly, in another implementation, the stop may be disposed between other adjacent components. In some implementations of the present disclosure, an image side surface and an object side surface of each lens are aspherical surfaces, and the image side surface and the object side surface of each lens meet the following formula:

$$z = \frac{cr^2}{1 + \sqrt{1 - (1 + K)c^2 r^2}} + A_2 r^4 + A_3 r^6 + A_4 r^8 + A_5 r^{10} + A_6 r^{12}$$

where z is a vector height of the aspherical surface, r is a radial coordinate of the aspherical surface, c is a spherical curvature of a vertex on the aspherical surface, K is a conic constant, and $A_2$, $A_3$, $A_4$, $A_5$, and $A_6$ are aspherical coefficients.

Based on the foregoing relation, different aspherical lenses are obtained, so that different lenses can implement different optical effects, to implement a good photographing effect through cooperation between different aspherical lenses.

Based on the relation and the range that are given in some implementations of the present disclosure, with a configuration manner of each lens in each component and a combination of lenses with a specified optical design, the zooming range of the optical lens 10 can be sufficiently wide, the optical lens 10 has a good imaging effect, and thinning of the terminal 1000 is implemented.

The following more specifically describes some specific non-limiting examples of the implementations of the present disclosure with reference to FIG. 11 to FIG. 55.

Figure 11:
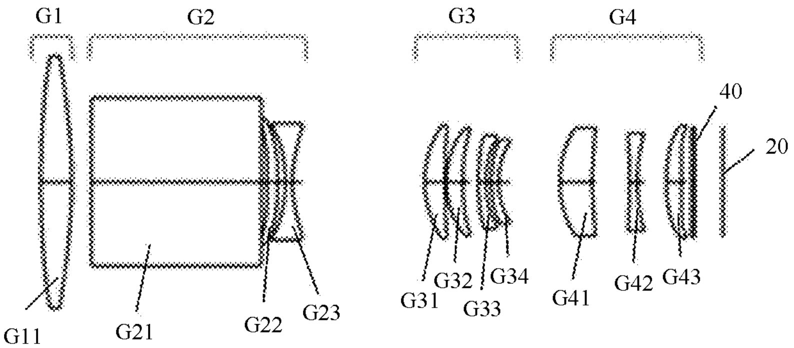
FIG. 11 is a schematic diagram of a structure of an optical lens according to Implementation 1 of the present disclosure.

FIG. 11 is a schematic diagram of a structure of an optical lens 10 according to Implementation 1 of the present disclosure. In this implementation, the optical lens 10 has four components: the first component G1, the second component G2, the third component G3, and the fourth component G4. The first component G1, the second component G2, the third component G3, and the fourth component G4 are successively disposed from the object side to the image side. In FIG. 11, to facilitate understanding of a movement relationship between the first component G1, the second component G2, the third component G3, and the fourth component G4, the first component G1, the second component G2, the third component G3, and the fourth component G4 are coaxially disposed. In FIG. 11, the refraction member G21 does not represent an actual structure, but is merely an example. Actually, the second component G2, the third component G3, and the fourth component G4 are coaxial. The refraction member G21 is located on a side of the second component G2 that faces away from the third component G3, and the first component G1 is disposed on a side of the refraction member G21 that faces away from the bottom wall 33.

When the optical lens 10 is in the long-focus state, that is, when the optical lens 10 is in a telescope state, the ratio (TTL/EFLmax) of the focal length of the first component G1 to the focal length of the optical lens 10 in the long-focus state is 1.221. The ratio (IH/EFLmax) of the imaging height of the optical lens 10 to the focal length of the optical lens 10 in the long-focus state is 0.099. The foregoing limit value ensures that the thickness of the optical lens 10 is sufficiently small, to facilitate miniaturization of the optical lens 10. When the optical lens 10 is applied to the terminal 1000, smaller space of the terminal 1000 is occupied, to implement thinning of the terminal 1000. In addition, the telephoto capability of the optical lens 10 can be ensured, to meet different photographing scenarios, and improve user experience.

The first component G1 has positive focal power, and the ratio $|fs_1/ft|$ of the focal length of the first component G1 to the focal length of the optical lens 10 in the long-focus state is 1.40. The second component G2 has negative focal power, and the ratio $|fs_2/ft|$ of the focal length of the second component G2 to the focal length of the optical lens 10 in the long-focus state is 0.28. The third component G3 has positive focal power, and the ratio $|fs_3/ft|$ of the focal length of the third component G3 to the focal length of the optical lens 10 in the long-focus state is 0.30. The fourth component G4 has positive focal power, and the ratio $|fs_4/ft|$ of the focal length of the fourth component G4 to the focal length of the optical lens 10 in the long-focus state is 0.67. Components with different optical performance cooperate with each other, so that the zooming range of the optical lens 10 is sufficiently wide, the optical lens 10 has a good imaging effect, and thinning of the terminal 1000 is implemented.

The optical lens 10 includes 11 lenses. Specifically, the first component G1 includes a first lens G11, and the $1^{st}$ lens in the first component G1 is the first lens G11. The second component G2 includes the refraction member G21, a second lens G22, and a third lens G23, the $1^{st}$ lens in the second component G2 is the refraction member G21, the $2^{nd}$ lens in the second component G2 is the second lens G22, and the $3^{rd}$ lens in the second component G2 is the third lens G23. The third component G3 includes a fourth lens G31, a fifth lens G32, a sixth lens G33, and a seventh lens G34, the $1^{st}$ lens in the third component G3 is the fourth lens G31, the $2^{nd}$ lens in the third component G3 is the fifth lens G32, the $3^{rd}$ lens in the third component G3 is the sixth lens G33, and the $4^{th}$ lens in the third component G3 is the seventh lens G34. The fourth component G4 includes an eighth lens G41, a ninth lens G42, and a tenth lens G43, the $1^{st}$ lens in the fourth component G4 is the eighth lens G41, the $2^{nd}$ lens in the fourth component G4 is the ninth lens G42, and the $3^{rd}$ lens in the fourth component G4 is the tenth lens G43. In this implementation, the diameter of the largest lens in the optical lens 10 is 13.74 mm, to ensure miniaturization of the optical lens 10.

The first lens G11 has positive focal power, the second lens G22 has positive focal power, the third lens G23 has negative focal power, the fourth lens G31 has positive focal power, the fifth lens G32 has positive focal power, the sixth lens G33 has negative focal power, the seventh lens G34 has negative focal power, the eighth lens G41 has positive focal power, the ninth lens G42 has negative focal power, and the tenth lens G43 has positive focal power. Different lenses cooperate with each other, so that the zooming range of the optical lens 10 is sufficiently wide, the optical lens 10 has a good imaging effect, and thinning of the terminal 1000 is implemented.

Figure 12:
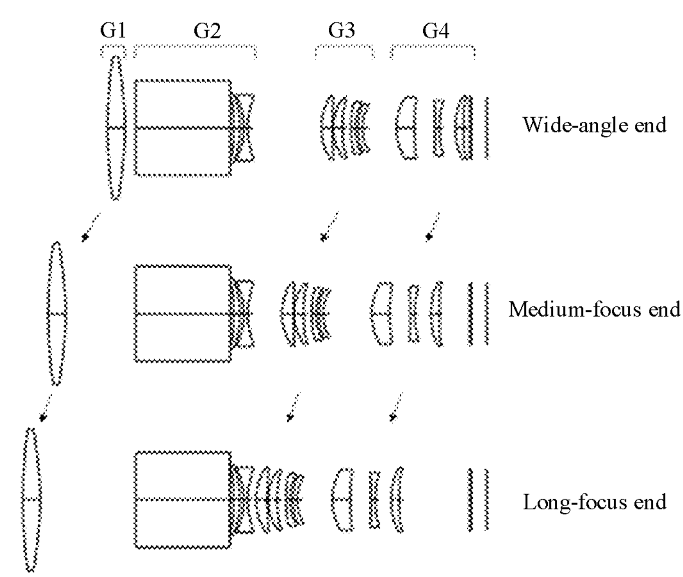
FIG. 12 is a schematic diagram of a zooming process of the optical lens shown in FIG. 11.
Figure 13:
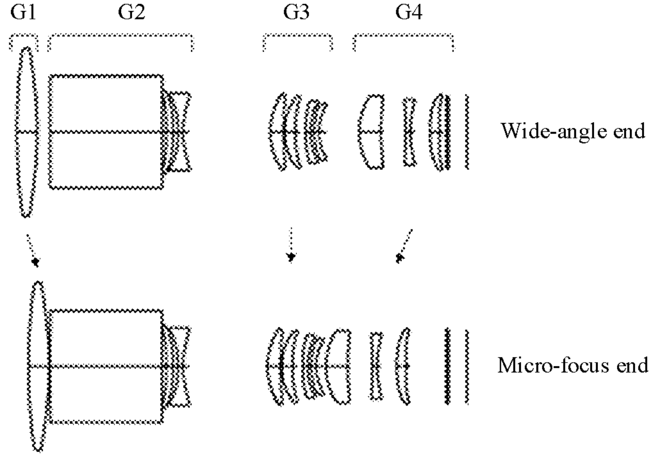
FIG. 13 is a schematic diagram of another zooming process of the optical lens shown in FIG. 11.

Referring to FIG. 12 and FIG. 13, in this implementation, when the optical lens 10 performs zooming, the first component G1, the third component G3, and the fourth component G4 separately move along the optical axis. Specifically, for example, when the optical lens 10 performs zooming from the wide-angle state to the long-focus state, the second component G2 does not move, the first component G1, the third component G3, and the fourth component G4 move towards the object side, the distance between the first component G1 and the second component G2 increases, a distance between the second component G2 and the third component G3 decreases, a distance between the third component G3 and the fourth component G4 first increases and then decreases, and the total track length of the optical lens 10 increases. When the optical lens 10 performs zooming from the wide-angle state to the micro-focus state, the second component G2 does not move, the first component G1 moves towards the image side, the third component G3 and the fourth component G4 move towards the object side, the distance between the first component G1 and the second component G2 decreases, a distance between the second component G2 and the third component G3 decreases, a distance between the third component G3 and the fourth component G4 decreases, and the total track length of the optical lens 10 decreases.

Based on the foregoing relation, basic parameters in Implementation 1 of the present disclosure are shown in the following Table 1.

TABLE 1

Basic parameters of the optical lens 10 in Implementation 1

| | W | C | T | M |
|---|---|---|---|---|
| Focal length f | 10.72 mm | 19.93 mm | 30.17 mm | 9.95 mm |
| F-number | 2.48 | 3.02 | 3.53 | 2.67 |
| Imaging height IH | 3 mm | 3 mm | 3 mm | 3 mm |
| Half FOV | 15.64° | 8.57° | 5.68° | 16.79° |
| BFL | 0.72 mm | 3.04 mm | 6.30 mm | 3.14 mm |
| Extension length | 2.73 mm | 8.50 mm | 10.97 mm | 1.76 mm |
| Fixed length | 34.1 mm | 34.1 mm | 34.1 mm | 34.1 mm |
| TTL | 36.85 mm | 42.62 mm | 45.09 mm | 35.88 mm |
| Designed wavelength | 650 nm, 610 nm, 555 nm, 510 nm, 470 nm | | | |

Meanings of symbols in the table are as follows:

W: the optical lens 10 is in the wide-angle state;

C: the optical lens 10 is in the medium-focus state;

T: the optical lens 10 is in the long-focus state;

M: the optical lens 10 is in the micro-focus state;

f: a total focal length of the optical lens 10;

extension length: the distance between the first component G1 and the second component G2; and fixed length: a distance between the refraction member G21 and the photosensitive element 20.

It should be noted that, unless otherwise specified, meanings represented by the foregoing symbols in the present disclosure are the same when the symbols subsequently occur again, and details are not described again.

Table 2 shows a curvature radius, a thickness, a refractive index, and an Abbe number of each component lens of the optical lens 10 in Implementation 1 of the present disclosure.

TABLE 2

Curvature radius, thickness, refractive index, and Abbe number of each component lens of the optical lens 10 in Implementation 1

| | R | Thickness | | nd | | Vd | |
|---|---|---|---|---|---|---|---|
| R1 | 64.846 | d1 | 1.662 | n1 | 1.49 | v1 | 70.4 |
| R2 | −29.900 | a1 | 1.071 | | | | |
| R3 | Inf | d2 | 9.164 | n2 | 2.00 | v2 | 28.3 |
| R4 | Inf | a2 | 0.320 | | | | |
| R5 | −364.927 | d3 | 0.590 | n3 | 1.67 | v3 | 19.2 |
| R6 | −18.155 | a3 | 0.396 | | | | |
| R7 | −8.760 | d4 | 0.380 | n4 | 1.54 | v4 | 56.0 |
| R8 | 5.846 | a4 | 7.161 | | | | |
| R9 | 5.606 | d5 | 1.092 | n5 | 1.59 | v5 | 68.4 |
| R10 | 42.544 | a5 | 0.083 | | | | |
| R11 | 5.112 | d6 | 0.882 | n6 | 1.54 | v6 | 56.0 |
| R12 | 16.092 | a6 | 0.850 | | | | |
| R13 | 18.901 | d7 | 0.411 | n7 | 1.67 | v7 | 19.2 |
| R14 | 6.441 | a7 | 0.279 | | | | |
| R15 | 7.096 | d8 | 0.401 | n8 | 1.67 | v8 | 19.2 |
| R16 | 5.390 | a8 | 3.295 | | | | |
| R17 | 5.592 | d9 | 1.769 | n9 | 1.54 | v9 | 59.7 |
| R18 | 24.377 | a9 | 2.015 | | | | |
| R19 | −37.443 | d10 | 0.408 | n10 | 1.83 | v10 | 37.3 |
| R20 | 9.625 | a10 | 1.576 | | | | |
| R21 | 9.742 | d11 | 0.801 | n11 | 1.67 | v11 | 19.2 |
| R22 | −491.581 | a11 | 0.530 | | | | |
| R23 | Inf | d12 | 0.211 | n12 | 1.52 | v12 | 64.2 |
| R24 | Inf | a12 | 1.500 | | | | |

Meanings of symbols in the table are as follows:

R1: a curvature radius of an object side surface of the first lens G11;

R2: a curvature radius of an image side surface of the first lens G11;

R3: a curvature radius of an object side surface of the refraction member G21;

R4: a curvature radius of an image side surface of the refraction member G21;

R5: a curvature radius of an object side surface of the second lens G22;

R6: a curvature radius of an image side surface of the second lens G22;

R7: a curvature radius of an object side surface of the third lens G23;

R8: a curvature radius of an image side surface of the third lens G23;

R9: a curvature radius of an object side surface of the fourth lens G31;

R10: a curvature radius of an image side surface of the fourth lens G31;

R11: a curvature radius of an object side surface of the fifth lens G32;

R12: a curvature radius of an image side surface of the fifth lens G32;

R13: a curvature radius of an object side surface of the sixth lens G33;

R14: a curvature radius of an image side surface of the sixth lens G33;

R15: a curvature radius of an object side surface of the seventh lens G34;

R16: a curvature radius of an image side surface of the seventh lens G34;

R17: a curvature radius of an object side surface of the eighth lens G41;

R18: a curvature radius of an image side surface of the eighth lens G41;

R19: a curvature radius of an object side surface of the ninth lens G42;

R20: a curvature radius of an image side surface of the ninth lens G42;

R21: a curvature radius of an object side surface of the tenth lens G43;

R22: a curvature radius of an image side surface of the tenth lens G43;

R23: a curvature radius of an object side surface of the infrared filter 40;

R24: a curvature radius of an image side surface of the infrared filter 40;

d1: an on-axis thickness of the first lens G11;

d2: an on-axis thickness of the refraction member G21;

d3: an on-axis thickness of the second lens G22;

d4: an on-axis thickness of the third lens G23;

d5: an on-axis thickness of the fourth lens G31;

d6: an on-axis thickness of the fifth lens G32;

d7: an on-axis thickness of the sixth lens G33;

d8: an on-axis thickness of the seventh lens G34;

d9: an on-axis thickness of the eighth lens G41;

d10: an on-axis thickness of the ninth lens G42;

d11: an on-axis thickness of the tenth lens G43;

d12: an on-axis thickness of the filter;

a1: an on-axis distance between the image side surface of the first lens G11 and the object side surface of the refraction member G21;

a2: an on-axis distance between the image side surface of the refraction member G21 and the object side surface of the second lens G22;

a3: an on-axis distance between the image side surface of the second lens G22 and the object side surface of the third lens G23;

a4: an on-axis distance between the image side surface of the third lens G23 and the object side surface of the fourth lens G31;

a5: an on-axis distance between the image side surface of the fourth lens G31 and the object side surface of the fifth lens G32;

a6: an on-axis distance between the image side surface of the fifth lens G32 and the object side surface of the sixth lens G33;

a7: an on-axis distance between the image side surface of the sixth lens G33 and the object side surface of the seventh lens G34;

a8: an on-axis distance between the image side surface of the seventh lens G34 and the object side surface of the eighth lens G41;

a9: an on-axis distance between the image side surface of the eighth lens G41 and the object side surface of the ninth lens G42;

a10: an on-axis distance between the image side surface of the ninth lens G42 and the object side surface of the tenth lens G43;

a11: an on-axis distance between the image side surface of the tenth lens G43 and the object side surface of the infrared filter 40;

a12: an on-axis distance between the image side surface of the infrared filter 40 and the object side surface of the photosensitive element 20;

n1: a refractive index of the first lens G11;

n2: a refractive index of the refraction member G21;

n3: a refractive index of the second lens G22;

n4: a refractive index of the third lens G23;

n5: a refractive index of the fourth lens G31;

n6: a refractive index of the fifth lens G32;

n7: a refractive index of the sixth lens G33;

n8: a refractive index of the seventh lens G34;

n9: a refractive index of the eighth lens G41;

n10: a refractive index of the ninth lens G42;

n11: a refractive index of the tenth lens G43;

n12: a refractive index of the infrared filter 40;

v1: an Abbe number of the first lens G11;

v2: an Abbe number of the refraction member G21;

v3: an Abbe number of the second lens G22;

v4: an Abbe number of the third lens G23;

v5: an Abbe number of the fourth lens G31;

v6: an Abbe number of the fifth lens G32;

v7: an Abbe number of the sixth lens G33;

v8: an Abbe number of the seventh lens G34;

v9: an Abbe number of the eighth lens G41;

v10: an Abbe number of the ninth lens G42;

v11: an Abbe number of the tenth lens G43; and v12: an Abbe number of the infrared filter 40.

It should be noted that, unless otherwise specified, meanings represented by the foregoing symbols in the present disclosure are the same when the symbols subsequently occur again, and details are not described again. A positive or negative curvature radius indicates that an optical surface is convex towards the object side or the image side. When the optical surface (including the object side surface or the image side surface) is convex towards the object side, a curvature radius of the optical surface is a positive value. When the optical surface (including the object side surface or the image side surface) is convex towards the image side, it is equivalent to that the optical surface is concave towards the object side, and a curvature radius of the optical surface is a negative value.

Table 3 shows aspherical coefficients of the optical lens 10 in this implementation. In this embodiment, there are 14 aspherical surfaces in the optical lens 10, and details are shown in Table 3.

TABLE 3

Aspherical coefficients of the optical lens 10 in Implementation 1

| | Type | K | A2 | A3 | A4 | A5 | A6 |
|---|---|---|---|---|---|---|---|
| R1 | Even aspherical surface | 0.00E+00 | 5.03E−05 | 1.95E−07 | 6.80E−09 | −2.03E−10 | 1.16E−12 |
| R2 | Even aspherical surface | 0.00E+00 | 6.56E−05 | 1.77E−07 | 4.53E−09 | −2.02E−10 | 1.37E−12 |
| R5 | Even aspherical surface | 0.00E+00 | −4.38E−03 | 1.27E−04 | 5.52E−06 | −6.16E−07 | 4.52E−08 |
| R6 | Even aspherical surface | 0.00E+00 | −3.59E−03 | −2.24E−06 | 1.54E−05 | −9.07E−07 | 4.69E−08 |
| R7 | Even aspherical surface | 0.00E+00 | −2.60E−03 | 1.34E−04 | −1.47E−05 | 1.60E−06 | −5.94E−08 |
| R8 | Even aspherical surface | 0.00E+00 | −5.58E−03 | 4.59E−04 | −4.44E−05 | 2.81E−06 | −7.92E−08 |
| R11 | Even aspherical surface | 0.00E+00 | 2.47E−05 | 8.18E−05 | 3.67E−06 | 2.82E−07 | −3.42E−08 |
| R12 | Even aspherical surface | 0.00E+00 | 1.88E−03 | 8.68E−05 | 1.77E−06 | −1.23E−06 | 3.62E−08 |
| R13 | Even aspherical surface | 0.00E+00 | 3.56E−03 | −3.28E−05 | 8.45E−06 | −1.96E−06 | 3.82E−08 |

TABLE 3-continued

| Aspherical coefficients of the optical lens 10 in Implementation 1 | | | | | | | |
|---|---|---|---|---|---|---|---|
| | Type | K | A2 | A3 | A4 | A5 | A6 |
| R14 | Even aspherical surface | 0.00E+00 | −1.32E−03 | 7.13E−04 | 7.22E−05 | 3.20E−06 | −1.58E−07 |
| R15 | Even aspherical surface | 0.00E+00 | 8.63E−04 | 3.95E−04 | 6.81E−05 | 2.16E−06 | −9.15E−07 |
| R16 | Even aspherical surface | 0.00E+00 | 7.88E−03 | −3.22E−05 | −5.18E−06 | 5.83E−07 | −7.43E−07 |
| R21 | Even aspherical surface | 0.00E+00 | 1.40E−03 | 3.55E−07 | 2.98E−05 | −3.41E−06 | 2.40E−07 |
| R22 | Even aspherical surface | 0.00E+00 | 1.85E−03 | −4.37E−05 | 4.86E−05 | −5.89E−06 | 4.02E−07 |

K is a conic constant, and symbols such as $A_2$, $A_3$, $A_4$, $A_5$, and $A_6$ represent the aspherical coefficients. It should be noted that each parameter in the table is represented through scientific notation. For example, −1.07E-01 means $-1.07\times10^{-1}$, and −4.11E-02 means $-4.11\times10^{-2}$. It should be noted that, unless otherwise explained, when symbols such as K, $A_2$, $A_3$, $A_4$, $A_5$, and $A_6$ in the present disclosure subsequently occur again, the symbols represent same meanings as those herein, and details are not described again below.

The foregoing parameters are substituted into the following formula:

$$z = \frac{cr^2}{1+\sqrt{1-(1+K)c^2r^2}} + A_2r^4 + A_3r^6 + A_4r^8 + A_5r^{10} + A_6r^{12}$$

Each lens of the optical lens 10 in this implementation can be designed and obtained, where z is a vector height of the aspherical surface, r is a radial coordinate of the aspherical surface, and c is a spherical curvature of a vertex on the aspherical surface.

In this implementation, different lenses of the optical lens 10 that are designed by using the foregoing parameters can play different roles, so that the optical lens 10 with good imaging quality is obtained through cooperation between the lenses.

Table 4 shows object distances and component distances of the optical lens 10 in the long-focus state, the medium-focus state, the wide-angle state, and the micro-focus state in this implementation, as shown in Table 4.

TABLE 4

| Object distances and component distances of the optical lens 10 in the long-focus state, the medium-focus state, the wide-angle state, and the micro-focus state in Implementation 1 | | | | |
|---|---|---|---|---|
| | W | C | T | M |
| a0 | Inf | Inf | Inf | 50 mm |
| a1 | 1.07 mm | 6.84 mm | 9.30 mm | 0.10 mm |
| a4 | 7.16 mm | 3.35 mm | 0.83 mm | 6.94 mm |
| a8 | 3.30 mm | 4.71 mm | 3.40 mm | 0.81 mm |
| a11 | 0.53 mm | 2.93 mm | 6.76 mm | 3.25 mm |

FIG. 14 to FIG. 25 are characterization diagrams of optical performance of the optical lens 10 in Implementation 1.

Figure 14:
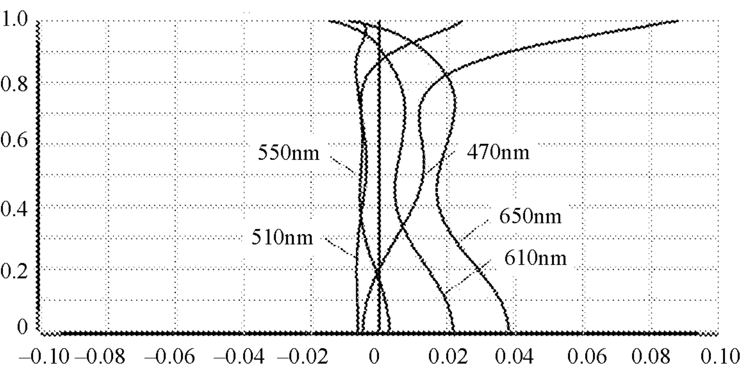
FIG. 14 is a schematic diagram of axial chromatic aberration of an optical lens in a long-focus state according to Implementation 1 of the present disclosure.
Figure 15:
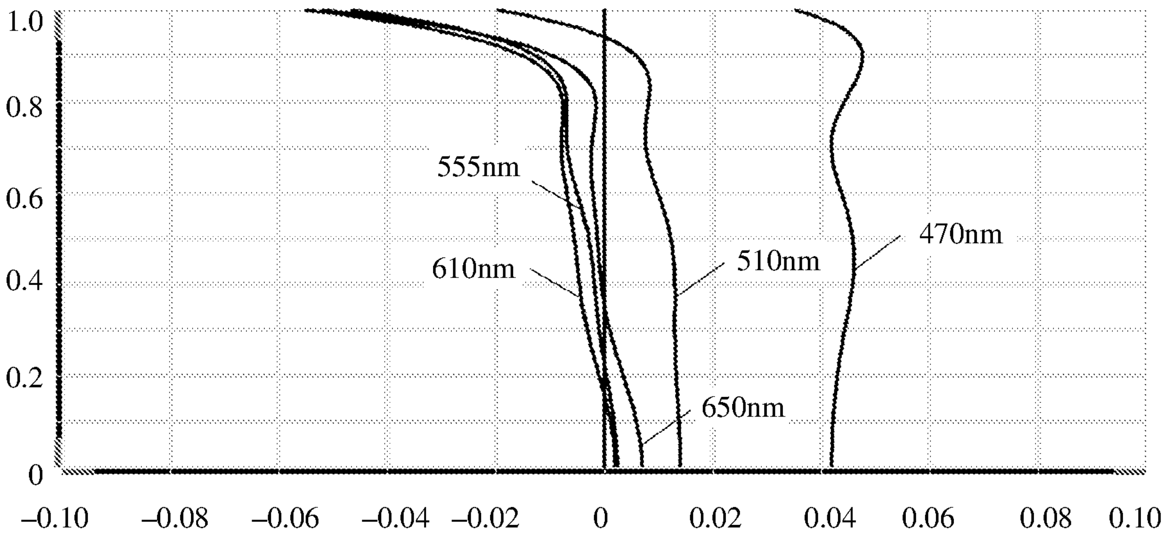
FIG. 15 is a schematic diagram of axial chromatic aberration of an optical lens in a medium-focus state according to Implementation 1 of the present disclosure.
Figure 16:
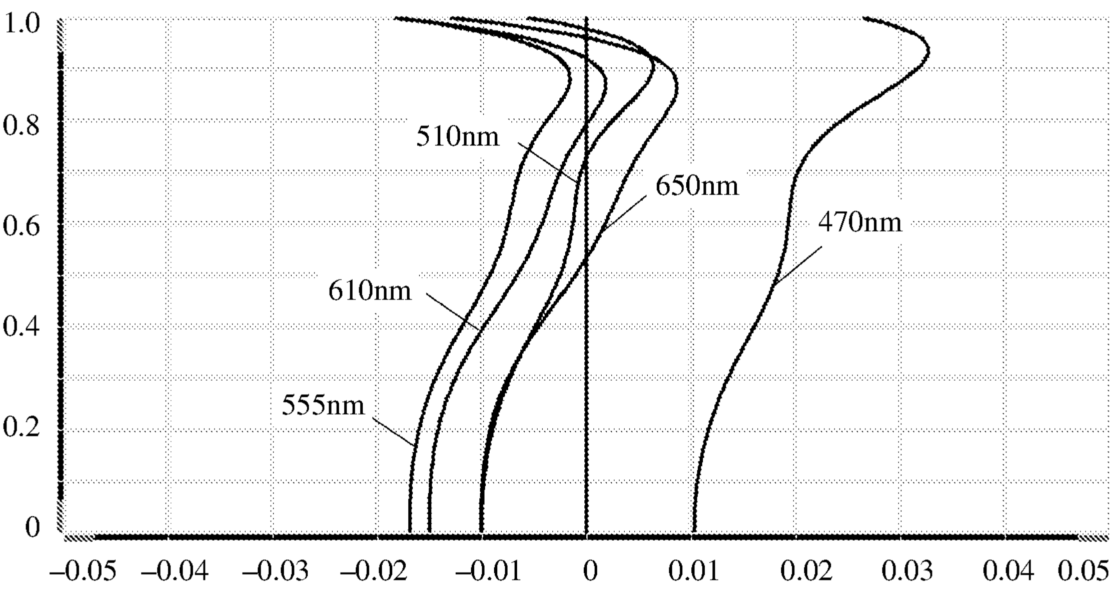
FIG. 16 is a schematic diagram of axial chromatic aberration of an optical lens in a wide-angle state according to Implementation 1 of the present disclosure.
Figure 17:
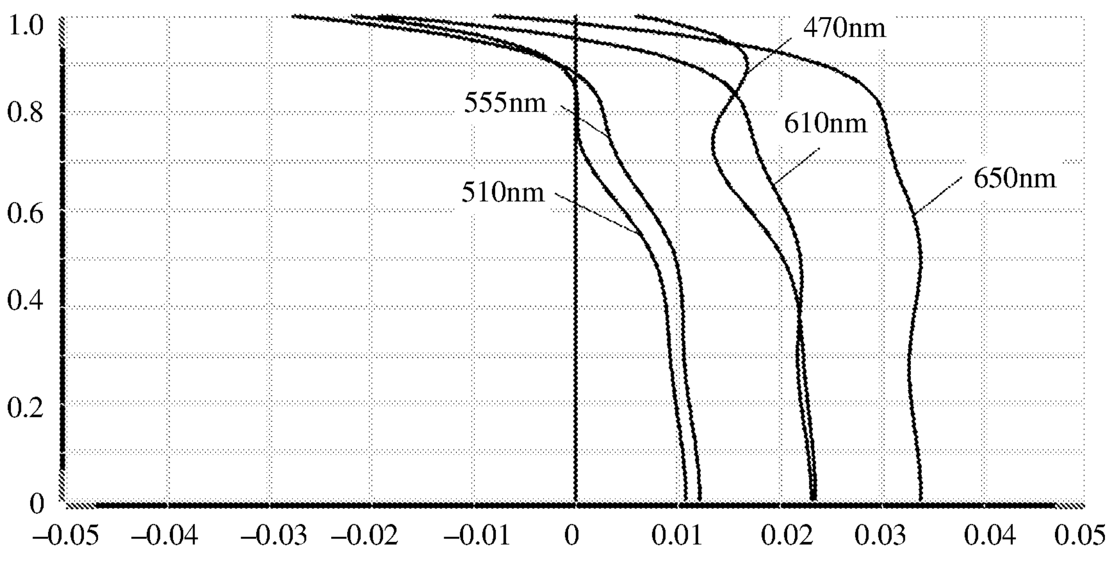
FIG. 17 is a schematic diagram of axial chromatic aberration of an optical lens in a micro-focus state according to Implementation 1 of the present disclosure.

Specifically, FIG. 14 shows axial chromatic aberration of the optical lens 10 in the long-focus state after light with wavelengths that are respectively 650 nm, 610 nm, 555 nm, 510 nm, and 470 nm passes through the optical lens 10 in Implementation 1. FIG. 15 shows axial chromatic aberration of the optical lens 10 in the medium-focus state after light with wavelengths that are respectively 650 nm, 610 nm, 555 nm, 510 nm, and 470 nm passes through the optical lens 10 in Implementation 1. FIG. 16 shows axial chromatic aberration of the optical lens 10 in the wide-angle state after light with wavelengths that are respectively 650 nm, 610 nm, 555 nm, 510 nm, and 470 nm passes through the optical lens 10 in Implementation 1. FIG. 17 shows axial chromatic aberration of the optical lens 10 in the micro-focus state after light with wavelengths that are respectively 650 nm, 610 nm, 555 nm, 510 nm, and 470 nm passes through the optical lens 10 in Implementation 1. In FIG. 14 to FIG. 17, a vertical coordinate represents a normalized pupil coordinate, a horizontal coordinate represents chromatic aberration in an axial direction, and a unit is millimeter. It may be learned from FIG. 14 to FIG. 17 that, in this implementation, axial chromatic aberration of the optical lens 10 in each state is controlled within a very small range.

Figure 18:
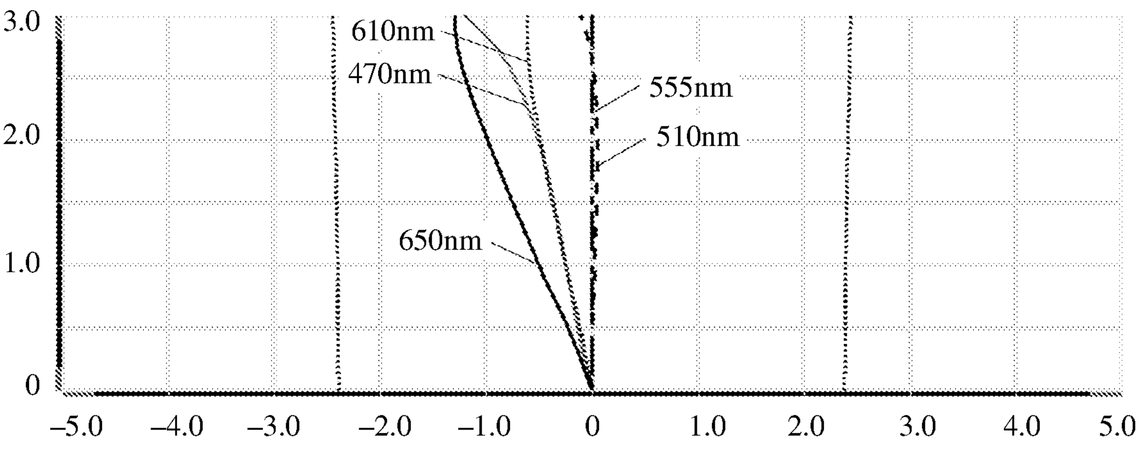
FIG. 18 is a schematic diagram of lateral chromatic aberration of an optical lens in a long-focus state according to Implementation 1 of the present disclosure.
Figure 19:
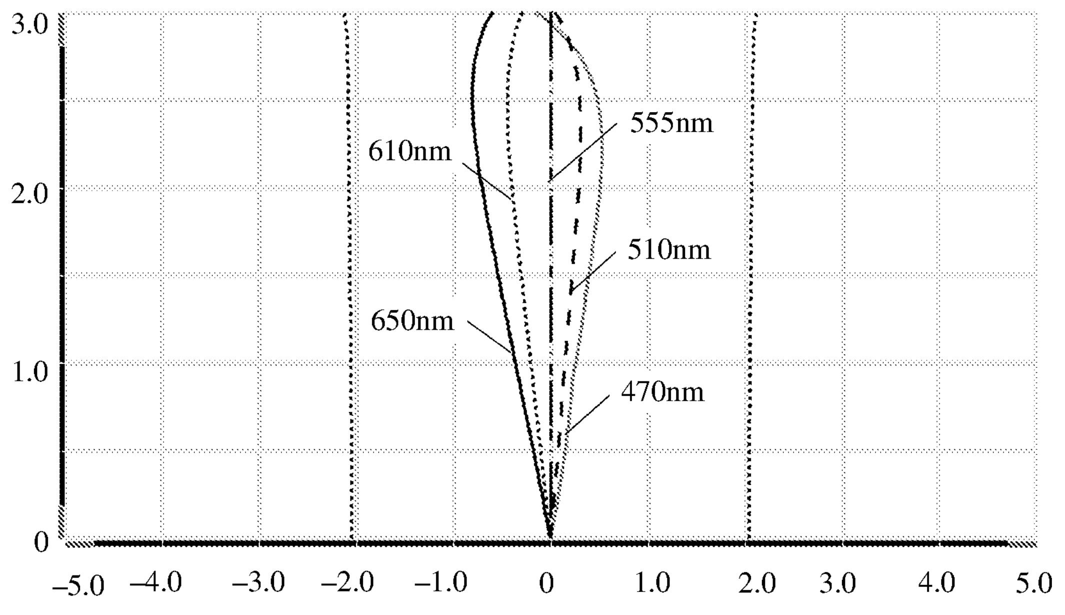
FIG. 19 is a schematic diagram of lateral chromatic aberration of an optical lens in a medium-focus state according to Implementation 1 of the present disclosure.
Figure 20:
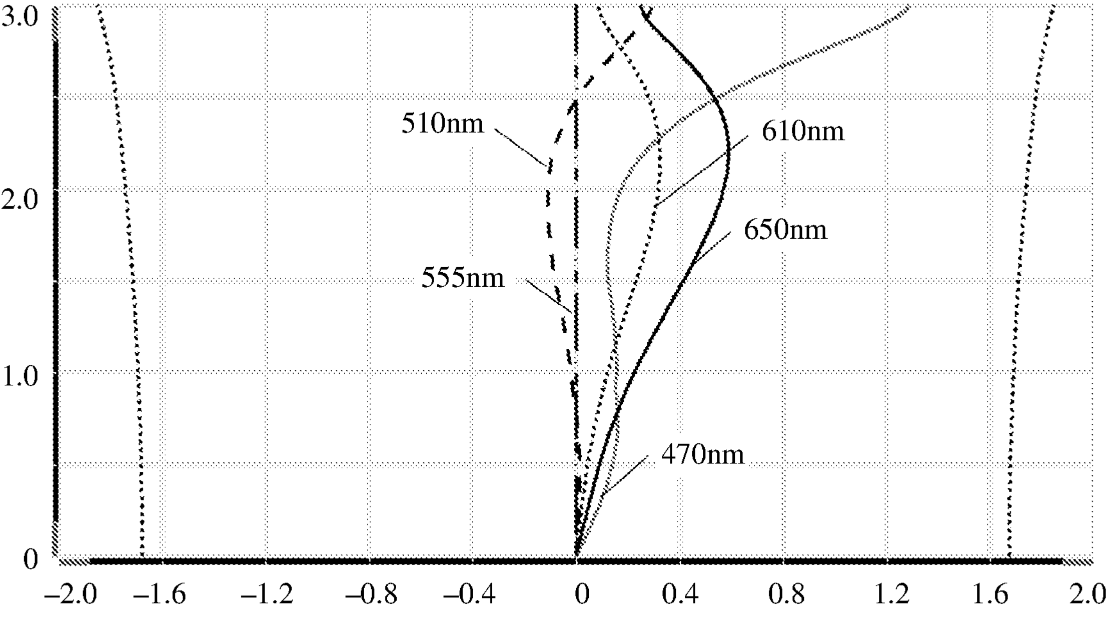
FIG. 20 is a schematic diagram of lateral chromatic aberration of an optical lens in a wide-angle state according to Implementation 1 of the present disclosure.
Figure 21:
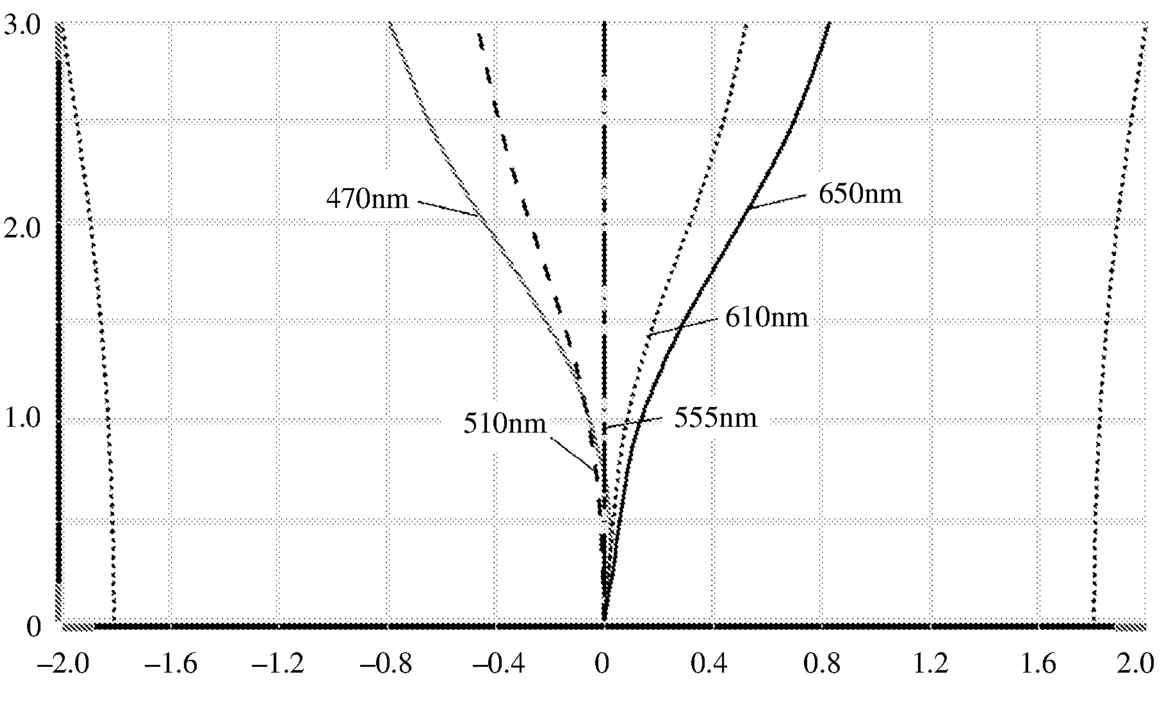
FIG. 21 is a schematic diagram of lateral chromatic aberration of an optical lens in a micro-focus state according to Implementation 1 of the present disclosure.
Figure 22:
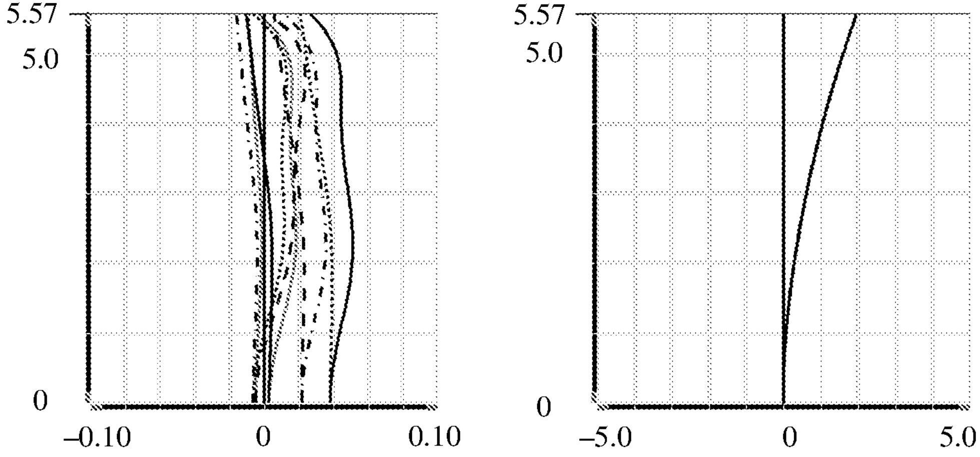
FIG. 22 is a schematic diagram of field curvature and optical distortion of an optical lens in a long-focus state according to Implementation 1 of the present disclosure.
Figure 23:
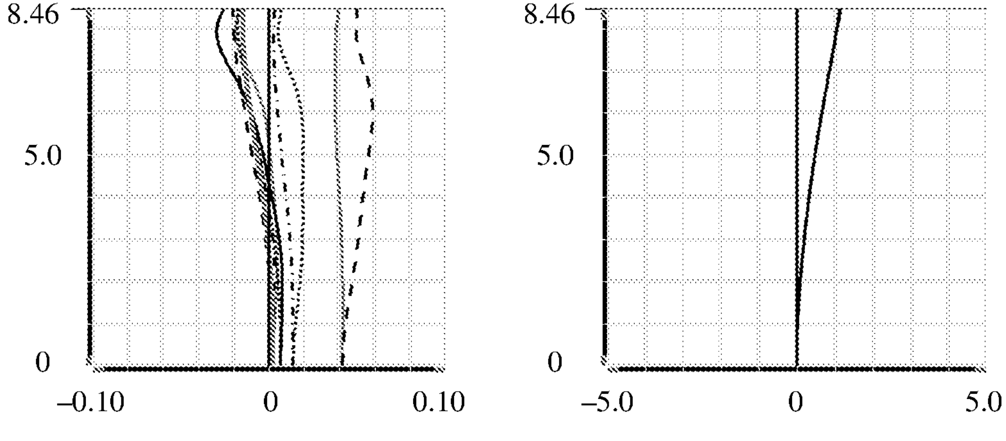
FIG. 23 is a schematic diagram of field curvature and optical distortion of an optical lens in a medium-focus state according to Implementation 1 of the present disclosure.
Figure 24:
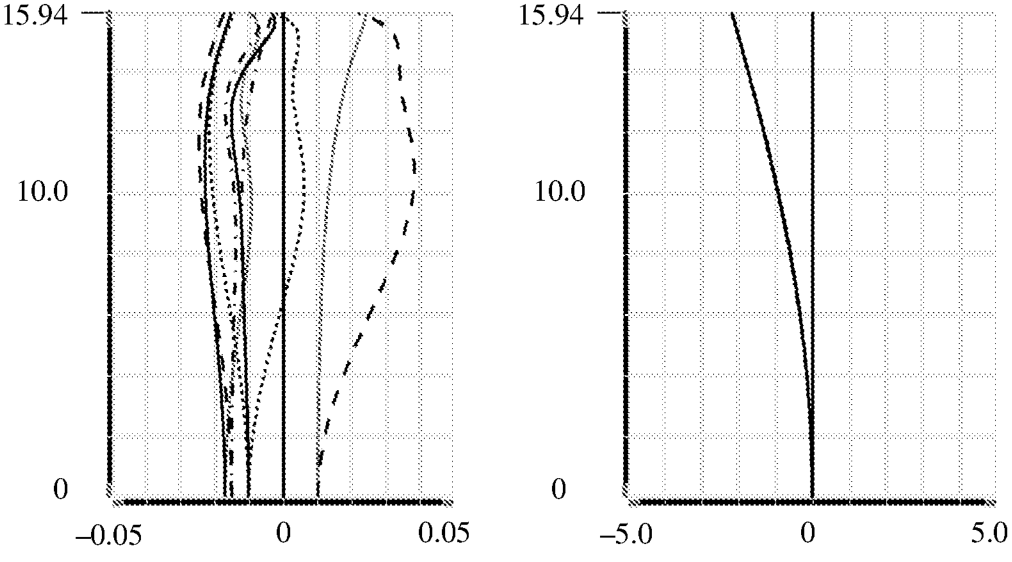
FIG. 24 is a schematic diagram of field curvature and optical distortion of an optical lens in a wide-angle state according to Implementation 1 of the present disclosure.
Figure 25:
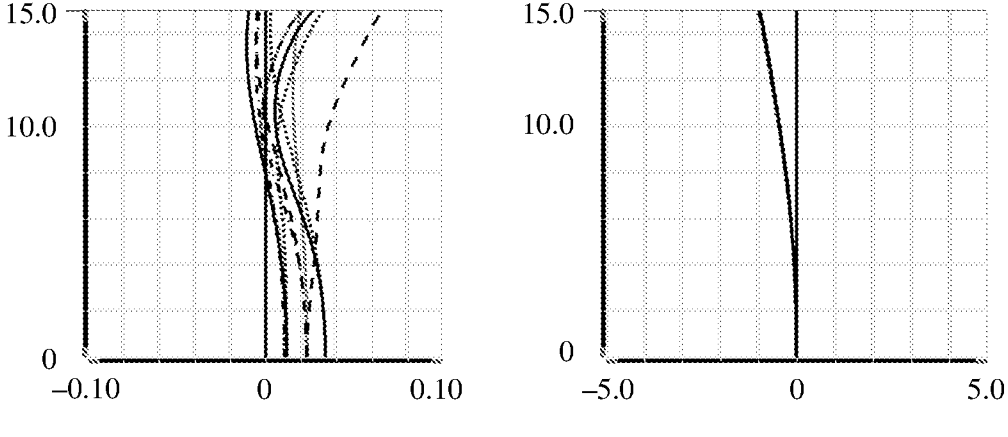
FIG. 25 is a schematic diagram of field curvature and optical distortion of an optical lens in a micro-focus state according to Implementation 1 of the present disclosure.

FIG. 18 shows lateral chromatic aberration of the optical lens 10 in the long-focus state after light with wavelengths that are respectively 650 nm, 610 nm, 555 nm, 510 nm, and 470 nm passes through the optical lens 10 in Implementation 1. FIG. 19 shows lateral chromatic aberration of the optical lens 10 in the medium-focus state after light with wavelengths that are respectively 650 nm, 610 nm, 555 nm, 510 nm, and 470 nm passes through the optical lens 10 in Implementation 1. FIG. 20 shows lateral chromatic aberration of the optical lens 10 in the wide-angle state after light with wavelengths that are respectively 650 nm, 610 nm, 555 nm, 510 nm, and 470 nm passes through the optical lens 10 in Implementation 1. FIG. 21 shows lateral chromatic aberration of the optical lens 10 in the micro-focus state after light with wavelengths that are respectively 650 nm, 610 nm, 555 nm, 510 nm, and 470 nm passes through the optical lens 10 in Implementation 1. In FIG. 18 to FIG. 21, a vertical coordinate represents a field of view angle in a unit of degree (°), a horizontal coordinate is in a unit of micrometer (μm), and an unmarked dotted line represents a diffraction limit. In FIG. 18 to FIG. 21, the dotted line represents a diffraction limit range of the optical lens 10. It may be learned from FIG. 18 to FIG. 21 that lateral chromatic aberration of the optical lens 10 in each state after light with each wavelength passes through the optical lens 10 in Implementation 1 is basically within the diffraction limit, that is, lateral chromatic aberration of the optical lens 10 in each state after light with each wavelength passes through the optical lens 10 in Implementation 1 basically does not affect imaging quality of the optical lens 10.

FIG. 22 to FIG. 25 are respectively schematic diagrams of optical distortion of the optical lens 10 in the long-focus state, the medium-focus state, the wide-angle state, and the micro-focus state, to indicate a difference between a deformed image and an ideal shape after light passes through the optical lens 10. Solid lines in the left figures of FIG. 22 to FIG. 25 are respectively schematic diagrams of field curvature in a meridian direction in the long-focus state, the medium-focus state, the wide-angle state, and the micro-focus state after light of 555 nm passes through the optical lens 10. Dashed/dotted lines in FIG. 22 to FIG. 25 are respectively schematic diagrams of field curvature in a sagittal direction in the long-focus state, the medium-focus state, the wide-angle state, and the micro-focus state after light of 555 nm passes through the optical lens 10. Right figures of FIG. 22 to FIG. 25 are respectively schematic diagrams of optical distortion in the long-focus state, the medium-focus state, the wide-angle state, and the micro-focus state after light of 555 nm passes through the optical lens 10 in Implementation 1. It may be learned from FIG. 22 to FIG. 25, in this implementation, the optical system controls distortion to be within a range in which distortion can be identified by the naked eye.

In the optical lens 10 provided in this implementation, with a configuration manner of each lens in each component and a combination of lenses with a specified optical design, the optical lens 10 can be miniaturized and the zooming range thereof can be sufficiently wide, the optical lens 10 has a good imaging effect, and thinning of the terminal 1000 is implemented.

Figure 26:
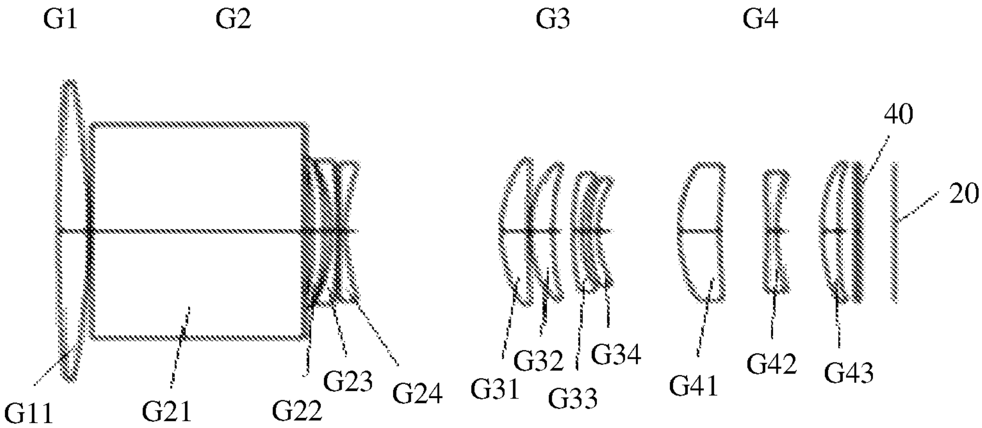
FIG. 26 is a schematic diagram of a structure of an optical lens according to Implementation 2 of the present disclosure.

FIG. 26 is a schematic diagram of a structure of an optical lens 10 according to Implementation 2 of the present disclosure. In this implementation, the optical lens 10 has four components: the first component G1, the second component G2, the third component G3, and the fourth component G4. The first component G1, the second component G2, the third component G3, and the fourth component G4 are successively disposed from the object side to the image side. In FIG. 26, to facilitate understanding of a movement relationship between the first component G1, the second component G2, the third component G3, and the fourth component G4, the first component G1, the second component G2, the third component G3, and the fourth component G4 are coaxially disposed. In FIG. 26, the refraction member G21 does not represent an actual structure, but is merely an example. Actually, the second component G2, the third component G3, and the fourth component G4 are coaxial. The refraction member G21 is located on a side of the second component G2 that faces away from the third component G3, and the first component G1 is disposed on a side of the refraction member G21 that faces away from the bottom wall 33.

When the optical lens 10 is in the long-focus state, that is, when the optical lens 10 is in a telescope state, the ratio (TTL/EFLmax) of the focal length of the first component G1 to the focal length of the optical lens 10 in the long-focus state is 1.478. The ratio (IH/EFLmax) of the imaging height of the optical lens 10 to the focal length of the optical lens 10 in the long-focus state is 0.097. The foregoing limit value ensures that the thickness of the optical lens 10 is sufficiently small, to facilitate miniaturization of the optical lens 10. When the optical lens 10 is applied to the terminal 1000, smaller space of the terminal 1000 is occupied, to implement thinning of the terminal 1000. In addition, the telephoto capability of the optical lens 10 can be ensured, to meet different photographing scenarios, and improve user experience.

The first component G1 has positive focal power, and the ratio $|fs_1/ft|$ of the focal length of the first component G1 to the focal length of the optical lens 10 in the long-focus state is 1.49. The second component G2 has negative focal power, and the ratio $|fs_2/ft|$ of the focal length of the second component G2 to the focal length of the optical lens 10 in the long-focus state is 0.301. The third component G3 has positive focal power, and the ratio $|fs_3/ft|$ of the focal length of the third component G3 to the focal length of the optical lens 10 in the long-focus state is 0.313. The fourth component G4 has positive focal power, and the ratio $|fs_4/ft|$ of the focal length of the fourth component G4 to the focal length of the optical lens 10 in the long-focus state is 0.723. Components with different optical performance cooperate with each other, so that the zooming range of the optical lens 10 is sufficiently wide, the optical lens 10 has a good imaging effect, and thinning of the terminal 1000 is implemented.

The optical lens 10 includes 12 lenses. Specifically, the first component G1 includes a first lens G11, and the $1^{st}$ lens in the first component G1 is the first lens G11. The second component G2 includes the refraction member G21, a second lens G22, a third lens G23, and an eleventh lens G24, the $1^{st}$ lens in the second component G2 is the refraction member G21, the $2^{nd}$ lens in the second component G2 is the second lens G22, the $3^{rd}$ lens in the second component G2 is the third lens G23, and the $4^{th}$ lens in the second component G2 is the eleventh lens G24. The third component G3 includes a fourth lens G31, a fifth lens G32, a sixth lens G33, and a seventh lens G34, the $1^{st}$ lens in the third component G3 is the fourth lens G31, the $2^{nd}$ lens in the third component G3 is the fifth lens G32, the $3^{rd}$ lens in the third component G3 is the sixth lens G33, and the $4^{th}$ lens in the third component G3 is the seventh lens G34. The fourth component G4 includes an eighth lens G41, a ninth lens G42, and a tenth lens G43, the $1^{st}$ lens in the fourth component G4 is the eighth lens G41, the $2^{nd}$ lens in the fourth component G4 is the ninth lens G42, and the $3^{rd}$ lens in the fourth component G4 is the tenth lens G43. In this implementation, the diameter of the largest lens in the optical lens 10 is 12.79 mm, to ensure miniaturization of the optical lens 10.

The first lens G11 has positive focal power, the second lens G22 has positive focal power, the third lens G23 has negative focal power, the fourth lens G31 has positive focal power, the fifth lens G32 has positive focal power, the sixth lens G33 has negative focal power, the seventh lens G34 has negative focal power, the eighth lens G41 has positive focal power, the ninth lens G42 has negative focal power, the tenth lens G43 has positive focal power, and the eleventh lens G24 has negative focal power. Different lenses cooperate with each other, so that the zooming range of the optical lens 10 is sufficiently wide, the optical lens 10 has a good imaging effect, and thinning of the terminal 1000 is implemented.

Figure 28:
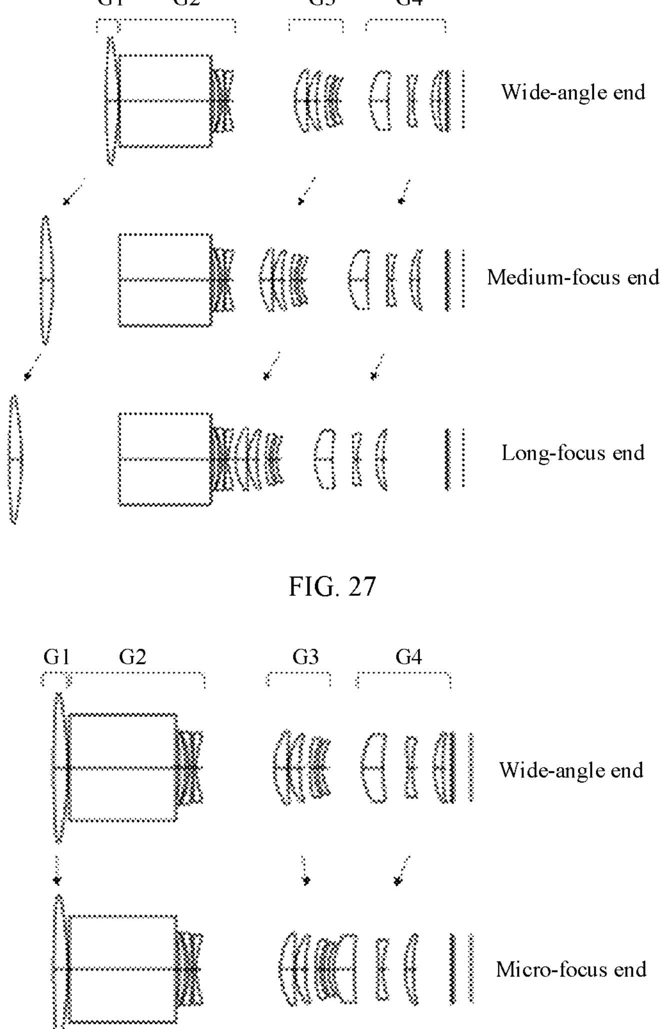
FIG. 28 is a schematic diagram of another zooming process of the optical lens shown in FIG. 26.

Referring to FIG. 27 and FIG. 28, in this implementation, when the optical lens 10 performs zooming, the first component G1, the third component G3, and the fourth component G4 separately move along the optical axis. Specifically, for example, when the optical lens 10 performs zooming from the wide-angle state to the long-focus state, the second component G2 does not move, the first component G1, the third component G3, and the fourth component G4 move towards the object side, the distance between the first component G1 and the second component G2 increases, a distance between the second component G2 and the third component G3 decreases, a distance between the third component G3 and the fourth component G4 first increases and then decreases, and the total track length of the optical lens 10 increases. When the optical lens 10 performs zooming from the wide-angle state to the micro-focus state, the second component G2 does not move, the first component G1 moves towards the image side, the third component G3 and the fourth component G4 move towards the object side, the distance between the first component G1 and the second component G2 decreases, a distance between the second component G2 and the third component G3 decreases, a distance between the third component G3 and the fourth component G4 decreases, and the total track length of the optical lens 10 decreases.

Based on the foregoing relation, basic parameters in Implementation 2 of the present disclosure are shown in the following Table 5.

TABLE 5

| Basic parameters of the optical lens 10 in Implementation 2 | | | | |
|---|---|---|---|---|
| | W | C | T | M |
| Focal length f | 11.58 mm | 20.43 mm | 30.82 mm | 10.22 mm |
| F-number | 2.65 | 3.17 | 3.67 | 2.77 |
| Imaging height IH | 3 mm | 3 mm | 3 mm | 3 mm |
| Half FOV | 14.53° | 8.36° | 5.56° | 16.37° |
| BFL | 0.71 mm | 2.81 mm | 6.29 mm | 3.20 mm |
| Extension length | 1.33 mm | 7.89 mm | 11.06 mm | 1.32 mm |
| Fixed length | 34.5 mm | 34.5 mm | 34.5 mm | 34.5 mm |
| TTL | 35.83 mm | 42.40 mm | 45.56 mm | 35.82 mm |
| Designed wavelength | 650 nm, 610 nm, 555 nm, 510 nm, 470 nm | | | |

Table 6 shows a curvature radius, a thickness, a refractive index, and an Abbe number of each component lens of the optical lens 10 in Implementation 2 of the present disclosure, as shown in Table 6.

TABLE 6

| Curvature radius, thickness, refractive index, and Abbe number of each component lens of the optical lens 10 in Implementation 2 | | | | | | | |
|---|---|---|---|---|---|---|---|
| | R | Thickness | | nd | | Vd | |
| R1 | 118.156 | d1 | 1.208 | n1 | 1.49 | v1 | 81.8 |
| R2 | −27.423 | a1 | 0.125 | | | | |
| R3 | Inf | d2 | 9.164 | n2 | 2.00 | v2 | 28.3 |
| R4 | Inf | a2 | 0.292 | | | | |
| R5 | −100.261 | d3 | 0.516 | n3 | 1.67 | v3 | 19.2 |
| R6 | −17.235 | a3 | 0.300 | | | | |
| R7 | −8.751 | d4 | 0.300 | n4 | 1.53 | v4 | 51.5 |
| R8 | −30.000 | a4 | 0.056 | | | | |
| R25 | Inf | d13 | 0.263 | n13 | 1.55 | v13 | 53.6 |
| R26 | 5.642 | a13 | 6.729 | | | | |
| R9 | 5.623 | d5 | 1.172 | n5 | 1.57 | v5 | 71.2 |
| R10 | 42.293 | a5 | 0.103 | | | | |
| R11 | 5.158 | d6 | 0.887 | n6 | 1.55 | v6 | 45.8 |
| R12 | 16.130 | a6 | 0.884 | | | | |
| R13 | 18.601 | d7 | 0.405 | n7 | 1.67 | v7 | 19.2 |
| R14 | 6.388 | a7 | 0.295 | | | | |
| R15 | 7.219 | d8 | 0.381 | n8 | 1.65 | v8 | 21.5 |
| R16 | 5.373 | a8 | 3.441 | | | | |
| R17 | 5.517 | d9 | 1.774 | n9 | 1.56 | v9 | 67.3 |
| R18 | 24.015 | a9 | 2.079 | | | | |
| R19 | −68.785 | d10 | 0.404 | n10 | 1.83 | v10 | 37.3 |
| R20 | 7.963 | a10 | 1.913 | | | | |
| R21 | 8.479 | d11 | 0.724 | n11 | 1.67 | v11 | 19.2 |
| R22 | 47.983 | a11 | 0.708 | | | | |

Meanings of symbols in the table are as follows:

R25: a curvature radius of an object side surface of the eleventh lens G24;

R26: a curvature radius of an image side surface of the eleventh lens G24;

d13: an on-axis thickness of the eleventh lens G24;

a4: an on-axis distance between an image side surface of the third lens G23 and the object side surface of the eleventh lens G24;

a13: an on-axis distance between the image side surface of the eleventh lens G24 and an object side surface of the fourth lens G31;

n13: a refractive index of the eleventh lens G24; and v13: an Abbe number of the eleventh lens G24.

Table 7 shows aspherical coefficients of the optical lens 10 in this implementation. In this embodiment, there are 15 aspherical surfaces in the optical lens 10, and details are shown in Table 7.

TABLE 7

| Aspherical coefficients of the optical lens 10 in Implementation 2 | | | | | | | |
|---|---|---|---|---|---|---|---|
| | Type | K | A2 | A3 | A4 | A5 | A6 |
| R1 | Even aspherical surface | 0.00E+00 | 5.03E−05 | 1.95E−07 | 6.80E−09 | −2.03E−10 | 1.16E−12 |
| R2 | Even aspherical surface | 0.00E+00 | 6.56E−05 | 1.77E−07 | 4.53E−09 | −2.02E−10 | 1.37E−12 |
| R5 | Even aspherical surface | 0.00E+00 | −4.38E−03 | 1.27E−04 | 5.52E−06 | −6.16E−07 | 4.52E−08 |
| R6 | Even aspherical surface | 0.00E+00 | −3.59E−03 | −2.24E−06 | 1.54E−05 | −9.07E−07 | 4.69E−08 |
| R7 | Even aspherical surface | 0.00E+00 | −2.60E−03 | 1.34E−04 | −1.47E−05 | 1.60E−06 | −5.94E−08 |
| R8 | Even aspherical surface | 0.00E+00 | −5.58E−03 | 4.59E−04 | −4.44E−05 | 2.81E−06 | −7.92E−08 |
| R11 | Even aspherical surface | 0.00E+00 | 2.47E−05 | 8.18E−05 | 3.67E−06 | 2.82E−07 | −3.42E−08 |
| R12 | Even aspherical surface | 0.00E+00 | 1.88E−03 | 8.68E−05 | 1.77E−06 | −1.23E−06 | 3.62E−08 |
| R13 | Even aspherical surface | 0.00E+00 | 3.56E−03 | −3.28E−05 | 8.45E−06 | −1.96E−06 | 3.82E−08 |
| R14 | Even aspherical surface | 0.00E+00 | −1.32E−03 | 7.13E−04 | 7.22E−05 | 3.20E−06 | −1.58E−07 |
| R15 | Even aspherical surface | 0.00E+00 | 8.63E−04 | 3.95E−04 | 6.81E−05 | 2.16E−06 | −9.15E−07 |
| R16 | Even aspherical surface | 0.00E+00 | 7.88E−03 | −3.22E−05 | −5.18E−06 | 5.83E−07 | −7.43E−07 |
| R21 | Even aspherical surface | 0.00E+00 | 1.40E−03 | 3.55E−07 | 2.98E−05 | −3.41E−06 | 2.40E−07 |
| R22 | Even aspherical surface | 0.00E+00 | 1.85E−03 | −4.37E−05 | 4.86E−05 | −5.89E−06 | 4.02E−07 |

Table 8 shows object distances and component distances of the optical lens 10 in the long-focus state, the medium-focus state, the wide-angle state, and the micro-focus state in this implementation, as shown in Table 8.

TABLE 8

Object distances and component distances of the optical lens 10 in the long-focus state, the medium-focus state, the wide-angle state, and the micro-focus state in Implementation 2

| | W | C | T | M |
|---|---|---|---|---|
| a0 | Inf | Inf | Inf | 50 mm |
| a1 | 0.13 mm | 6.69 mm | 9.85 mm | 0.12 mm |
| a13 | 6.73 mm | 3.26 mm | 0.73 mm | 7.24 mm |
| a8 | 3.44 mm | 4.81 mm | 3.86 mm | 0.43 mm |
| a11 | 0.71 mm | 2.81 mm | 6.29 mm | 3.20 mm |

FIG. 29 to FIG. 40 are characterization diagrams of optical performance of the optical lens 10 in Implementation 2.

Figure 29:
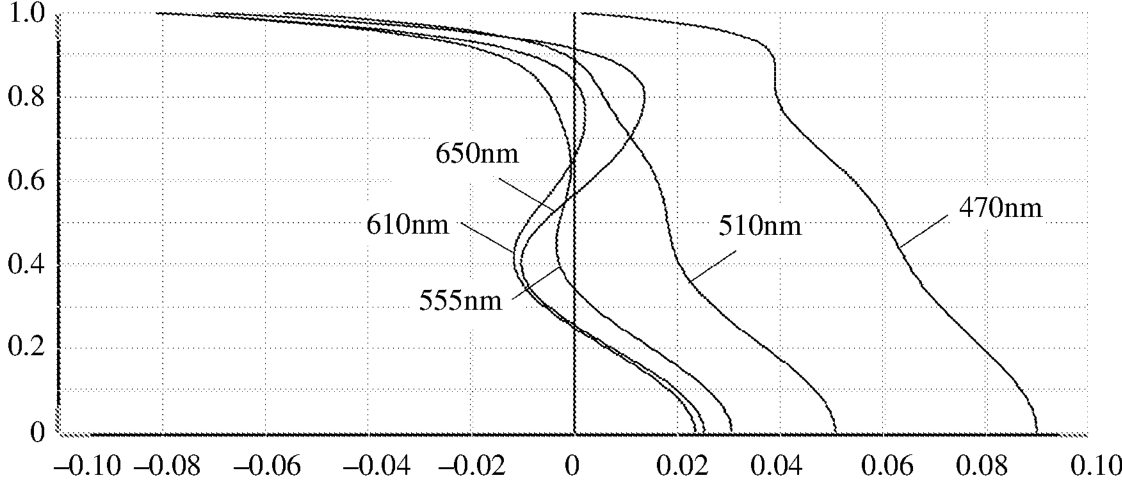
FIG. 29 is a schematic diagram of axial chromatic aberration of an optical lens in a long-focus state according to Implementation 2 of the present disclosure.
Figure 30:
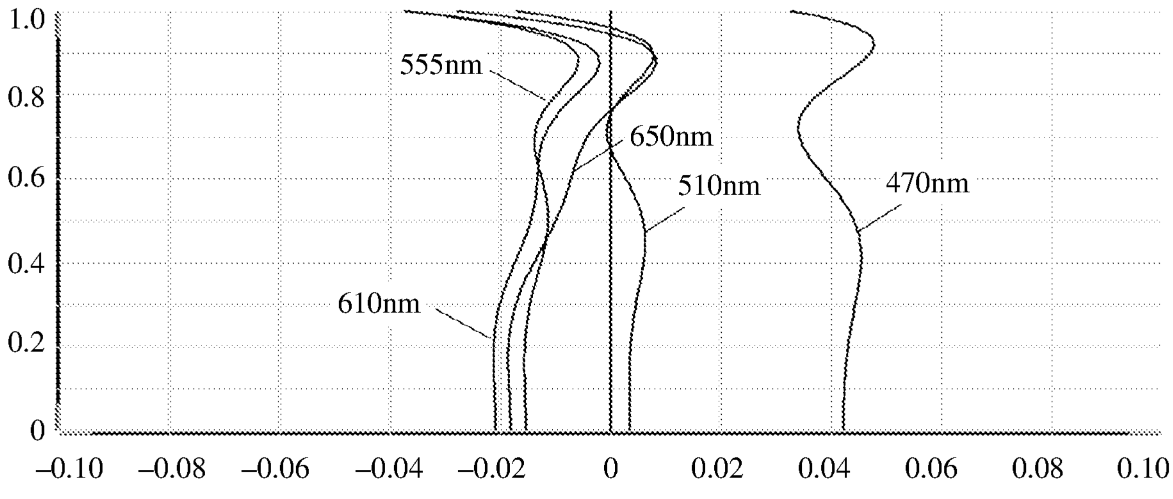
FIG. 30 is a schematic diagram of axial chromatic aberration of an optical lens in a medium-focus state according to Implementation 2 of the present disclosure.
Figure 31:
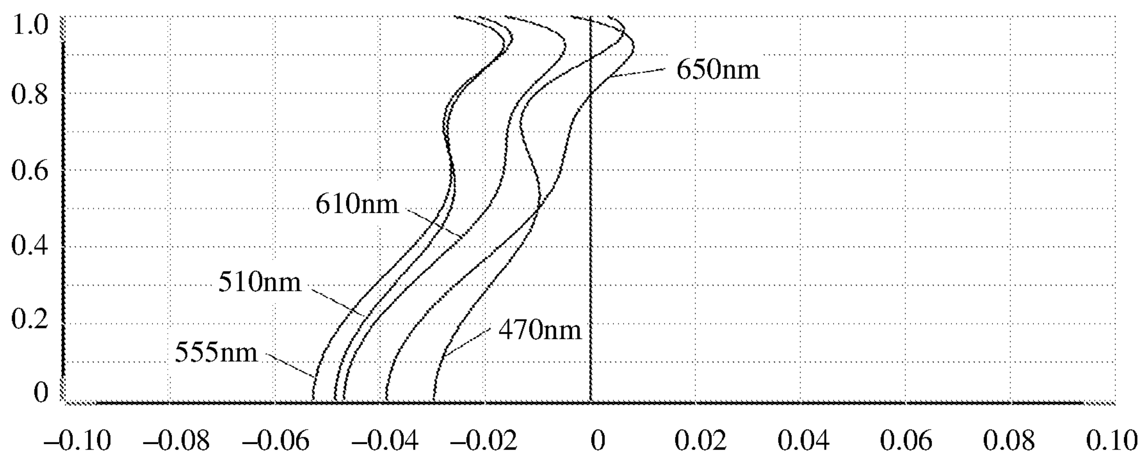
FIG. 31 is a schematic diagram of axial chromatic aberration of an optical lens in a wide-angle state according to Implementation 2 of the present disclosure.
Figure 32:
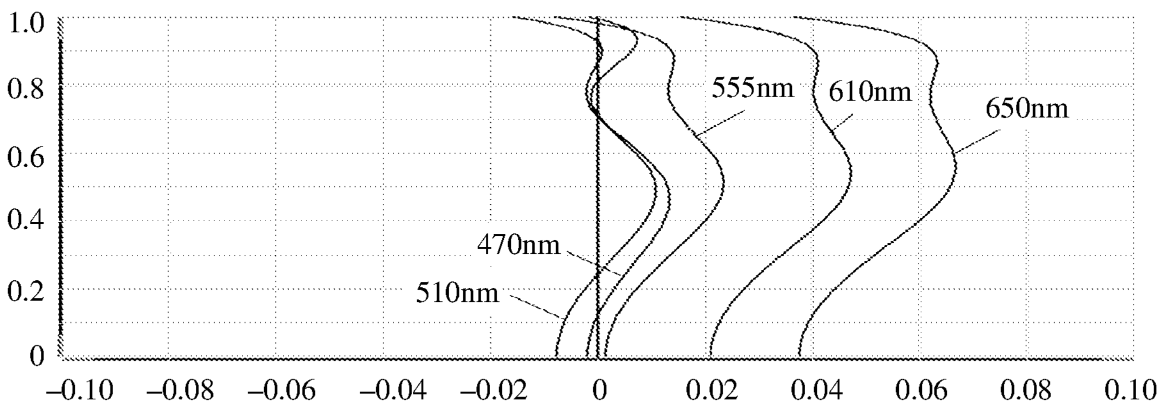
FIG. 32 is a schematic diagram of axial chromatic aberration of an optical lens in a micro-focus state according to Implementation 2 of the present disclosure.

Specifically, FIG. 29 shows axial aberration of the optical lens 10 in the long-focus state after light with wavelengths that are respectively 650 nm, 610 nm, 555 nm, 510 nm, and 470 nm passes through the optical lens 10 in Implementation 2. FIG. 30 shows axial aberration of the optical lens 10 in the medium-focus state after light with wavelengths that are respectively 650 nm, 610 nm, 555 nm, 510 nm, and 470 nm passes through the optical lens 10 in Implementation 2. FIG. 31 shows axial aberration of the optical lens 10 in the wide-angle state after light with wavelengths that are respectively 650 nm, 610 nm, 555 nm, 510 nm, and 470 nm passes through the optical lens 10 in Implementation 2. FIG. 32 shows axial aberration of the optical lens 10 in the micro-focus state after light with wavelengths that are respectively 650 nm, 610 nm, 555 nm, 510 nm, and 470 nm passes through the optical lens 10 in Implementation 2. In FIG. 29 to FIG. 32, a vertical coordinate represents a normalized pupil coordinate, a horizontal coordinate represents aberration in an axial direction, and a unit is millimeter. It may be learned from FIG. 29 to FIG. 32 that, in this implementation, axial aberration of the optical lens 10 in each state is controlled within a very small range.

Figure 33:
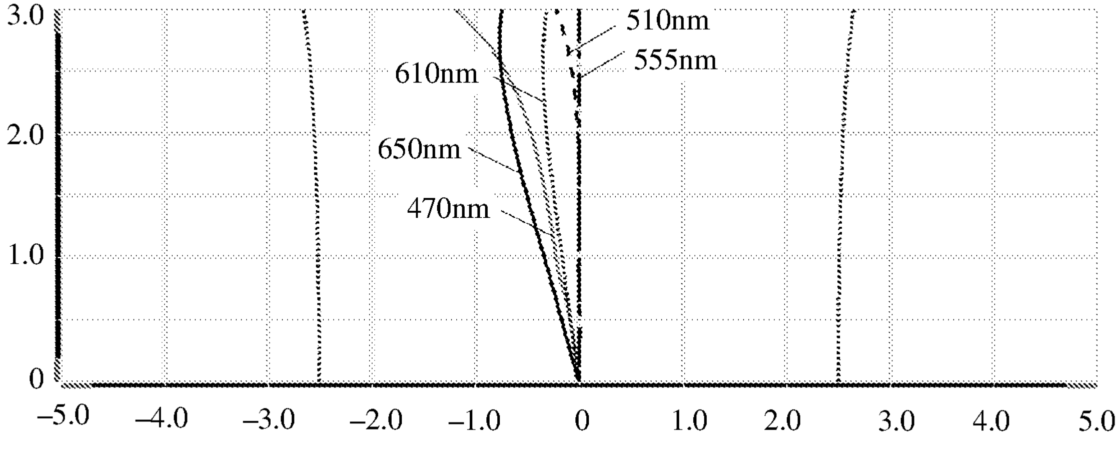
FIG. 33 is a schematic diagram of lateral chromatic aberration of an optical lens in a long-focus state according to Implementation 2 of the present disclosure.
Figure 34:
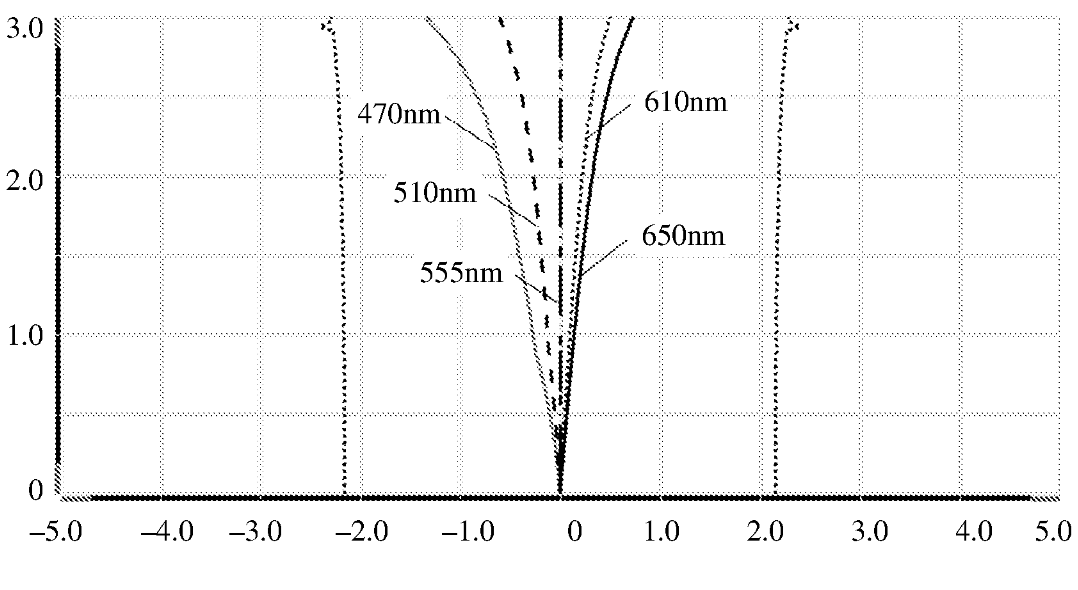
FIG. 34 is a schematic diagram of lateral chromatic aberration of an optical lens in a medium-focus state according to Implementation 2 of the present disclosure.
Figure 35:
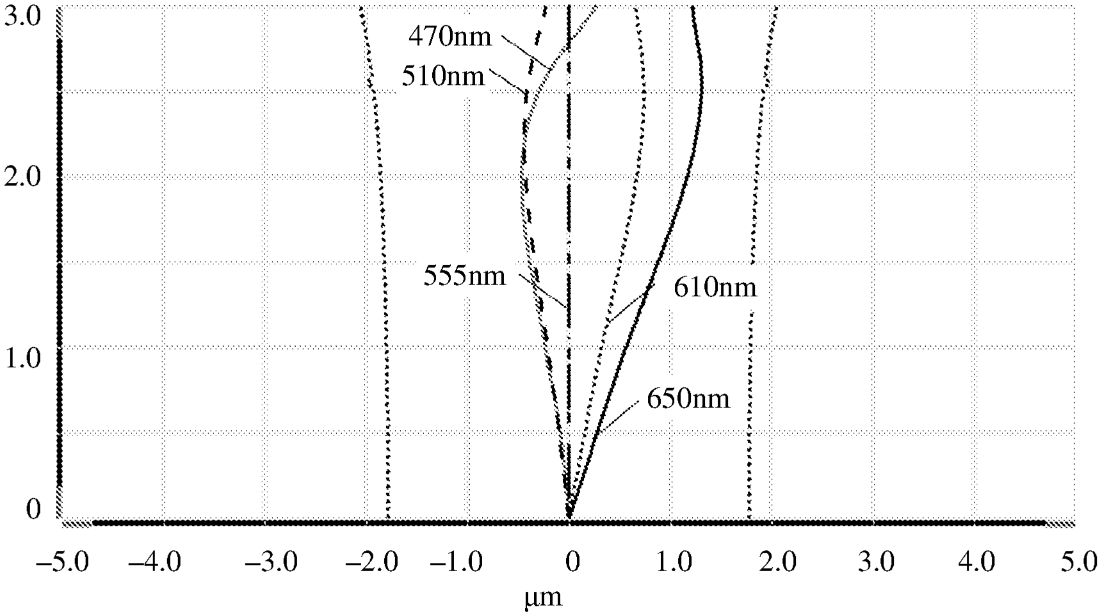
FIG. 35 is a schematic diagram of lateral chromatic aberration of an optical lens in a wide-angle state according to Implementation 2 of the present disclosure.
Figure 36:
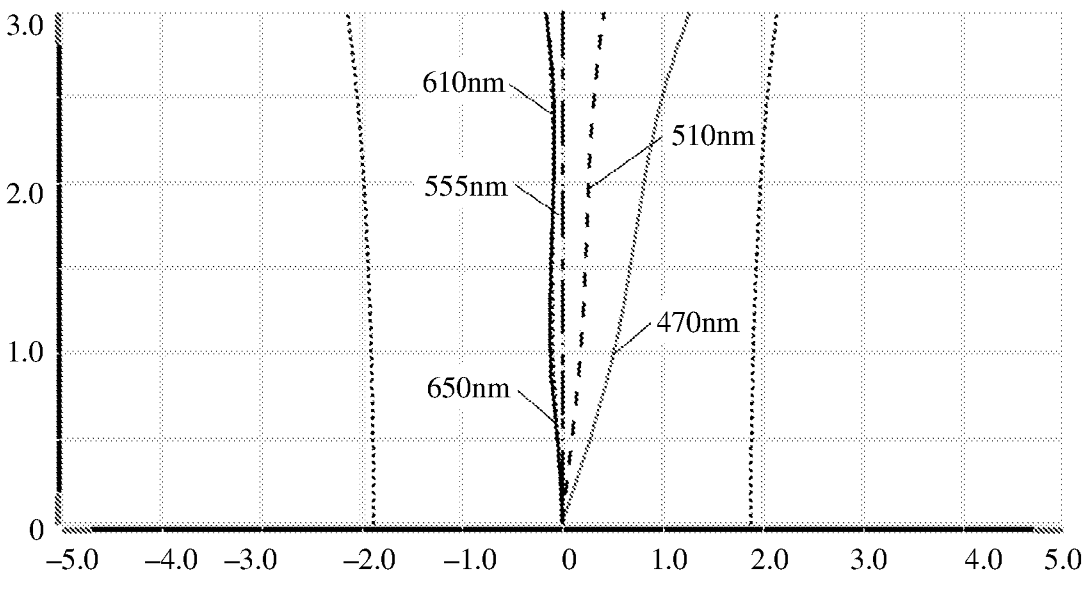
FIG. 36 is a schematic diagram of lateral chromatic aberration of an optical lens in a micro-focus state according to Implementation 2 of the present disclosure.
Figure 37:
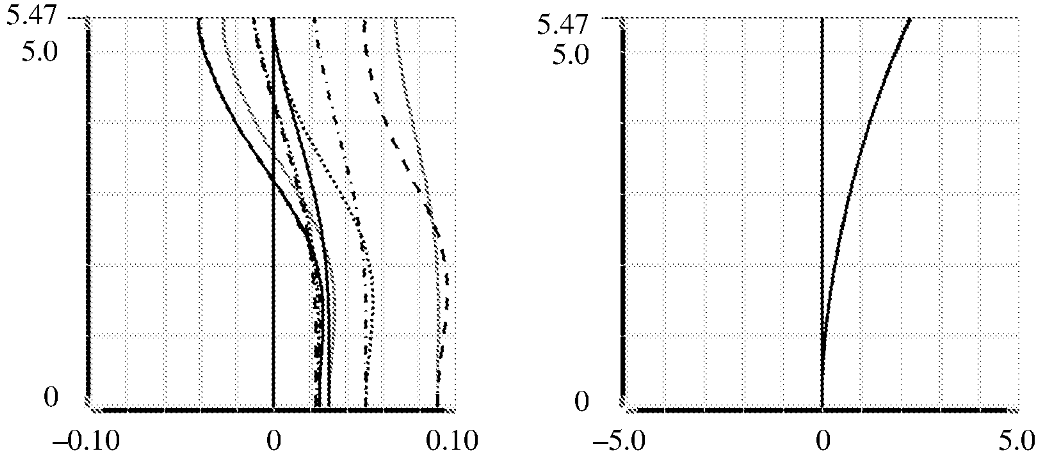
FIG. 37 is a schematic diagram of field curvature and optical distortion of an optical lens in a long-focus state according to Implementation 2 of the present disclosure.
Figure 40:
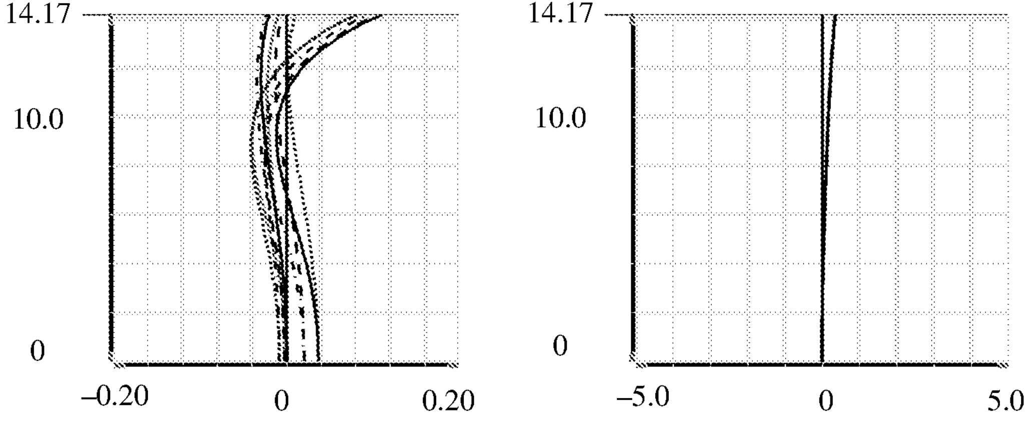
FIG. 40 is a schematic diagram of field curvature and optical distortion of an optical lens in a micro-focus state according to Implementation 2 of the present disclosure.

FIG. 33 shows lateral chromatic aberration of the optical lens 10 in the long-focus state after light with wavelengths that are respectively 650 nm, 610 nm, 555 nm, 510 nm, and 470 nm passes through the optical lens 10 in Implementation 2. FIG. 34 shows lateral chromatic aberration of the optical lens 10 in the medium-focus state after light with wavelengths that are respectively 650 nm, 610 nm, 555 nm, 510 nm, and 470 nm passes through the optical lens 10 in Implementation 2. FIG. 35 shows lateral chromatic aberration of the optical lens 10 in the wide-angle state after light with wavelengths that are respectively 650 nm, 610 nm, 555 nm, 510 nm, and 470 nm passes through the optical lens 10 in Implementation 2. FIG. 36 shows lateral chromatic aberration of the optical lens 10 in the micro-focus state after light with wavelengths that are respectively 650 nm, 610 nm, 555 nm, 510 nm, and 470 nm passes through the optical lens 10 in Implementation 2. In FIG. 33 to FIG. 36, a vertical coordinate represents a field of view angle in a unit of degree (°), and a horizontal coordinate is in a unit of micrometer (μm). In FIG. 32 to FIG. 36, an unmarked dotted line represents a diffraction limit range of the optical lens 10. It may be learned from FIG. 33 to FIG. 36 that lateral chromatic aberration of the optical lens 10 in each state after light with each wavelength passes through the optical lens 10 in Implementation 2 is basically within the diffraction limit, that is, lateral chromatic aberration of the optical lens 10 in each state after light with each wavelength passes through the optical lens 10 in Implementation 2 basically does not affect imaging quality of the optical lens 10.

FIG. 37 to FIG. 40 are respectively schematic diagrams of optical distortion of the optical lens 10 in the long-focus state, the medium-focus state, the wide-angle state, and the micro-focus state, to indicate a difference between a deformed image and an ideal shape after light passes through the optical lens 10. Solid lines in the left figures of FIG. 37 to FIG. 40 are respectively schematic diagrams of field curvature in a meridian direction in the long-focus state, the medium-focus state, the wide-angle state, and the micro-focus state after light of 555 nm passes through the optical lens 10. Dashed/dotted lines in FIG. 37 to FIG. 40 are respectively schematic diagrams of field curvature in a sagittal direction in the long-focus state, the medium-focus state, the wide-angle state, and the micro-focus state after light of 555 nm passes through the optical lens 10. Right figures of FIG. 37 to FIG. 40 are respectively schematic diagrams of optical distortion in the long-focus state, the medium-focus state, the wide-angle state, and the micro-focus state after light of 555 nm passes through the optical lens 10 in Implementation 2. It may be learned from FIG. 37 to FIG. 40, in this implementation, the optical system controls distortion to be within a range in which distortion can be identified by the naked eye.

In the optical lens 10 provided in this implementation, with a configuration manner of each lens in each component and a combination of lenses with a specified optical design, the optical lens 10 can be miniaturized and the zooming range thereof can be sufficiently wide, the optical lens 10 has a good imaging effect, and thinning of the terminal 1000 is implemented.

Figure 41:
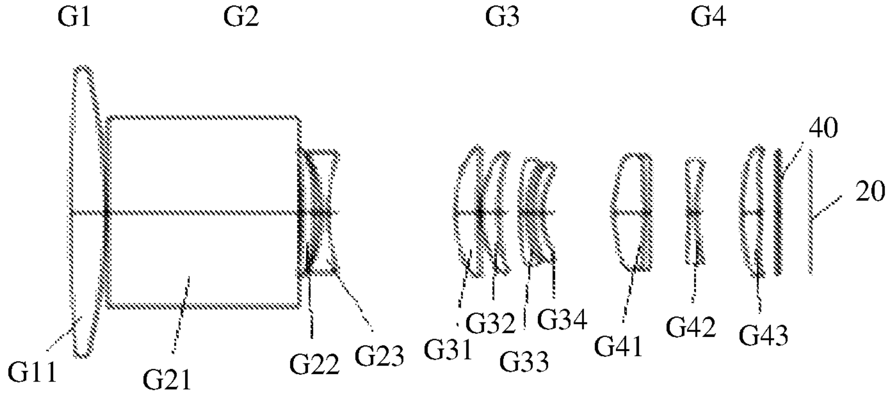
FIG. 41 is a schematic diagram of a structure of an optical lens according to Implementation 3 of the present disclosure.

FIG. 41 is a schematic diagram of a structure of an optical lens 10 according to Implementation 3 of the present disclosure. In this implementation, the optical lens 10 has four components: the first component G1, the second component G2, the third component G3, and the fourth component G4. The first component G1, the second component G2, the third component G3, and the fourth component G4 are successively disposed from the object side to the image side. In FIG. 41, to facilitate understanding of a movement relationship between the first component G1, the second component G2, the third component G3, and the fourth component G4, the first component G1, the second component G2, the third component G3, and the fourth component G4 are coaxially disposed. In FIG. 41, the refraction member G21 does not represent an actual structure, but is merely an example. Actually, the second component G2, the third component G3, and the fourth component G4 are coaxial. The refraction member G21 is located on a side of the second component G2 that faces away from the third component G3, and the first component G1 is disposed on a side of the refraction member G21 that faces away from the bottom wall 33.

When the optical lens 10 is in the long-focus state, that is, when the optical lens 10 is in a telescope state, the ratio (TTL/EFLmax) of the focal length of the first component G1 to the focal length of the optical lens 10 in the long-focus state is 1.488. The ratio (IH/EFLmax) of the imaging height of the optical lens 10 to the focal length of the optical lens 10 in the long-focus state is 0.097. The foregoing limit value ensures that the thickness of the optical lens 10 is sufficiently small, to facilitate miniaturization of the optical lens 10. When the optical lens 10 is applied to the terminal 1000, smaller space of the terminal 1000 is occupied, to implement thinning of the terminal 1000. In addition, the telephoto capability of the optical lens 10 can be ensured, to meet different photographing scenarios, and improve user experience.

The first component G1 has positive focal power, and the ratio $|fs_1/ft|$ of the focal length of the first component G1 to the focal length of the optical lens 10 in the long-focus state is 1.38. The second component G2 has negative focal power, and the ratio $|fs_2/ft|$ of the focal length of the second component G2 to the focal length of the optical lens 10 in the long-focus state is 0.27. The third component G3 has positive focal power, and the ratio $|fs_3/ft|$ of the focal length of the third component G3 to the focal length of the optical lens 10 in the long-focus state is 0.29. The fourth component G4 has positive focal power, and the ratio $|fs_4/ft|$ of the focal length of the fourth component G4 to the focal length of the optical lens 10 in the long-focus state is 0.65. Components with different optical performance cooperate with each other, so that the zooming range of the optical lens 10 is sufficiently wide, the optical lens 10 has a good imaging effect, and thinning of the terminal 1000 is implemented.

The optical lens 10 includes 11 lenses. Specifically, the first component G1 includes a first lens G11, and the $1^{st}$ lens in the first component G1 is the first lens G11. The second component G2 includes the refraction member G21, a second lens G22, and a third lens G23, the $1^{st}$ lens in the second component G2 is the refraction member G21, the $2^{nd}$ lens in the second component G2 is the second lens G22, and the $3^{rd}$ lens in the second component G2 is the third lens G23. The third component G3 includes a fourth lens G31, a fifth lens G32, a sixth lens G33, and a seventh lens G34, the $1^{st}$ lens in the third component G3 is the fourth lens G31, the $2^{nd}$ lens in the third component G3 is the fifth lens G32, the $3^{rd}$ lens in the third component G3 is the sixth lens G33, and the $4^{th}$ lens in the third component G3 is the seventh lens G34. The fourth component G4 includes an eighth lens G41, a ninth lens G42, and a tenth lens G43, the $1^{st}$ lens in the fourth component G4 is the eighth lens G41, the $2^{nd}$ lens in the fourth component G4 is the ninth lens G42, and the $3^{rd}$ lens in the fourth component G4 is the tenth lens G43. In this implementation, the diameter of the largest lens in the optical lens 10 is 13.78 mm, to ensure miniaturization of the optical lens 10. The eighth lens G41 is a glued lens, to help correct chromatic aberration of the optical lens 10, so that the optical lens 10 can obtain better imaging quality.

The first lens G11 has positive focal power, the second lens G22 has positive focal power, the third lens G23 has negative focal power, the fourth lens G31 has positive focal power, the fifth lens G32 has positive focal power, the sixth lens G33 has negative focal power, the seventh lens G34 has negative focal power, the eighth lens G41 has positive focal power, the ninth lens G42 has negative focal power, the tenth lens G43 has positive focal power, and the eleventh lens G24 has negative focal power. Different lenses cooperate with each other, so that the zooming range of the optical lens 10 is sufficiently wide, the optical lens 10 has a good imaging effect, and thinning of the terminal 1000 is implemented.

Figure 42:
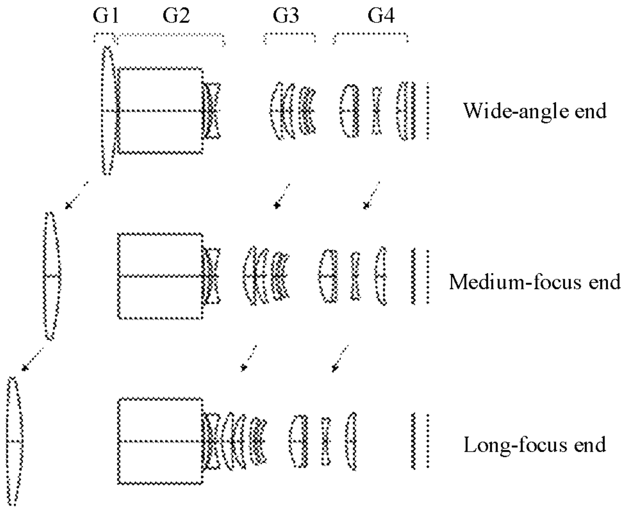
FIG. 42 is a schematic diagram of a zooming process of the optical lens shown in FIG. 41.
Figure 43:
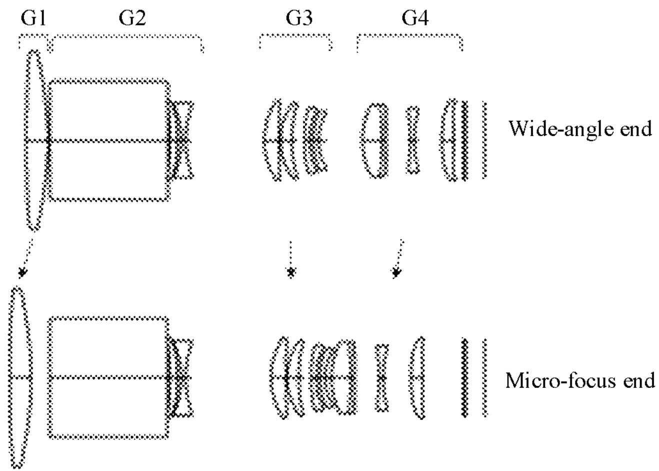
FIG. 43 is a schematic diagram of another zooming process of the optical lens shown in FIG. 41.

Referring to FIG. 42 and FIG. 43, in this implementation, when the optical lens 10 performs zooming, the first component G1, the third component G3, and the fourth component G4 separately move along the optical axis. Specifically, for example, when the optical lens 10 performs zooming from the wide-angle state to the long-focus state, the second component G2 does not move, the first component G1, the third component G3, and the fourth component G4 move towards the object side, the distance between the first component G1 and the second component G2 increases, a distance between the second component G2 and the third component G3 decreases, a distance between the third component G3 and the fourth component G4 first increases and then decreases, and the total track length of the optical lens 10 increases. When the optical lens 10 performs zooming from the wide-angle state to the micro-focus state, the second component G2 does not move, the first component G1 moves towards the image side, the third component G3 and the fourth component G4 move towards the object side, the distance between the first component G1 and the second component G2 decreases, a distance between the second component G2 and the third component G3 decreases, a distance between the third component G3 and the fourth component G4 decreases, and the total track length of the optical lens 10 decreases.

Based on the foregoing relation, basic parameters in Implementation 3 of the present disclosure are shown in the following Table 9.

TABLE 9

Basic parameters of the optical lens 10 in Implementation 3

| | W | C | T | M |
|---|---|---|---|---|
| Focal length f | 11.79 mm | 19.97 mm | 30.94 mm | 10.64 mm |
| F-number | 2.69 | 3.11 | 3.52 | 2.75 |
| Imaging height IH | 3 mm | 3 mm | 3 mm | 3 mm |
| Half FOV | 14.29° | 8.55° | 5.54° | 15.76° |
| BFL | 0.72 mm | 3.04 mm | 6.30 mm | 3.14 mm |
| Extension length | 1.83 mm | 8.13 mm | 12.21 mm | 3.12 mm |
| Fixed length | 33.8 mm | 33.8 mm | 33.8 mm | 33.8 mm |
| TTL | 35.67 mm | 41.96 mm | 46.04 mm | 36.95 mm |
| Designed wavelength | 650 nm, 610 nm, 555 nm, 510 nm, 470 nm | | | |

Table 10 shows a curvature radius, a thickness, a refractive index, and an Abbe number of each component lens of the optical lens 10 in Implementation 3 of the present disclosure, as shown in Table 10.

TABLE 10

Curvature radius, thickness, refractive index, and Abbe number of each component lens of the optical lens 10 in Implementation 3

| | R | | Thickness | | nd | | Vd |
|---|---|---|---|---|---|---|---|
| R1 | 161.608 | d1 | 0.336 | n1 | 1.50 | v1 | 81.6 |
| R2 | −24.501 | a1 | 6.130 | | | | |
| R3 | Inf | d2 | 1.129 | n2 | 2.00 | v2 | 28.3 |
| R4 | Inf | a2 | 0.140 | | | | |
| R5 | 7457.855 | d3 | 0.890 | n3 | 1.67 | v3 | 19.2 |
| R6 | −18.207 | a3 | 0.957 | | | | |
| R7 | −8.584 | d4 | 0.414 | n4 | 1.54 | v4 | 56.0 |
| R8 | 5.875 | a4 | 0.283 | | | | |
| R9 | 5.634 | d5 | 0.408 | n5 | 1.59 | v5 | 67.0 |
| R10 | 41.906 | a5 | 3.407 | | | | |
| R11 | 5.104 | d6 | 1.504 | n6 | 1.54 | v6 | 56.0 |
| R12 | 15.550 | a6 | 0.299 | | | | |
| R13 | 17.721 | d7 | 1.883 | n7 | 1.67 | v7 | 19.2 |
| R14 | 6.356 | a7 | 0.340 | | | | |
| R15 | 6.781 | d8 | 2.156 | n8 | 1.67 | v8 | 19.2 |
| R16 | 5.217 | a8 | 0.919 | | | | |
| R27 | 6.103 | d14 | 0.724 | n14 | 1.54 | v14 | 56.0 |
| R17 | −25.678 | d9 | 0.211 | n9 | 1.64 | | 23.5 |
| R18 | −88.717 | a9 | 1.500 | | | | |
| R19 | −20.902 | d10 | 0.336 | n10 | 1.83 | v10 | 37.3 |
| R20 | 8.906 | a10 | 6.130 | | | | |
| R21 | 13.919 | d11 | 1.129 | n11 | 1.67 | v11 | 19.2 |
| R22 | −25.935 | a11 | 0.140 | | | | |
| R23 | Inf | d12 | 0.890 | n12 | 1.52 | v12 | 64.2 |
| R24 | Inf | a12 | 0.957 | | | | |

Meanings of symbols in the table are as follows:

R27: a curvature radius of an object side surface of a surface-mounted film of the eighth lens G41;

R17: a curvature radius of an image side surface of the surface-mounted film of the eighth lens G41;

R18: a curvature radius of an image side surface of a lens of the eighth lens G41;

d14: an on-axis thickness of the surface-mounted film of the eighth lens G41;

d9: an on-axis thickness of the lens of the eighth lens G41;

n14: a refractive index of the surface-mounted film of the eighth lens G41;

n9: a refractive index of the lens of the eighth lens G41;

v14: an Abbe number of the surface-mounted film of the eighth lens G41; and v9: an Abbe number of the lens of the eighth lens G41.

Table 11 shows aspherical coefficients of the optical lens 10 in this implementation. In this embodiment, there are 14 aspherical surfaces in the optical lens 10, and details are shown in Table 11.

TABLE 11

Aspherical coefficients of the optical lens 10 in Implementation 3

| | Type | K | A2 | A3 | A4 | A5 | A6 |
|---|---|---|---|---|---|---|---|
| R1 | Even aspherical surface | 0.00E+00 | 4.58E−05 | 2.16E−07 | 6.95E−09 | −2.10E−10 | 1.37E−12 |
| R2 | Even aspherical surface | 0.00E+00 | 7.14E−05 | 1.71E−07 | 4.82E−09 | −1.88E−10 | 1.37E−12 |
| R5 | Even aspherical surface | 0.00E+00 | −4.32E−03 | 1.32E−04 | 6.00E−06 | −5.89E−07 | 4.61E−08 |
| R6 | Even aspherical surface | 0.00E+00 | −3.63E−03 | −3.88E−06 | 1.52E−05 | −8.86E−07 | 4.78E−08 |
| R7 | Even aspherical surface | 0.00E+00 | −2.68E−03 | 1.32E−04 | −1.49E−05 | 1.57E−06 | −6.31E−08 |
| R8 | Even aspherical surface | 0.00E+00 | −5.56E−03 | 4.64E−04 | −4.40E−05 | 2.81E−06 | −8.27E−08 |
| R11 | Even aspherical surface | 0.00E+00 | −2.98E−05 | 8.05E−05 | 3.17E−06 | 2.33E−07 | −3.63E−08 |
| R12 | Even aspherical surface | 0.00E+00 | 2.03E−03 | 8.32E−05 | 2.04E−06 | −1.14E−06 | 3.29E−08 |
| R13 | Even aspherical surface | 0.00E+00 | 3.57E−03 | −3.16E−05 | 8.82E−06 | −1.77E−06 | 5.93E−08 |
| R14 | Even aspherical surface | 0.00E+00 | −1.36E−03 | 7.11E−04 | 7.20E−05 | 3.31E−06 | −1.78E−07 |
| R15 | Even aspherical surface | 0.00E+00 | 9.03E−04 | 4.02E−04 | 6.85E−05 | 2.17E−06 | −9.28E−07 |
| R16 | Even aspherical surface | 0.00E+00 | 7.81E−03 | −3.47E−05 | −5.57E−06 | 7.55E−07 | −6.91E−07 |
| R21 | Even aspherical surface | 0.00E+00 | 1.65E−03 | 1.10E−05 | 3.05E−05 | −3.29E−06 | 2.31E−07 |
| R22 | Even aspherical surface | 0.00E+00 | 1.71E−03 | −3.01E−05 | 4.81E−05 | −5.82E−06 | 4.16E−07 |

The foregoing parameters are substituted into the following formula:

$$z = \frac{cr^2}{1 + \sqrt{1 - (1 + K)c^2 r^2}} + A_2 r^4 + A_3 r^6 + A_4 r^8 + A_5 r^{10} + A_6 r^{12}$$

Each lens of the optical lens 10 in this implementation can be designed and obtained, where z is a vector height of the aspherical surface, r is a radial coordinate of the aspherical surface, and c is a spherical curvature of a vertex on the aspherical surface.

In this implementation, different lenses of the optical lens 10 that are designed by using the foregoing parameters can play different roles, so that the optical lens 10 with good imaging quality is obtained through cooperation between the lenses.

Table 12 shows object distances and component distances of the optical lens 10 in the long-focus state, the medium-focus state, the wide-angle state, and the micro-focus state in this implementation, as shown in Table 12.

TABLE 12

Object distances and component distances of the optical lens 10 in the long-focus state, the medium-focus state, the wide-angle state, and the micro-focus state in Implementation 3

| | W | C | T | M |
|---|---|---|---|---|
| a0 | Inf | Inf | Inf | 50 mm |
| a1 | 0.17 mm | 6.46 mm | 10.54 mm | 1.45 mm |
| a4 | 6.13 mm | 3.16 mm | 0.75 mm | 6.65 mm |
| a8 | 3.41 mm | 4.06 mm | 3.21 mm | 0.48 mm |
| a11 | 0.72 mm | 3.04 mm | 6.30 mm | 3.14 mm |

FIG. 44 to FIG. 55 are characterization diagrams of optical performance of the optical lens 10 in Implementation 3.

Figure 44:
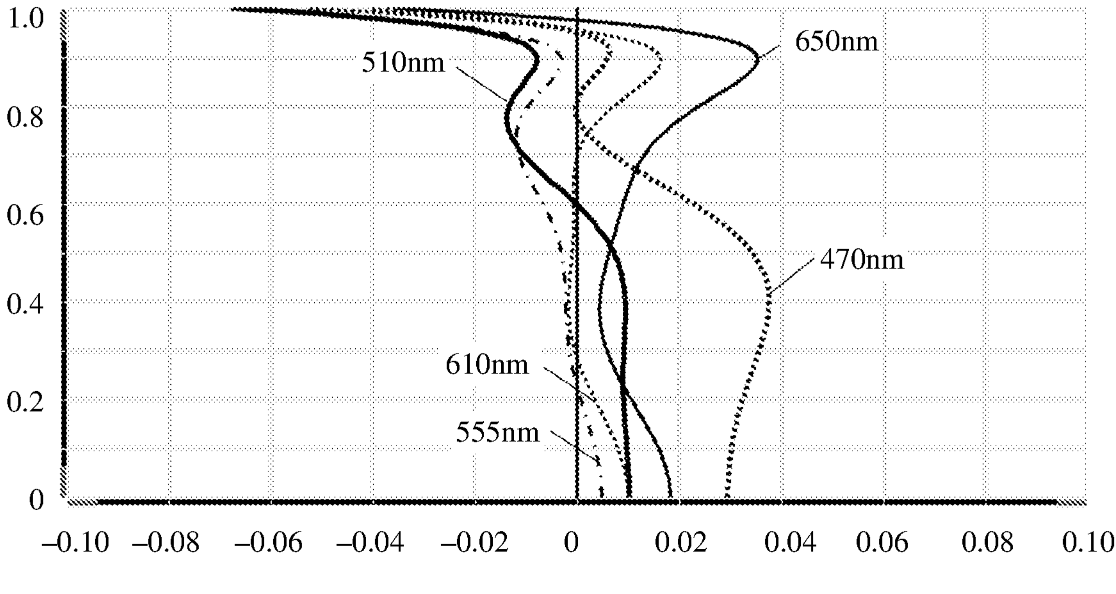
FIG. 44 is a schematic diagram of axial chromatic aberration of an optical lens in a long-focus state according to Implementation 3 of the present disclosure.
Figure 45:
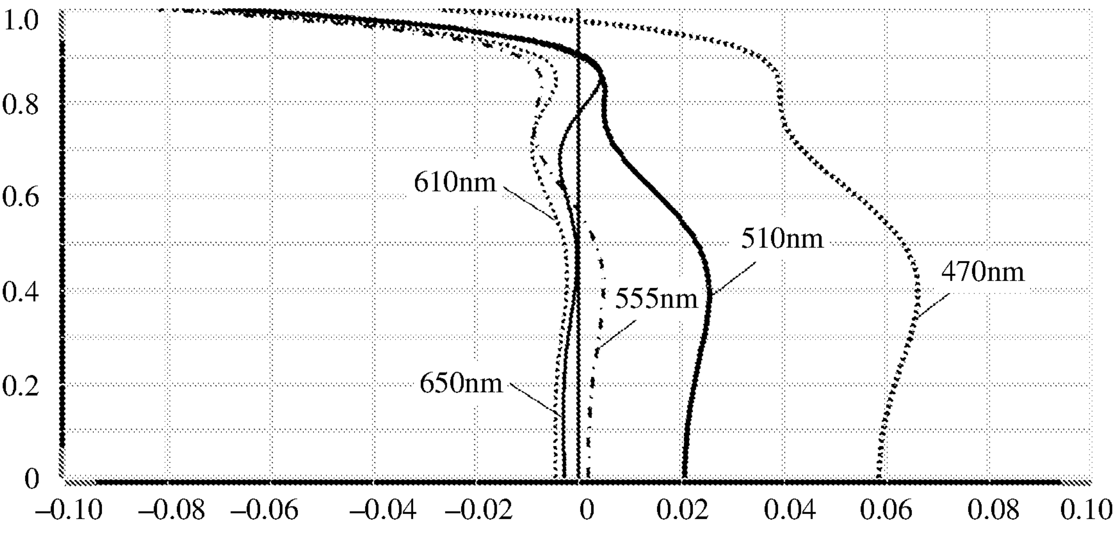
FIG. 45 is a schematic diagram of axial chromatic aberration of an optical lens in a medium-focus state according to Implementation 3 of the present disclosure.
Figure 46:
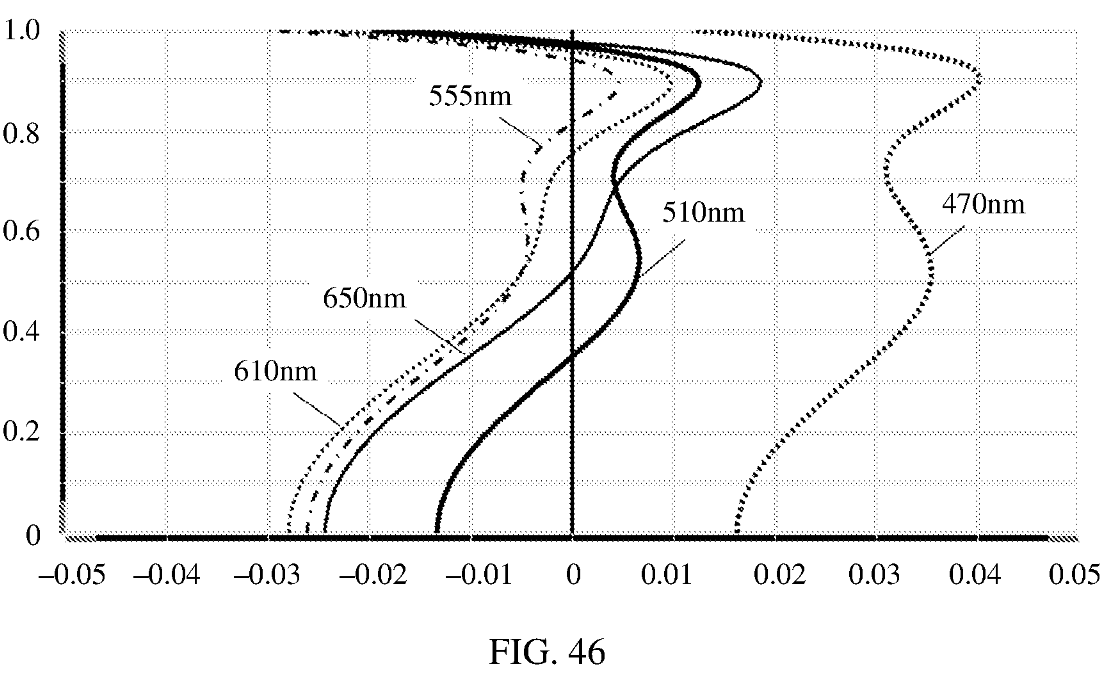
FIG. 46 is a schematic diagram of axial chromatic aberration of an optical lens in a wide-angle state according to Implementation 3 of the present disclosure.
Figure 47:
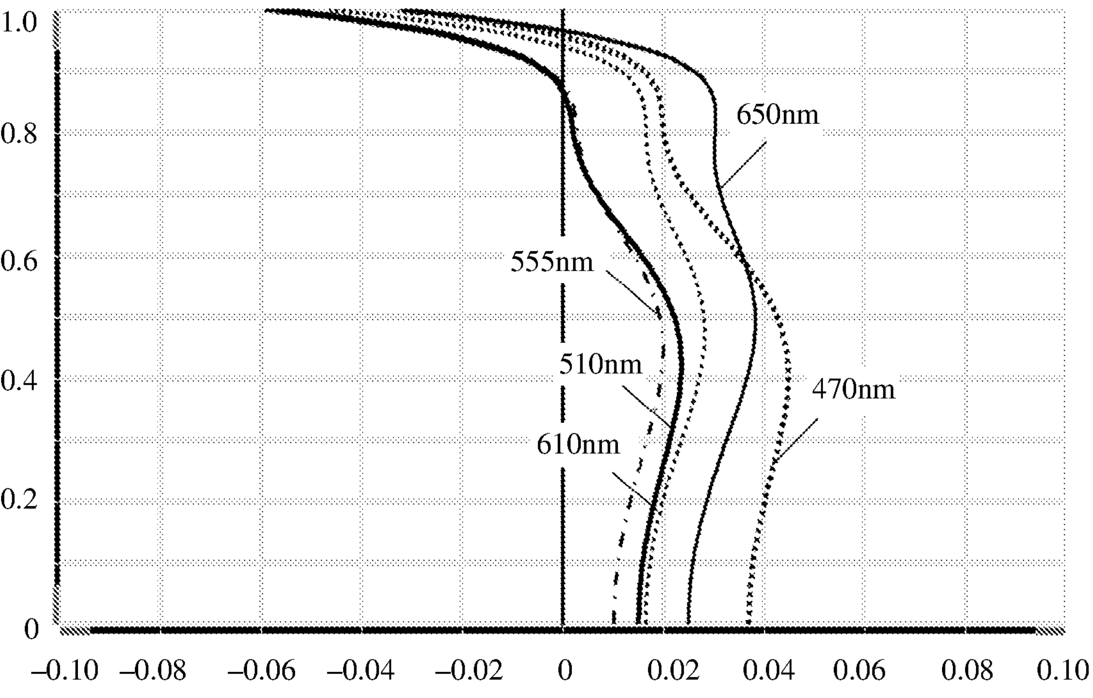
FIG. 47 is a schematic diagram of axial chromatic aberration of an optical lens in a micro-focus state according to Implementation 3 of the present disclosure.

Specifically, FIG. 44 shows axial aberration of the optical lens 10 in the long-focus state after light with wavelengths that are respectively 650 nm, 610 nm, 555 nm, 510 nm, and 470 nm passes through the optical lens 10 in Implementation 3. FIG. 45 shows axial aberration of the optical lens 10 in the medium-focus state after light with wavelengths that are respectively 650 nm, 610 nm, 555 nm, 510 nm, and 470 nm passes through the optical lens 10 in Implementation 3. FIG. 46 shows axial aberration of the optical lens 10 in the wide-angle state after light with wavelengths that are respectively 650 nm, 610 nm, 555 nm, 510 nm, and 470 nm passes through the optical lens 10 in Implementation 3. FIG. 47 shows axial aberration of the optical lens 10 in the micro-focus state after light with wavelengths that are respectively 650 nm, 610 nm, 555 nm, 510 nm, and 470 nm passes through the optical lens 10 in Implementation 3. In FIG. 44 to FIG. 47, a vertical coordinate represents a normalized pupil coordinate, a horizontal coordinate represents aberration in an axial direction, and a unit is millimeter. It may be learned from FIG. 44 to FIG. 47 that, in this implementation, axial aberration of the optical lens 10 in each state is controlled within a very small range.

Figure 48:
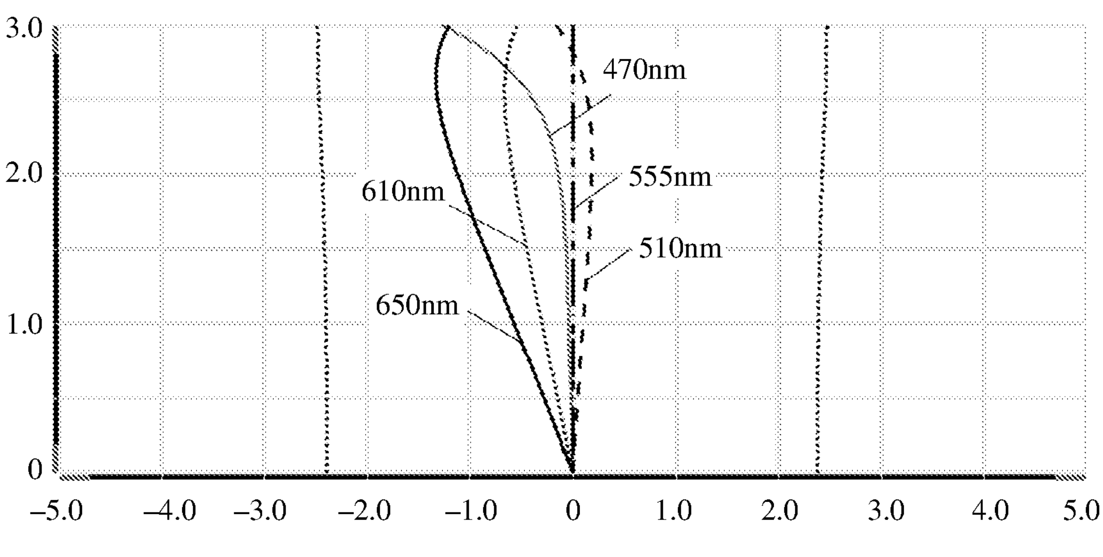
FIG. 48 is a schematic diagram of lateral chromatic aberration of an optical lens in a long-focus state according to Implementation 3 of the present disclosure.
Figure 49:
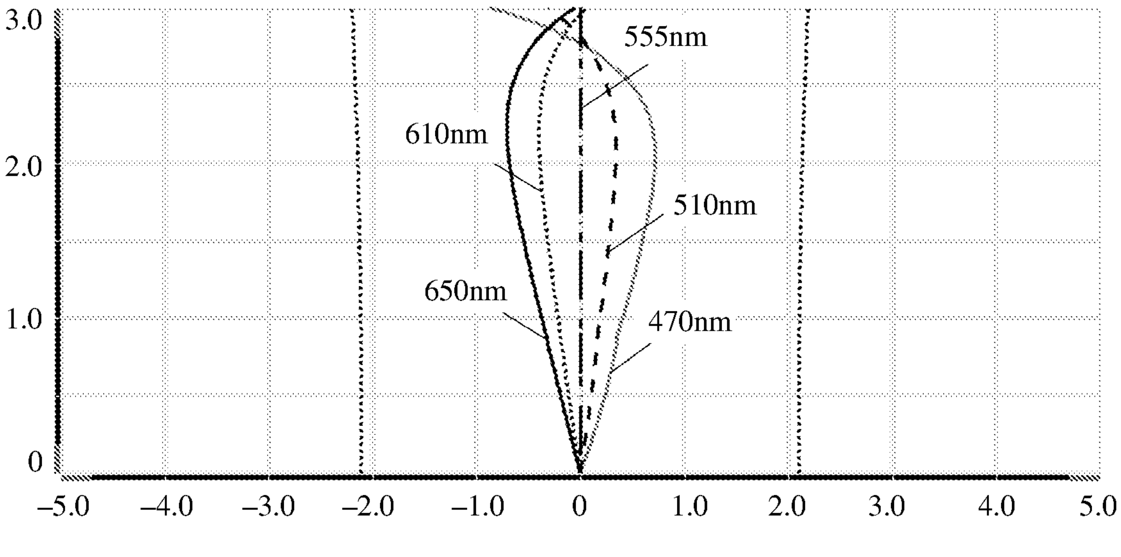
FIG. 49 is a schematic diagram of lateral chromatic aberration of an optical lens in a medium-focus state according to Implementation 3 of the present disclosure.
Figures 50, 51:
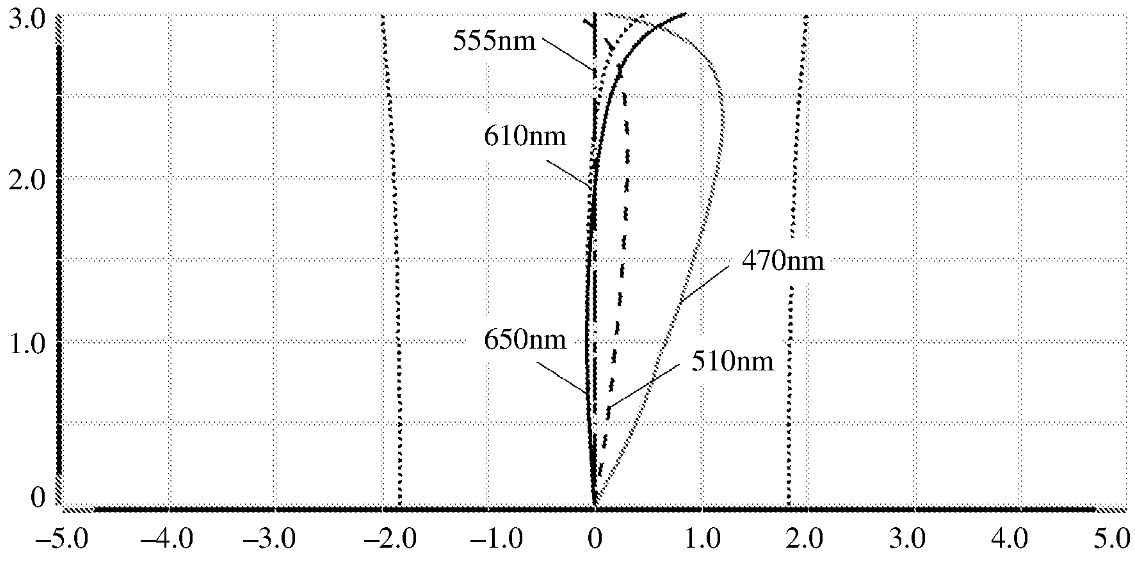
FIG. 50 is a schematic diagram of lateral chromatic aberration of an optical lens in a wide-angle state according to Implementation 3 of the present disclosure.
FIG. 51 is a schematic diagram of lateral chromatic aberration of an optical lens in a micro-focus state according to Implementation 3 of the present disclosure.
Figure 54:
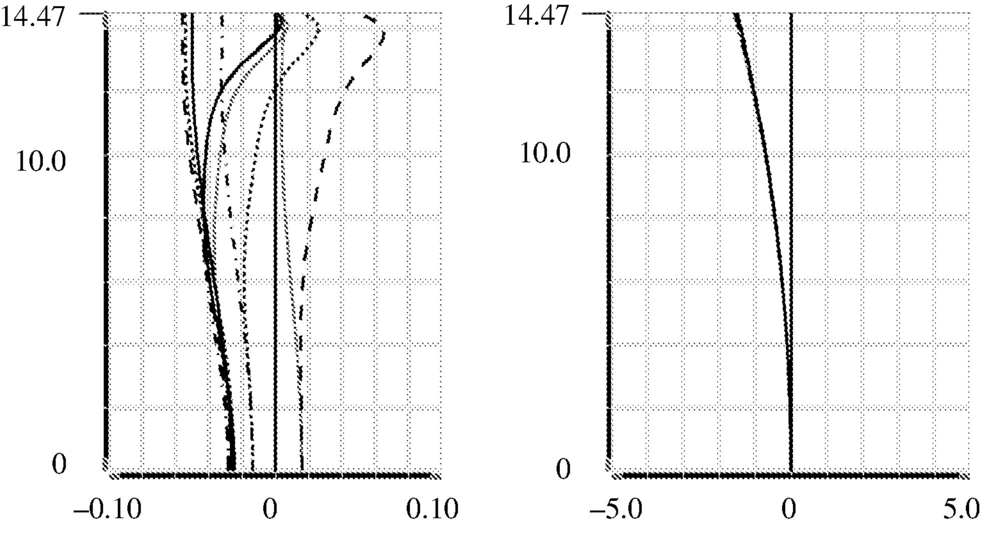
FIG. 54 is a schematic diagram of field curvature and optical distortion of an optical lens in a wide-angle state according to Implementation 3 of the present disclosure.
Figure 55:
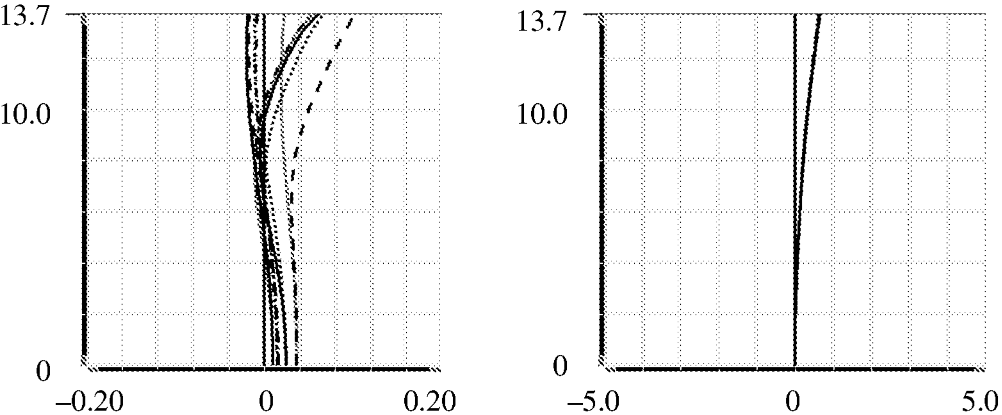
FIG. 55 is a schematic diagram of field curvature and optical distortion of an optical lens in a micro-focus state according to Implementation 3 of the present disclosure.

FIG. 48 shows lateral chromatic aberration of the optical lens 10 in the long-focus state after light with wavelengths that are respectively 650 nm, 610 nm, 555 nm, 510 nm, and 470 nm passes through the optical lens 10 in Implementation 3. FIG. 49 shows lateral chromatic aberration of the optical lens 10 in the medium-focus state after light with wavelengths that are respectively 650 nm, 610 nm, 555 nm, 510 nm, and 470 nm passes through the optical lens 10 in Implementation 3. FIG. 50 shows lateral chromatic aberration of the optical lens 10 in the wide-angle state after light with wavelengths that are respectively 650 nm, 610 nm, 555 nm, 510 nm, and 470 nm passes through the optical lens 10 in Implementation 3. FIG. 51 shows lateral chromatic aberration of the optical lens 10 in the micro-focus state after light with wavelengths that are respectively 650 nm, 610 nm, 555 nm, 510 nm, and 470 nm passes through the optical lens 10 in Implementation 3. In FIG. 48 to FIG. 51, a vertical coordinate represents a field of view angle in a unit of degree (°), and a horizontal coordinate is in a unit of micrometer (μm). In FIG. 48 to FIG. 51, an unmarked dotted line represents a diffraction limit range of the optical lens 10. It may be learned from FIG. 48 to FIG. 51 that lateral chromatic aberration of the optical lens 10 in each state after light with each wavelength passes through the optical lens 10 in Implementation 3 is within the diffraction limit, that is, lateral chromatic aberration of the optical lens 10 in each state after light with each wavelength passes through the optical lens 10 in Implementation 3 basically does not affect imaging quality of the optical lens 10.

FIG. 52 to FIG. 55 are respectively schematic diagrams of optical distortion of the optical lens 10 in the long-focus state, the medium-focus state, the wide-angle state, and the micro-focus state, to indicate a difference between a deformed image and an ideal shape after light passes through the optical lens 10. Solid lines in the left figures of FIG. 52 to FIG. 55 are respectively schematic diagrams of field curvature in a meridian direction in the long-focus state, the medium-focus state, the wide-angle state, and the micro-focus state after light of 555 nm passes through the optical lens 10. Dashed/dotted lines in FIG. 52 to FIG. 55 are respectively schematic diagrams of field curvature in a sagittal direction in the long-focus state, the medium-focus state, the wide-angle state, and the micro-focus state after light of 555 nm passes through the optical lens 10. Right figures of FIG. 52 to FIG. 55 are respectively schematic diagrams of optical distortion in the long-focus state, the medium-focus state, the wide-angle state, and the micro-focus state after light of 555 nm passes through the optical lens 10 in Implementation 3. It may be learned from FIG. 52 to FIG. 55, in this implementation, the optical system controls distortion to be within a range in which distortion can be identified by the naked eye.

In the optical lens 10 provided in this implementation, with a configuration manner of each lens in each component and a combination of lenses with a specified optical design, the optical lens 10 can be miniaturized and the zooming range thereof can be sufficiently wide, the optical lens 10 has a good imaging effect, and thinning of the terminal 1000 is implemented.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical lens, comprising a first component, a second component, a third component, and a fourth component that are successively arranged from an object side to an image side and each comprise at least one lens, wherein the second component comprises a refraction member configured to change a transmission route of light transmitted from the first component by refraction, wherein the refraction member is disposed within the second component and located on a side of the second component facing away from the third component, the third component and the fourth component are coaxially disposed along a common optical axis, wherein the common optical axis is aligned with a refracted path of the light transmitted from the first component after refraction by the second component, an included angle is formed between optical axes of the third component and the fourth component and an optical axis of the first component, a position of the second component relative to an imaging plane of the optical lens is fixed, and the first component, the third component, and the fourth component are configured to move relative to the second component, so that the optical lens transitions between a long-focus state, a medium-focus state, a wide-angle state, and a micro-focus state, wherein the micro-focus state corresponds to a state in which a focal length of the optical lens is smaller than that in the wide-angle state, wherein, when the optical lens performs zooming from the wide-angle state to the long-focus state, the second component does not move, and the first component, the third component, and the fourth component move toward the object side, and wherein, when the optical lens performs zooming from the wide-angle state to the micro-focus state, the second component does not move, the first component moves toward the image side, and the third component and the fourth component move toward the object side.

2. The optical lens according to claim 1, wherein when the optical lens is in the long-focus state, the optical lens meets the following relation:

$1.0 \leq TTL/EFLmax \leq 1.7$, wherein

TTL is a total track length of the optical lens, and EFLmax is an effective focal length of the optical lens in the long-focus state.

3. The optical lens according to claim 2, wherein the optical lens meets the following relation:

$0.01 \leq IH/EFLmax \leq 0.1$, wherein

IH is an imaging height of the optical lens.

4. The optical lens according to claim 1, wherein the first component has positive focal power, and the first component meets the following relation:

$1.0 \leq |fs_1/ft| \leq 1.7$, wherein $fs_1$ is a focal length of the first component, and ft is a focal length of the optical lens in the long-focus state.

5. The optical lens according to claim 1, wherein the second component has negative focal power, and the second component meets the following relation:

$0.1 \leq |fs_2/ft| \leq 0.7$, wherein $fs_2$ is a focal length of the second component, and ft is the focal length of the optical lens in the long-focus state.

6. The optical lens according to claim 1, wherein the third component has positive focal power, and the third component meets the following relation:

$0.1 \leq |fs_3/ft| \leq 0.7$, wherein $fs_3$ is a focal length of the third component, and ft is the focal length of the optical lens in the long-focus state.

7. The optical lens according to claim 1, wherein the fourth component has positive focal power, and the fourth component meets the following relation:

$0.3 \leq |fs_4/ft| \leq 0.9$, wherein $fs_4$ is a focal length of the fourth component, and ft is the focal length of the optical lens in the long-focus state.

8. The optical lens according to claim 1, wherein the optical lens meets the following relation:

4 mm≤φmax≤15 mm, wherein

φmax is a diameter of a largest lens among the first component, the second component, the third component, and the fourth component.

9. The optical lens according to claim 8, wherein the first component, the second component, the third component, and the fourth component have N lenses with focal power in total, a value of N is an integer greater than or equal to 7 and less than or equal to 15, and the N lenses with focal power comprise at least seven aspherical lenses.

10. The optical lens according to claim 1, wherein a difference between a chief ray angle of the optical lens when the optical lens is in the wide-angle state and another chief ray angle of the optical lens when the optical lens is in the long-focus state is less than or equal to 3 degrees.

11. The optical lens according to claim 1 wherein a difference between a chief ray angle of the optical lens when the optical lens is in the long-focus state and another chief ray angle of the optical lens when the optical lens is in the micro-focus state is less than or equal to 5 degrees.

12. The optical lens according to claim 1, wherein the fourth component comprises a glued lens.

13. The optical lens according to claim 1, wherein the optical lens comprises a stop positioned on an object side surface of the third component.

14. An imaging device, comprising a photosensitive element, a driver, and an optical lens, wherein the optical lens comprises a first component, a second component, a third component, and a fourth component that are successively arranged from an object side to an image side and each comprise at least one lens, the second component comprises a refraction member configured to change a transmission route of light transmitted from the first component by refraction, wherein the refraction member is disposed within the second component and located on a side of the second component facing away from the third component, the third component and the fourth component are coaxially disposed along a common optical axis, wherein the common optical axis is aligned with a refracted path of the light transmitted from the first component after refraction by the second component, an included angle is formed between optical axes of the third component and the fourth component and an optical axis of the first component, a position of the second component relative to an imaging plane of the optical lens is fixed, and the first component, the third component, and the fourth component are configured to move relative to the second component, so that the optical lens transitions between a long-focus state, a medium-focus state, a wide-angle state, and a micro-focus state, wherein the micro-focus state corresponds to a state in which a focal length of the optical lens is smaller than that in the wide-angle state;

wherein the photosensitive element is located on an image side of the optical lens and is located on an imaging plane of the optical lens, and the driver is configured to drive the first component, the third component, and the fourth component to move relative to the second component, wherein, when the optical lens performs zooming from the wide-angle state to the long-focus state, the second component does not move, and the first component, the third component, and the fourth component move toward the object side, and wherein, when the optical lens performs zooming from the wide-angle state to the micro-focus state, the second component does not move, the first component moves toward the image side, and the third component and the fourth component move toward the object side.

15. The imaging device according to claim 14, wherein when the optical lens is in the long-focus state, the optical lens meets the following relation:

1.0≤TTL/EFLmax≤1.7, wherein

TTL is a total track length of the optical lens, and EFLmax is an effective focal length of the optical lens in the long-focus state.

16. The imaging device according to claim 15, wherein the optical lens meets the following relation:

0.01≤IH/EFLmax≤0.1, wherein

IH is an imaging height of the optical lens.

17. A terminal, comprising an image processor and a camera module, wherein the image processor is communicatively connected to the camera module, the camera module is configured to: obtain image data, and input the image data into the image processor, and the image processor is configured to process the image data that is input to the image processor;

wherein the camera module comprises a photosensitive element, a driver, and an optical lens, the optical lens comprises a first component, a second component, a third component, and a fourth component that are successively arranged from an object side to an image side and each comprise at least one lens, the second component comprises a refraction member configured to change a transmission route of light transmitted from the first component by refraction, wherein the refraction member is disposed within the second component and located on a side of the second component facing away from the third component, the third component and the fourth component are coaxially disposed along a common optical axis, wherein the common optical axis is aligned with a refracted path of the light transmitted from the first component after refraction by the second component, an included angle is formed between optical axes of the third component and the fourth component and an optical axis of the first component, a position of the second component relative to an imaging plane of the optical lens is fixed, and the first component, the third component, and the fourth component are configured to move relative to the second component, so that the optical lens transitions between a long-focus state, a medium-focus state, a wide-angle state, and a micro-focus state, wherein the micro-focus state corresponds to a state in which a focal length of the optical lens is smaller than that in the wide-angle state;

wherein the photosensitive element is located on an image side of the optical lens and is located on an imaging plane of the optical lens, and the driver is configured to drive the first component, the third component, and the fourth component to move relative to the second component, wherein, when the optical lens performs zooming from the wide-angle state to the long-focus state, the second component does not move, and the first component, the third component, and the fourth component move toward the object side, and wherein, when the optical lens performs zooming from the wide-angle state to the micro-focus state, the second component does not move, the first component moves toward the image side, and the third component and the fourth component move toward the object side.

18. The terminal according to claim 17, wherein the terminal further comprises a housing, both the camera module and the image processor are accommodated in the housing, a light passing hole is disposed on the housing, the first component of the camera module faces the light passing hole, and when the driver drives the first component to move away from the second component, the first component can extend out of the housing by using the light passing hole.

19. The terminal according to claim 17, wherein when the optical lens is in the long-focus state, the optical lens meets the following relation:

$1.0 \leq TTL/EFLmax \leq 1.7$, wherein

TTL is a total track length of the optical lens, and EFLmax is an effective focal length of the optical lens in the long-focus state.

20. The terminal according to claim 17, wherein the optical lens meets the following relation:

$0.01 \leq IH/EFLmax \leq 0.1$, wherein

IH is an imaging height of the optical lens.

* * * * *